US008900681B2

(12) United States Patent
Yoshida et al.

(10) Patent No.: US 8,900,681 B2
(45) Date of Patent: Dec. 2, 2014

(54) LAYERED PRODUCT, PACKAGING MATERIAL AND FORMED PRODUCT USING THE SAME, AND METHOD FOR PRODUCING THE LAYERED PRODUCT

(75) Inventors: Kentaro Yoshida, Kurashiki (JP); Wataru Hirose, Kurashiki (JP); Manabu Shibata, Kurashiki (JP); Tatsuya Oshita, Kurashiki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 59 days.

(21) Appl. No.: 13/500,482

(22) PCT Filed: Sep. 28, 2010

(86) PCT No.: PCT/JP2010/005818
§ 371 (c)(1),
(2), (4) Date: May 31, 2012

(87) PCT Pub. No.: WO2011/043031
PCT Pub. Date: Apr. 14, 2011

(65) Prior Publication Data
US 2012/0244300 A1    Sep. 27, 2012

(30) Foreign Application Priority Data

Oct. 8, 2009  (JP) ................................. 2009-234224

(51) Int. Cl.
| | | |
|---|---|---|
| B32B 1/02 | (2006.01) | |
| B32B 27/08 | (2006.01) | |
| B32B 27/30 | (2006.01) | |
| B32B 27/28 | (2006.01) | |
| B32B 27/34 | (2006.01) | |
| B32B 7/02 | (2006.01) | |
| B32B 7/00 | (2006.01) | |
| B32B 27/00 | (2006.01) | |

(52) U.S. Cl.
CPC .............. *B32B 27/28* (2013.01); *B32B 27/308* (2013.01); *B32B 27/08* (2013.01); *B32B 27/34* (2013.01); *B32B 7/02* (2013.01); *B32B 7/00* (2013.01); *B32B 27/30* (2013.01); *B32B 27/00* (2013.01)
USPC ........................... 428/35.7; 428/35.2; 428/446

(58) Field of Classification Search
USPC .............................. 428/35.7, 34.2, 36.91, 446
See application file for complete search history.

(56) References Cited

U.S. PATENT DOCUMENTS

| | | | |
|---|---|---|---|
| 7,524,900 B2 | 4/2009 | Nishiura et al. | |
| 7,763,335 B2 | 7/2010 | Oshita et al. | |
| 2006/0293448 A1 | 12/2006 | Nishiura et al. | |
| 2007/0111005 A1* | 5/2007 | Oshita et al. ............... | 428/411.1 |
| 2009/0030126 A1 | 1/2009 | Uehara et al. | |
| 2009/0171003 A1 | 7/2009 | Nishiura et al. | |
| 2010/0209639 A1 | 8/2010 | Oshita et al. | |
| 2011/0027580 A1 | 2/2011 | Hirose et al. | |
| 2011/0210034 A1 | 9/2011 | Shibata et al. | |

FOREIGN PATENT DOCUMENTS

| | | |
|---|---|---|
| EP | 1 690 678 A1 | 8/2006 |
| EP | 1 870 342 A1 | 12/2007 |
| EP | 1 892 089 A1 | 2/2008 |
| EP | 2 266 794 A1 | 12/2010 |
| EP | 2 361 841 A1 | 8/2011 |
| JP | 7 118543 | 5/1995 |
| JP | 2000 233478 | 8/2000 |
| JP | 2001 310425 | 11/2001 |
| JP | 2002 326303 | 11/2002 |
| JP | 2003 292713 | 10/2003 |
| WO | 2005 053954 | 6/2005 |
| WO | 2006 126511 | 11/2006 |
| WO | WO 2009/125800 A1 | 10/2009 |
| WO | WO 2010/053097 A1 | 5/2010 |

OTHER PUBLICATIONS

Extended European Search Report issued Feb. 26, 2013 in Patent Application No. 10821709.2.
International Search Report Issued Jan. 11, 2011 in PCT/JP10/05818 Filed Sep. 28, 2010.

* cited by examiner

*Primary Examiner* — Erik Kashnikow
(74) *Attorney, Agent, or Firm* — Oblon, Spivak, McClelland, Maier & Neustadt, L.L.P.

(57) ABSTRACT

The layered product of the present invention has a base, and a gas barrier layer stacked on the base. The gas barrier layer is formed of a composition that includes a hydrolyzed condensate of a compound (L) containing a hydrolyzable characteristic group, and a neutralized product of a polymer (P) containing at least one functional group selected from the group consisting of carboxyl group and carboxylic acid anhydride group. The compound (L) includes a compound ($L^1$) and a compound ($L^2$). The compound ($L^1$) and the compound ($L^2$) each contains a silicon atom to which the hydrolyzable characteristic group is bonded. The compound ($L^1$) contains an organic group having amino group. The compound ($L^2$) does not contain an organic group having amino group. At least part of the —COO— group in the at least one functional group contained in the polymer (P) is neutralized with a divalent or higher valent ion (E) of a metal element that has a higher electronegativity than calcium.

5 Claims, No Drawings

LAYERED PRODUCT, PACKAGING MATERIAL AND FORMED PRODUCT USING THE SAME, AND METHOD FOR PRODUCING THE LAYERED PRODUCT

This application is a National Stage of PCT/JP10/005,818 filed Sep. 28, 2010 and claims the benefit of JP 2009-234224 filed Oct. 8, 2009.

TECHNICAL FIELD

The present invention relates to a layered product having excellent gas barrier properties, a packaging material and a formed product using the layered product, and a method for producing the layered product.

BACKGROUND ART

Materials for packaging foods and various articles often are required to have gas barrier properties represented by oxygen barrier properties. The use of a packaging material having low gas barrier properties may sometimes cause deterioration of the contents due to the decay of foods, etc., resulting from oxidation by oxygen or proliferation of microorganisms. Therefore, conventional packaging materials generally include a gas barrier layer for preventing the permeation of oxygen, etc.

Examples of the gas barrier layer include metal foils, and vapor deposition layers of metals or metal compounds. Aluminum foil, aluminum vapor deposition layer, silicon oxide vapor deposition layer, and aluminum oxide vapor deposition layer, for example, are used for the gas barrier layer. However, aluminium foil and metal layers such as aluminium vapor deposition layer have a disadvantage of invisibility of the contents or a disadvantage of difficulty in disposal. Meanwhile, metal compound layers such as silicon oxide vapor deposition layer and aluminium oxide vapor deposition layer may have cracks in the compound layer in some cases when the packaging material is deformed or subjected to impact, thus resulting in significant deterioration in gas barrier properties.

Also, a layer composed of a vinyl alcohol polymer with excellent gas barrier properties (e.g., polyvinyl alcohol and ethylene-vinyl alcohol copolymer) may be used as a gas barrier layer in some cases. Such a layer composed of the vinyl alcohol polymer has advantages of transparency and less difficulty in disposal.

The above-mentioned vinyl alcohol polymer is crystallized and densified by hydrogen bonding between hydroxyl groups in the molecule to exert gas barrier properties. Therefore, the hydrogen bonds of the conventional vinyl alcohol polymer are weakened and the gas barrier properties thereof tend to deteriorate in a state where the polymer has absorbed moisture under the influence, for instance, of water vapor, though it exhibits high gas barrier properties in a dry state. Accordingly, it is difficult for the layer composed of the vinyl alcohol polymer to exert a high level of gas barrier properties under high humidity.

Further, materials containing a polymer compound and a hydrolyzed condensate of metal alkoxide (for instance, tetramethoxysilane) are disclosed as materials for gas barrier layers (e.g., JP 2002-326303 A, JP 7 (1995)-118543 A, and JP 2000-233478 A). Furthermore, a gas barrier layer composed of polyacrylic acid and a crosslinking component is disclosed (e.g., JP 2001-310425 A).

In recent years, retort foods in which packaging materials filled with contents (foods) are brought into contact with hot water for sterilization have become widespread. In such a situation, the level of performance required for packaging materials for retort foods, such as strength against bag-breakage when dropping a packaging material filled with contents, oxygen barrier properties after sterilization by contact with hot water, oxygen barrier properties under high humidity until the delivery to a consumer, is becoming higher. The above-mentioned conventional techniques, however, cannot satisfy such requirements sufficiently.

A method for solving the above-mentioned problems and improving the properties of a gas barrier layer dramatically has been proposed (WO 2005/053954 A1). In this method, a gas barrier layer formed of a composition that includes a hydrolyzed condensate of metal alkoxide and a —COO— group-containing polymer is immersed in a solution that contains a metal ion having a valence of at least two. The —COO— group in the polymer is neutralized by this treatment.

CITATION LIST

Patent Literature

Patent Literature 1: JP 2002-326303 A
Patent Literature 2: JP 7 (1995)-118543 A
Patent Literature 3: JP 2000-233478 A
Patent Literature 4: JP 2001-310425 A
Patent Literature 5: WO 2005/053954 A1

SUMMARY OF INVENTION

Technical Problem

According to the method of WO 2005/053954 A1, it is possible to obtain a gas barrier layered product that includes a gas barrier layer with dramatically improved properties, that exhibits high oxygen barrier properties regardless of humidity, that exhibits high oxygen barrier properties even after being subjected to retorting, and that is excellent also in strength and transparency. However, in consideration of a possibility that the gas barrier layered product might be used under more severe conditions, there is still room for further improvement in properties of the gas barrier layered product.

In view of such a situation, it is an object of the present invention to provide a gas barrier layered product having further improved properties, particularly to provide a layered product that is excellent in both flexibility and hot-water resistance represented by oxygen barrier properties under high temperature/high humidity conditions after being subjected to retorting under more severe conditions, and a method for producing the layered product.

Solution to Problem

The inventors have further continued to study, aiming at improving the performance of the above-mentioned gas barrier layered product disclosed in WO 2005/053954 A1. In the course of the studies, the inventors have found the following. As compared to a layered product using calcium ion, a layered product using a divalent or higher valent ion of a metal element that has a higher electronegativity than calcium as a metal ion having a valence of at least two exhibits excellent hot-water resistance (e.g., oxygen barrier properties under high temperature/high humidity conditions after being subjected to retorting under more severe conditions), whereas the flexibility thereof is reduced. In the case of using calcium ion, the use of a compound that includes a silicon atom to which a hydrolyzable characteristic group is bonded and an organic group having amino group does not make much difference in flexibility, compared to not using such a compound. However, in the case of using the divalent or higher valent ion of the metal element that has a higher electronegativity than calcium as the metal ion having a valence of at least two, the use of the compound that includes the silicon atom to which the hydrolyzable characteristic group is bonded and the organic group having amino group results in significant improvement in the flexibility of the layered product, which is surprising, thus allowing a layered product that is excellent in both hot-water resistance and flexibility to be obtained. The inventors have made further studies on the basis of these findings and have accomplished the present invention.

That is, the layered product of the present invention has a base and a gas barrier layer stacked on the base. The gas barrier layer is formed of a composition that includes a hydrolyzed condensate of a compound (L) containing a hydrolyzable characteristic group and a neutralized product of a polymer (P) containing at least one functional group selected from the group consisting of carboxyl group and carboxylic acid anhydride group. The compound (L) includes a compound ($L^1$) and a compound ($L^2$). The compound ($L^1$) and the compound ($L^2$) each contains a silicon atom to which the hydrolyzable characteristic group is bonded. The compound ($L^1$) contains an organic group having amino group, and the compound ($L^2$) does not contain an organic group having amino group. At least part of the —COO— group in the at least one functional group contained in the polymer (P) is neutralized with a divalent or higher valent ion (E) of a metal element that has a higher electronegativity than calcium.

The production method of the layered product of the present invention is a method for producing a layered product having a base and a gas barrier layer stacked on the base. The method includes the step of stacking, on the base, a layer formed of a composition that includes a hydrolyzed condensate of a compound (L) containing a hydrolyzable characteristic group, and a polymer (P) and/or a partially neutralized product of the polymer (P), and the step of bringing the layer into contact with a solution that contains a divalent or higher valent ion (E) of a metal element that has a higher electronegativity than calcium. The polymer (P) is a polymer containing at least one functional group selected from the group consisting of carboxyl group and carboxylic acid anhydride group. The compound (L) includes a compound ($L^1$) and a compound ($L^2$). The compound ($L^1$) and the compound ($L^2$) each contains a silicon atom to which the hydrolyzable characteristic group is bonded. The compound ($L^1$) contains an organic group having amino group, and the compound ($L^2$) does not contain an organic group having amino group.

Advantageous Effects of Invention

The layered product of the present invention maintains high oxygen barrier properties and is excellent in both hot-water resistance and flexibility, even after being subjected to retorting under more severe conditions and then being stored under high temperature/high humidity conditions or being subjected to bending. According to the production method of the present invention, this layered product can be produced easily.

DESCRIPTION OF EMBODIMENTS

Hereinafter, embodiments of the present invention are described. It should be noted that, although a specific material (such as a compound) may be mentioned in the following description as an example that exhibits a specific function, the present invention is not limited to the embodiments using such a material. Further, the below-mentioned examples of materials may be used individually or used in combination, unless otherwise specified.

<Layered Product>

The layered product of the present invention is described below. The layered product of the present invention has a base, and a gas barrier layer stacked on the base. The gas barrier layer is formed of a specific composition. That is, the composition includes a hydrolyzed condensate of a compound (L) containing a hydrolyzable characteristic group, and a neutralized product of a polymer (P) containing at least one functional group selected from the group consisting of carboxyl group and carboxylic acid anhydride group. Hereinafter, the "at least one functional group selected from the group consisting of carboxyl group and carboxylic acid anhydride group" contained in the polymer (P) may be referred to as a "functional group (C)".

The compound (L) includes a compound ($L^1$) and a compound ($L^2$). The compound ($L^1$) and the compound ($L^2$) each contains a silicon atom to which the hydrolyzable characteristic group is bonded. The compound ($L^1$) contains an organic group having amino group. On the other hand, the compound ($L^2$) does not contain an organic group having amino group.

At least part of —COO— group in the functional group (C) contained in the polymer (P) is neutralized with a divalent or higher valent ion (E) (cation) of a metal element that has a higher electronegativity than calcium. From another aspect, a salt is formed by the COO— group (anion) derived from the functional group (C) together with the ion (E).

In the above-mentioned composition, part of the —COO— group in the functional group (C) contained in the polymer (P) may be reacted with the hydrolyzed condensate of the compound (L). In this case, the reacted polymer (P) and the reacted hydrolyzed condensate of the compound (L) are regarded to be included in the composition without being reacted with each other in the following description, unless otherwise specified. Further, even in the case where the above-mentioned gas barrier layer is formed only of a reaction product of the hydrolyzed condensate of the compound (L) and the neutralized product of the polymer (P), the gas barrier layer is referred to be formed of the composition in the present invention. Here, the "reaction product of the hydrolyzed condensate of the compound (L) and the neutralized product of the polymer (P)" includes a reaction product of the hydrolyzed condensate of the compound (L), the neutralized product of the polymer (P), and other components; a neutralized product of a reaction product of the hydrolyzed condensate of the compound (L) and the polymer (P); and a neutralized product of a reaction product of the hydrolyzed condensate of the compound (L), the polymer (P), and other components, for example.

In the composition that forms the gas barrier layer, the total of the hydrolyzed condensate of the compound (L) and the neutralized product of the polymer (P) (including the reaction product thereof) may account for at least 50 mass %, at least 70 mass %, at least 80 mass %, at least 90 mass %, at least 95 mass %, at least or 98 mass %, and may account for 100 mass %, for example.

<Hydrolyzed Condensate>

The composition that forms the gas barrier layer includes the hydrolyzed condensate of the compound (L). The hydrolysis of the compound (L) allows at least part of the hydrolyzable characteristic group in the compound (L) to be substituted by a hydroxyl group. Further, the resultant hydrolysate is condensed to form a compound to which a metal atom is bonded via oxygen. By repeating this condensation, it is possible to form a compound that can be considered substantially as a metal oxide. Here, in order to cause such hydrolysis and condensation, it is important that the compound (L) should contain a hydrolyzable characteristic group (functional group). When such a group is not bonded to the compound (L), hydrolysis and condensation do not occur or occur very slowly, which makes it difficult to obtain the effects of the present invention. Si may be classified into a semimetal element in some cases but is described as a metal in this description. Examples of the hydrolyzable characteristic group contained in the compound (L) include $X^1$ in the later-mentioned formula (I), $X^2$ in the later-mentioned formula (II), and $X^3$ in the later-mentioned formula (III).

The hydrolyzed condensate can be produced, for example, from a specific raw material by a technique to be used in a known sol-gel method. Examples of the raw material to be used include the compound (L), a partial hydrolysate of the compound (L), a total hydrolysate of the compound (L), a partially hydrolyzed condensate of the compound (L), a partial condensate of a total hydrolysate of the compound (L), and a combination thereof. These raw materials may be produced using a known method, or commercially available raw materials may be used. The raw material is not particularly limited. For example, a condensate to be obtained by hydrolysis and condensation of approximately 2 to 10 molecules can be used as the raw material. Specifically, a linear condensate of dimer to decamer obtained by hydrolysis and condensation of tetramethoxysilane, for example, can be used as part of the raw material.

The compound ($L^1$) contains a silicon atom to which the hydrolyzable characteristic group is bonded and an organic group having amino group. This organic group is typically bonded to the silicon atom. The compound ($L^1$) may be at least one compound represented by the following formula (I). In the present invention, the compound ($L^1$) can cause an effect of bonding the hydrolyzed condensate of the compound (L) and the polymer (P) more strongly via a covalent bond. The use of the compound ($L^1$) as part of the compound (L) can significantly improve the oxygen barrier properties after bending of the resultant layered product.

$$SiX^1_p Z_q R^1_{(4-p-q)} \quad (I),$$

where $X^1$ denotes one selected from the group consisting of F, Cl, Br, I, $R^1O$—, $R^1COO$—, $(R^1CO)_2CH$—, and $NO_3$; Z denotes the organic group having amino group; $R^1$ denotes one selected from the group consisting of alkyl group, aralkyl group, aryl group, and alkenyl group; in the case where a plurality of $X^1$ are included in the formula (I), the plurality of $X^1$ may be identical to each other, or may be different from each other; in the case where a plurality of Z are included in the formula (I), the plurality of Z may be identical to each other, or may be different from each other; in the case where a plurality of $R^1$ are included in the formula (I), the plurality of $R^1$ may be identical to each other, or may be different from each other; p denotes an integer of 1 to 3; q denotes an integer of 1 to 3; and $2 \leq (p+q) \leq 4$ is satisfied.

$R^1$, for example, is an alkyl group having 1 to 10 carbon atoms, preferably an alkyl group having 1 to 4 carbon atoms.

In the formula (I), the amino group in the "organic group having amino group" denoted by Z has a function of improving the reaction efficiency with the functional group (C) in the polymer (P) by forming an ion pair (reaction precursor), and a function of contributing to the formation of a covalent bond (amide bond) at comparatively low temperature. It should be noted that Z in the formula (I) may have only one amino group, or may have a plurality of amino groups.

In a preferred example, $X^1$ is a halogen atom or an alkoxy group ($R^1O$—) having 1 to 4 carbon atoms, Z is an alkyl group having 1 to 4 carbon atoms and substituted by amino group, $R^1$ is an alkyl group having 1 to 4 carbon atoms, p is 2 or 3, q is 1 or 2, and $3 \leq (p+q) \leq 4$ is satisfied. In a particularly preferred example, $X^1$ is a halogen atom or an alkoxy group ($R^1O$—) having 1 to 4 carbon atoms, Z is an amino alkyl group having 1 to 4 carbon atoms, p is 3, and q is 1.

Examples of the compound ($L^1$) include gamma-aminopropyltrimethoxysilane, gamma-aminopropyltriethoxysilane, gamma-aminopropyltriisopropoxysilane, gamma-aminopropyltributoxysilane, gamma-aminopropyltrichlorosilane, N-beta-aminoethyl-gamma-aminopropyltrimethoxysilane, N-beta-aminoethyl-gamma-aminopropyltriethoxysilane, N-beta-aminoethyl-gamma-aminopropyltriisopropoxysilane, N-beta-aminoethyl-gamma-aminopropyltributoxysilane, N-beta-aminoethyl-gamma-aminopropyltrichlorosilane, trimethoxysilylpropyl diethylenetriamine, triethoxysilylpropyl diethylenetriamine, triisopropoxysilylpropyl diethylenetriamine, tributoxysilylpropyl diethylenetriamine, and trichlorosilylpropyl diethylenetriamine. Among these, gamma-aminopropyltrimethoxysilane and gamma-aminopropyltriethoxysilane can be mentioned as preferred examples of the compound ($L^1$).

When the total number of moles of the amino group in the above-mentioned "organic group having amino group" contained in the compound ($L^1$) is referred to as NA, and the total number of moles of the —COO— group in the functional group (C) contained in the polymer (P) is referred to as NC, $0.4/100 \leq (NA/NC) \leq 11.0/100$ is preferably satisfied. The layered product with further excellent flexibility can be obtained when the value of NA/NC of 0.4/100 or more. Moreover, the gas barrier properties before and after retorting of the layered product of the present invention can be further improved when the value of NA/NC is 11.0/100 or less. For better flexibility and gas barrier properties before and after retorting of the layered product of the present invention, the value of NA/NC is more preferably in the range of 0.8/100 to 8.0/100, further preferably in the range of 0.9/100 to 6.0/100.

When the total number of moles of the amino group in the above-mentioned "organic group having amino group" contained in the compound ($L^1$) is referred to as NA, and the total number of moles of the ion (E) is referred to as NE, $80.0/20.0 \leq (NE/NA) \leq 99.0/1.0$ is preferably satisfied. The layered product with more excellent hot-water resistance can be obtained when the value of NE/NA is 80/20 or more. Further, the layered product with more excellent flexibility can be obtained when the value of NE/NA is 99.0/1.0 or less. In order to further improve the hot-water resistance and the flexibility of the resultant layered product, the value of NE/NA is more preferably in the range of 85.0/15.0 to 97.9/2.1.

The compound ($L^2$) contains a silicon atom to which the hydrolyzable characteristic group is bonded, and does not contain an organic group having amino group. The compound ($L^2$) preferably does not contain an organic group having a functional group that is reactive with carboxyl group (such as epoxy group, isocyanate group, mercapto group, hydroxyl group, ureido group, oxazoline group, carbodiimide group, and halogen atom). The compound ($L^2$) may be at least one compound represented by the following formula (II). In the present invention, the use of the compound ($L^2$) as part of the compound (L) can improve the hot-water resistance of the gas barrier layer.

$$SiX^2_r R^2_{(4-r)} \quad (II),$$

where $X^2$ denotes one selected from the group consisting of F, Cl, Br, I, $R^2O$—, $R^2COO$—, $(R^2CO)_2CH$—, and $NO_3$; $R^2$ denotes one selected from the group consisting of alkyl group, aralkyl group, aryl group, and alkenyl group; in the case where a plurality of $X^2$ are included in the formula (II), the plurality of $X^2$ may be identical to each other, or may be different from each other; in the case where a plurality of $R^2$ are included in the formula (II), the plurality of $R^2$ may be identical to each other, or may be different from each other; and r denotes an integer of 1 to 4.

$R^2$, for example, is an alkyl group having 1 to 10 carbon atoms, preferably an alkyl group having 1 to 4 carbon atoms.

In a preferred example, $X^2$ is a halogen atom or an alkoxy group ($R^2O$—) having 1 to 4 carbon atoms, $R^2$ is an alkyl group having 1 to 4 carbon atoms, and r is 3 or 4. In a particularly preferred example, $X^2$ is a halogen atom or an alkoxy group ($R^2O$—) having 1 to 4 carbon atoms, and r is 4.

Examples of the compound ($L^2$) include tetrachlorosilane, tetrabromosilane, tetramethoxysilane, tetraethoxysilane, methyltrimethoxysilane, ethyltrimethoxysilane, octyltrimethoxysilane, phenyltrimethoxysilane, vinyltrimethoxysilane, vinyltriethoxysilane, chlorotrimethoxysilane, chlorotriethoxysilane, dichlorodimethoxysilane, dichlorodiethoxysilane, trichloromethoxysilane, trichloroethoxysilane, and vinyltrichlorosilane. Among these, tetramethoxysilane and tetraethoxysilane can be mentioned as preferred examples of the compound ($L^2$).

The compound (L) may further include at least one compound ($L^3$) represented by the following formula (III). The use of the compound ($L^3$) can further improve the gas barrier properties of the gas barrier layer. This effect is more significant particularly when the gas barrier layer is thin.

$$MX^3{}_m R^3{}_{(n-m)} \quad \text{(III)},$$

where M denotes one selected from the group consisting of Al, Ti, and Zr; $X^3$ denotes one selected from the group consisting of F, Cl, Br, I, $R^3O$—, $R^3COO$—, $(R^3CO)_2CH$—, and $NO_3$; $R^3$ denotes one selected from the group consisting of alkyl group, aralkyl group, aryl group, and alkenyl group; in the case where a plurality of $X^3$ are included in the formula (III), the plurality of $X^3$ may be identical to each other, or may be different from each other; in the case where a plurality of $R^3$ are included in the formula (III), the plurality of $R^3$ may be identical to each other, or may be different from each other; n is equal to the valence of M; and m denotes an integer of 1 to n.

M in the formula (III) is preferably Al because this allows the change in the gas barrier properties and the transparency of the layered product before and after retorting to be particularly small.

$R^3$, for example, is an alkyl group having 1 to 10 carbon atoms, preferably an alkyl group having 1 to 4 carbon atoms.

In a preferred example, $X^3$ is a halogen atom or an alkoxy group ($R^3O$—) having 1 to 4 carbon atoms, and m is equal to n (the valence of M).

Examples of the compound ($L^3$) include aluminum compounds such as aluminum chloride, aluminum triethoxide, aluminum tri-normal propoxide, aluminum triisopropoxide, aluminum tri-normal butoxide, aluminum tri-t-butoxide, aluminum triacetate, aluminum acetylacetonate, and aluminum nitrate; titanium compounds such as titanium tetraisopropoxide, titanium tetra-normal butoxide, titanium tetra(2-ethylhexoxide), titanium tetramethoxide, and titanium acetylacetonate; and zirconium compounds such as zirconium tetra-normal propoxide, zirconium tetrabutoxide, and zirconium tetraacetylacetonate. Among these, aluminum triisopropoxide and aluminum tri-normal butoxide can be mentioned as preferred examples of the compound ($L^3$).

When the total number of moles of the silicon atom derived from the compound ($L^2$) is referred to as NM2, and the total number of moles of M derived from the compound ($L^3$) is referred to as NM3, $0.1/99.9 \leq (NM3/NM2) \leq 30.0/70.0$ is preferably satisfied. The hot-water resistance, and the gas barrier properties and the appearance after retorting can be further improved when the value of NM3/NM2 is 0.1/99.9 or more. Further, the gas barrier properties before and after retorting can be further improved when the value of NM3/NM2 is 30.0/70.0 or less. For better gas barrier properties, hot-water resistance, and appearance, the value of NM3/NM2 is more preferably in the range of 0.5/99.5 to 8.0/92.0.

The proportion of the compound ($L^1$), the compound ($L^2$), and the compound ($L^3$) in the compound (L) is not specifically limited, as long as the effects of the present invention are obtained. The proportion of compounds other than the compound ($L^1$), the compound ($L^2$) and the compound ($L^3$) in the compound (L), for example, is 20 mol % or less, 10 mol % or less, 5 mol % or less, or 0 mol %. In an example, the compound (L) consists only of the compound ($L^1$) and the compound ($L^2$). In another example, the compound (L) consists only of the compound ($L^1$), the compound ($L^2$), and the compound ($L^3$).

In the case where the compound (L) does not include the compound ($L^3$), the proportion of the compound ($L^1$) in the compound (L) may be in the range of 0.1 to 40.0 mol % (e.g., in the range of 0.4 to 20.0 mol %), and the proportion of the compound ($L^2$) in the compound (L) may be in the range of 40.0 to 99.9 mol % (e.g., in the range of 60.0 to 99.6 mol %).

In the case where the compound (L) includes the compound ($L^3$), the proportion of the compound ($L^1$) in the compound (L) may be in the range of 0.1 to 40.0 mol % (e.g., in the range of 0.4 to 20.0 mol %), the proportion of the compound ($L^2$) in the compound (L) may be in the range of 30.0 to 99.8 mol % (e.g., in the range of 50.0 to 99.3 mol %), and the proportion of the compound ($L^3$) in the compound (L) may be in the range of 0.1 to 30.0 mol % (e.g., in the range of 0.3 to 10.0 mol %).

The number of molecules to be condensed in the hydrolyzed condensate of the compound (L) can be controlled by the conditions for the hydrolysis condensation. For example, the number of molecules to be condensed can be controlled by the amount of water, the type and concentration of the catalyst, the temperature or duration of the hydrolysis condensation, or the like.

<Polymer (P)>

The neutralized product of the polymer (P) can be obtained by neutralizing at least part of the —COO— group in the functional group (C) contained in the polymer (P) with the divalent or higher valent ion (E) of the metal element that has a higher electronegativity than calcium. The neutralized product of the polymer (P) includes a partially neutralized product in which only part of the —COO— group in the functional group (C) is neutralized with the ion (E).

The polymer (P) contains at least one carboxyl group or at least one carboxylic acid anhydride group in one molecule of the polymer. Specifically, a polymer that contains at least one constitutional unit containing at least one carboxyl group, such as acrylic acid unit, methacrylic acid unit, maleic acid unit, and itaconic acid unit, in one molecule of the polymer can be used. A polymer that contains a constitutional unit having the structure of carboxylic acid anhydride, such as maleic anhydride unit and phthalic anhydride unit, also can be used. The polymer (P) may contain one type, or two or more types of the constitutional unit containing at least one carboxyl group and/or the constitutional unit having the structure of carboxylic acid anhydride (hereinafter they may be referred to collectively as a "unit (G)").

The layered product with more excellent gas barrier properties can be obtained by adjusting the content of the unit (G) in the entire constitutional unit of the polymer (P) to at least 10 mol %. This content is more preferably at least 20 mol %, further preferably at least 40 mol %, particularly preferably at least 70 mol %, and may be 100 mol %. It should be noted that, when the polymer (P) contains both the constitutional unit containing at least one carboxyl group and the constitutional unit having the structure of carboxylic acid anhydride, the total content of the two should be in the above-mentioned range.

In the case of the polymer (P) composed of the unit (G) and a constitutional unit other than the unit (G), the constitutional unit other than the unit (G) is not specifically limited. Examples of the constitutional unit other than the unit (G) include at least one constitutional unit selected from a constitutional unit derived from (meth)acrylic acid esters such as methyl acrylate unit, methyl methacrylate unit, ethyl acrylate unit, ethyl methacrylate unit, butyl acrylate unit, and butyl methacrylate unit; a constitutional unit derived from vinyl esters such as vinyl formate unit and vinyl acetate unit; a constitutional unit derived from aromatic vinyls such as styrene unit and p-styrenesulfonic acid unit; and a constitutional unit derived from olefins such as ethylene unit, propylene unit, and isobutylene unit. When the polymer (P) contains two or more types of constitutional units, the polymer (P) can take any one of the following forms: the form of an alternating copolymer, the form of a random copolymer, the form of a block copolymer, and the form of a tapered copolymer.

Examples of the polymer (P) include polyacrylic acid, polymethacrylic acid, and poly(acrylic acid/methacrylic acid). The polymer (P) may be at least one polymer selected from the group consisting of polyacrylic acid and polymethacrylic acid. Furthermore, examples of the polymer (P) that contains the above-described constitutional unit other than the unit (G) include ethylene-maleic anhydride copolymer, styrene-maleic anhydride copolymer, isobutylene-maleic anhydride alternating copolymer, ethylene-acrylic acid copolymer, and a saponified product of ethylene-ethyl acrylate copolymer.

The molecular weight of the polymer (P) is not specifically limited. The number average molecular weight thereof is preferably at least 5,000, more preferably at least 10,000, further preferably at least 20,000, because such a range provides the layered product having excellent gas barrier properties and mechanical properties (such as drop impact strength). The upper limit of the number average molecular weight of the polymer (P) is not specifically limited, and is generally 1,500,000 or less.

The molecular weight distribution of the polymer (P) also is not specifically limited. In the molecular weight distribution curve, which is obtained by taking the molecular weight of each polymer molecule as the horizontal axis and taking the amount (mass) of the polymer (P) present in each molecular weight as the vertical axis, of the polymer (P), two or more (e.g., two) maximum peaks may be present. Alternatively, only one maximum peak may be present in the molecular weight distribution curve. As mentioned later, a combination use of polymers (P') and (P''') in producing the layered product of the present invention for the purpose of improving the productivity may cause, in some cases, two or more maximum peaks to be present in the molecular weight distribution curve of the polymer (P).

<Neutralization (Ionization)>

The neutralized product of the polymer (P) can be obtained by neutralizing at least part of the —COO— group in the functional group (C) contained in the polymer (P) with the divalent or higher valent ion (E) of the metal element that has a higher electronegativity than calcium.

It is important that the metal element that forms the ion (E) with which the —COO— group in the functional group (C) is neutralized should have a higher electronegativity than calcium. The layered product of the present invention is allowed to have excellent gas barrier properties and hot-water resistance by the —COO— group in the functional group (C) being neutralized with the ion (E). For example, when the functional group (C) is not neutralized or is neutralized with only a monovalent ion, it is impossible to obtain the layered product with good gas barrier properties. In the present invention, Pauling electronegativity can be employed as the electronegativity of the metal element. Examples of the ion (E) include magnesium ion, divalent iron ion, trivalent iron ion, zinc ion, zirconium ion, aluminum ion, and titanium ion. The ion (E) may be at least one selected from the group consisting of magnesium ion, divalent iron ion, trivalent iron ion, zinc ion, and aluminum ion. These metal ions are preferred, for instance, from the viewpoint of the gas barrier properties and the transparency of the layered product, safety to the human body, and low influence on the environment. The ion (E) is preferably zinc ion because of its excellent availability.

It should be noted that part of the —COO— group in the functional group (C) may be neutralized with a monovalent ion (cation).

The proportion of the —COO— group in the functional group (C) that is neutralized with the ion (E) is preferably at least 10 mol %, more preferably at least 40 mol %, further preferably at least 50 mol %, particularly preferably at least 60 mol %. Higher gas barrier properties and hot-water resistance can be achieved by increasing the proportion of the neutralized —COO— group. On the other hand, the upper limit of this proportion, for example, is 100×(NC−NA)/NC (mol %), as expressed using the above-mentioned NA and NC.

The carboxylic acid anhydride group is regarded as containing two —COO— groups. That is, when a mol of carboxyl group and b mol of carboxylic acid anhydride group are present as the functional group (C), the mol of the —COO— groups in the functional group (C) is (a+2b) mol in total.

The degree of neutralization (the degree of ionization) of the —COO— group in the functional group (C) can be determined by measuring the infrared absorption spectrum of the layered product using the ATR (attenuated total reflection) method, or by removing the gas barrier layer from the layered product and then measuring the infrared absorption spectrum thereof using the KBr method. Further, the degree of neutralization can be determined also from the value of the X-ray fluorescence intensity to be obtained by X-ray fluorescence spectrometry for the metal element used for ionization.

In the infrared absorption spectrum, the peak attributed to C═O stretching vibration of the carboxyl group or carboxylic acid anhydride group before neutralization (before ionization) is observed in the range of 1600 $cm^{-1}$ to 1850 $cm^{-1}$, while the C═O stretching vibration of the carboxyl group after neutralization (after ionization) is observed in the range of 1500 $cm^{-1}$ to 1600 $cm^{-1}$. Accordingly, they can be evaluated individually in the infrared absorption spectrum. Specifically, the ratio of them is determined from the maximum absorbance in each range, so that the degree of neutralization (degree of ionization) of the —COO— group in the functional group (C) can be calculated using a standard curve prepared beforehand. The standard curve can be plotted by measuring the infrared absorption spectrum for a plurality of standard samples each having a different degree of neutralization.

In the case where the thickness of the gas barrier layer is 1 µm or less and the base contains an ester bond, the degree of neutralization (degree of ionization) cannot be calculated accurately by the ATR method in some cases, because the peak of the ester bond contained in the base is detected in the infrared absorption spectrum by the ATR method and the detected peak overlaps the peak of the —COO— in the neutralized product of the polymer (P) that forms the gas barrier layer. In such a case, the degree of neutralization (degree of ionization) of the —COO— group in the functional group (C) in the gas barrier layer with a thickness of 1 µm or less is preferably calculated based on the results given by the X-ray fluorescence spectrometry.

Specifically, the degree of neutralization (degree of ionization) of the —COO— group in the functional group (C) in the neutralized product of the polymer (P) that forms the gas barrier layer stacked on the base that does not contain an ester bond is determined from the infrared absorption spectrum. Next, the layered product for which the degree of neutralization (degree of ionization) has been determined is subjected to the X-ray fluorescence spectrometry to measure the X-ray fluorescence intensity of the metal element used for the ionization. Subsequently, the same measurement is performed for layered products that are different only in the degree of neutralization (degree of ionization). The correlation between the degree of neutralization (degree of ionization) and the X-ray fluorescence intensity of the metal element used for the ionization is determined therefrom, so that a standard curve is plotted. Then, the layered product using the base that contains an ester bond is subjected to the X-ray fluorescence spectrometry, and the degree of neutralization (degree of ionization) is determined from the X-ray fluorescence intensity of the metal element used for the ionization based on the above-mentioned standard curve.

<Inorganic Component and Organic Component>

In order to further improve the gas barrier properties, the ratio of [mass of the inorganic component derived from the compound (L)]/[total of the mass of the organic component derived from the compound (L) and the mass of the organic component derived from the polymer (P)] is preferably in the range of 20/80 to 80/20, more preferably in the range of 25/75 to 75/25, further preferably in the range of 29/71 to 70/30, particularly preferably in the range of 35/65 to 60/40, in the composition that forms the gas barrier layer.

The mass of the inorganic component derived from the compound (L) can be calculated from the mass of raw materials used in preparing the composition. That is, supposing that the compound (L), the partial hydrolysate of the compound (L), the total hydrolysate of the compound (L), the partially hydrolyzed condensate of the compound (L), the partial condensate of the total hydrolysate of the compound (L), a combination thereof, or the like, has been totally hydrolyzed and condensed to form a metal oxide, the mass of the metal oxide is regarded as the mass of the inorganic component derived from the compound (L).

The calculation of the mass of the metal oxide is described below further in detail. The total hydrolysis condensation of the compound ($L^1$) represented by the formula (I) results in a compound having a composition represented by the formula: $SiO_{p/2}Z_qR^1_{(4-p-q)}$, for example. In this compound, the portion of $SiO_{p/2}$ is a metal oxide, and is regarded as the inorganic component derived from the compound (L). In this case, Z and $R^1$ are regarded as the organic component derived from the compound (L). Likewise, the same calculation is performed for the compound ($L^2$) and the compound ($L^3$), as well. The above-mentioned ratio can be calculated using the mass of the inorganic component derived from the compound (L) and the mass of the organic component derived from the compound (L). It should be noted that, in the case where the polymer (P) is neutralized with an ion other than metal ions (e.g., ammonium ion), the mass of the ion (e.g., ammonium ion) also is added to the mass of the organic component derived from the polymer (P).

The value obtained by dividing the mass of the metal oxide by the mass of the effective components added by the end of step (iii) to be described later and multiplying it by 100 corresponds to the content (mass %) of the hydrolyzed condensate in the composition that forms the gas barrier layer. In this case, the mass of the effective components herein means the value obtained by subtracting, from the mass of all the components added by the end of the later-mentioned step (iii), the mass of volatile components such as solvents and compounds that are produced in the process in which the above-mentioned compound (L) changes into a metal oxide.

<Compound (Q)>

The composition that forms the gas barrier layer in the layered product of the present invention may include a compound (Q) containing at least two amino groups, or a neutralized product or a reaction product thereof. The compound (Q) is a compound different from the compound (L), the hydrolyzed condensate of the compound (L), the polymer (P), or the neutralized product of the polymer (P). In the case where the composition further includes the compound (Q) or the neutralized product or the reaction product thereof, part of the —COO— group in the functional group (C) contained in the polymer (P) can be brought into a state of being neutralized and/or reacted with the compound (Q). As the compound (Q), alkylene diamine, polyalkylene polyamine, alicyclic polyamine, aromatic polyamine, polyvinyl amine, etc., can be used. Alkylene diamine is preferably used because it gives better gas barrier properties of the layered product.

Examples of the compound (Q) include hydrazine, ethylenediamine, propylene diamine, hexamethylenediamine, diethylenetriamine, triethylenetetramine, diaminodiphenylmethane, 1,2-diaminocyclohexane, 1,3-diaminocyclohexane, 1,4-diaminocyclohexane, xylylenediamine, chitosan, polyallylamine, and polyvinylamine. The compound (Q) is preferably ethylenediamine, propylenediamine, or chitosan, because these allow the layered product to have better gas barrier properties.

For better gas barrier properties and hot-water resistance of the layered product of the present invention, the molar ratio of [amino group contained in the compound (Q)]/[—COO— group in the functional group (C) contained in the polymer (P)] is preferably in the range of 0.2/100 to 20/100, more preferably in the range of 0.5/100 to 15/100, further preferably in the range of 1/100 to 10/100.

When the compound (Q) is added to the polymer (P), the compound (Q) may be neutralized with an acid beforehand. Examples of the acid to be used for the neutralization include hydrochloric acid, nitric acid, sulfuric acid, acetic acid, and carbonic acid. For better gas barrier properties of the layered product, hydrochloric acid, acetic acid, or carbonic acid is used preferably.

<Compound (R)>

The composition that forms the gas barrier layer in the layered product of the present invention may include a compound (R) having at least two hydroxyl groups or a reaction product thereof. In the case of using the compound (R), part of the —COO— group in the functional group (C) contained in the polymer (P) can form an ester bond by reacting with the compound (R). Such an embodiment allows the gas barrier properties of the resultant layered product after being stretched to be further improved.

The compound (R) is a compound different from the compound (L), the hydrolyzed condensate of the compound (L), the polymer (P), or the neutralized product of the polymer (P). Examples of the compound (R) include a low molecular weight compound and a high molecular weight compound. Preferred examples of the compound (R) include polymeric compounds such as polyvinyl alcohol, partially saponified polyvinyl acetate, ethylene-vinyl alcohol copolymer, polyethylene glycol, polyhydroxyethyl(meth)acrylate, polysaccharides such as starch, and polysaccharide derivatives derived from polysaccharides such as starch.

The composition that forms the gas barrier layer may contain substances other than the above-mentioned substances, as long as the effects of the present invention can be obtained. For example, the composition may contain inorganic acid metal salts such as carbonate, hydrochloride, nitrate, hydrogencarbonate, sulfate, hydrogensulfate, phosphate, borate, and aluminate; organic acid metal salts such as oxalate, acetate, tartrate, and stearate; metal complexes such as acetylacetonate metal complex (aluminum acetylacetonate, etc.), cyclopentadienyl metal complex (titanocene etc.), and cyano metal complex; a layered clay compound, a crosslinking agent, a plasticizer, an antioxidant, an ultraviolet absorber, a flame retardant, and the like. Further, the composition that forms the gas barrier layer may contain metal oxide fine powder, silica fine powder, and the like.

<Gas Barrier Layer>

The thickness of the gas barrier layer to be included in the layered product of the present invention (in the case where the layered product includes two or more gas barrier layers, the total thickness of all the gas barrier layers) is preferably 4.0 μm or less, more preferably 2.0 μm or less, further preferably 1.0 μm or less, and may be 0.9 μm or less. A reduction in the thickness of the gas barrier layer(s) allows the change in the size of the layered product of the present invention to be kept low in processing such as printing and lamination, and further increases the flexibility of the layered product of the present invention. Thus, it is possible to make the mechanical properties of the layered product of the present invention close to the original mechanical properties of the base. The layered product of the present invention allows the oxygen transmission rate in an atmosphere of 20° C. and 85% RH (relative humidity) to be 1.0 ml/($m^2$·day·atm) or less, even in the case where the total thickness of the gas barrier layer(s) included in the layered product is 1.0 μm or less (e.g., 0.9 μm or less). The thickness of the gas barrier layer (in the case where the layered product includes two or more gas barrier layers, the total thickness of all the gas barrier layers) is further preferably at least 0.1 μm (e.g., at least 0.2 μm). For better gas barrier properties of the layered product of the present invention, the thickness of each gas barrier layer is preferably at least 0.05 μm (e.g., at least 0.15 μm). The thickness of the gas barrier layer(s) can be controlled by the concentration of the solution and the coating method that are used for forming the gas barrier layer(s).

The microstructure of the gas barrier layer is not particularly limited. However, the gas barrier layer with the microstructure described below can suppress deterioration more effectively in gas barrier properties when the resultant layered product is stretched. Preferred examples of the microstructure include a sea-island structure composed of a sea phase (alpha) and an island phase (beta). The island phase (beta) is a region containing higher proportion of the hydrolyzed condensate of the compound (L) compared to the sea phase (alpha).

Preferably, the sea phase (alpha) and the island phase (beta) each further have a microstructure. For example, the sea phase (alpha) may further form a sea-island structure composed of a sea phase (alpha 1) that consists mainly of the neutralized product of the polymer (P), and an island phase (alpha 2) that consists mainly of the hydrolyzed condensate of the compound (L). Meanwhile, the island phase (beta) may further form a sea-island structure composed of a sea phase (beta 1) that consists mainly of the neutralized product of the polymer (P), and an island phase (beta 2) that consists mainly of the hydrolyzed condensate of the compound (L). Preferably, the ratio (volume ratio) of [island phase (beta 2)/sea phase (beta 1)] in the island phase (beta) is higher than the ratio of [island phase (alpha 2)/sea phase (alpha 1)] in the sea phase (alpha). The diameter of the island phase (beta) is preferably in the range of 5 to 1200 nm, more preferably in the range of 10 nm to 800 nm, further preferably in the range of 15 nm to 400 nm. The diameter of each of the island phase (alpha 2) and the island phase (beta 2) is preferably 50 nm or less, more preferably 30 nm or less, further preferably 20 nm or less.

In order to obtain a structure as mentioned above, appropriate hydrolysis condensation of at least part of the compound (L) need to occur prior to the crosslinking reaction between the compound (L) and the polymer (P). For this, it is possible to employ the methods, such as a method of using a specific compound (L) together with the polymer (P) in an appropriate ratio, a method of subjecting at least part of the compound (L) to hydrolysis condensation before mixing it with the polymer (P), and a method of using an appropriate catalyst for hydrolysis condensation. As a result of studies, the inventors have found that the gas barrier layer has a more preferred microstructure by adding the compound ($L^1$)-based components to be mentioned later or a reaction product thereof with an acid, after mixing the hydrolyzed condensate of the compound ($L^2$) with the polymer (P).

Further, it has been found that, when specific production conditions are employed, a region containing a high proportion of the hydrolyzed condensate of the compound (L) is formed in the form of a layer on the surface of the gas barrier layer. Hereinafter, the layer of the hydrolyzed condensate of the compound (L) formed on the surface of the gas barrier layer may be referred to as a "skin layer". The formation of the skin layer improves the hot-water resistance of the surface of the gas barrier layer. The skin layer formed of the hydrolyzed condensate of the compound (L) gives hydrophobic properties to the surface of the gas barrier layer. To the layered product, it can give properties to suppress more effectively the adhesion between the gas barrier layers even when the gas barrier layers are stacked on each other in a water-wet state. Further, it is surprising that, even when the skin layer having hydrophobic properties is formed on the surface of the gas barrier layer, the wettability of the surface by a printing ink, etc., is still good. The presence or absence of the skin layer on the gas barrier layer or the state of the skin layer to be formed thereon differs depending on the production conditions. As a result of studies, the inventors have found that the contact angle of the gas barrier layer with water and a preferred skin layer are correlated, and a preferred skin layer is formed when the contact angle satisfies the following conditions. When the contact angle of the gas barrier layer with water is less than 15°, the skin layer cannot be formed sufficiently in some cases. In such a case, the surface of the gas barrier layer easily swells in water, in which the layered products that have been stacked on each other in a water-wet state for a while may adhere to each other in rare cases. When the contact angle of the gas barrier layer is 15° or more, the skin layer can be formed sufficiently, so that the surface of the gas barrier layer is difficult to swell in water. Thus, the adhesion can be suppressed more effectively. The contact angle of the gas barrier layer with water is preferably 20° or more, further preferably 22° or more. Further, when the contact angle exceeds 65°, the thickness of the skin layer increases excessively, and thus the transparency of the layered product tends to decrease. Accordingly, the contact angle is preferably not more than 65°, more preferably not more than 60°, further preferably not more than 58°.

<Base>

The base included in the layered product of the present invention is not specifically limited, and bases made of various materials can be used as the base. Examples of the base to be used include: resin films such as a thermoplastic resin film and a thermosetting resin film; fiber assembly such as fabrics and papers; wood; and films made of a metal oxide, a metal, or the like. Among them, a thermoplastic resin film is particularly useful as the base of the layered product to be used for a food packaging material. The base may further include a paper layer. A layered product for a paper container can be obtained by using a base material including a paper layer. The base may have a single layer structure, or a multilayer structure composed of a plurality of materials.

Examples of the thermoplastic resin film include films to be obtained by forming: polyolefin resins such as polyethylene and polypropylene; polyester resins such as polyethylene terephthalate, polyethylene-2,6-naphthalate, polybutylene terephthalate, and copolymers thereof, polyamide resins such as nylon 6, nylon 66, and nylon 12; polystyrene, poly(meth) acrylic ester, polyacrylonitrile, polyvinyl acetate, polycarbonate, polyarylate, regenerated cellulose, polyimide, polyetherimide, polysulfone, polyethersulfone, polyetheretherketone, and ionomer resins. Preferred examples of the base of the layered product to be used for a food packaging material include films made of polyethylene, polypropylene, polyethylene terephthalate, nylon 6, and nylon 66.

The thermoplastic resin film may be a stretched film or may be an unstretched film. Stretched films, particularly biaxially stretched films, are preferred because these films allow the layered product of the present invention to have excellent processability (e.g., in printing or lamination). The biaxially stretched film may be produced using any method such as simultaneous biaxial stretching, sequential biaxial stretching, and tubular stretching.

The thickness of the base also is not particularly limited. The thickness of the base is preferably in the range of 1 to 200 μm, more preferably in the range of 5 to 100 μm, further preferably in the range of 7 to 50 μm, because such thickness allows good workability or mechanical strength of the layered product to be obtained.

<Base and Gas Barrier Layer>

In the layered product of the present invention, the gas barrier layer is stacked on at least one surface of the base. In the case where the base is in the form of a film (in the form of a layer), the gas barrier layer may be stacked only on one surface of the base or may be stacked on both surfaces of the base. When the gas barrier layer is stacked on each of both surfaces of the base, the compositions of gas barrier layers stacked on the respective surfaces may be the same or different from each other. There are cases where the layered product with particularly excellent performance can be obtained by stacking gas barrier layers each having a different composition on both surfaces of the base.

Consideration is given herein to the case where the base is in the form of a film. First, in the gas barrier layer stacked on one surface of the base (which may hereinafter be referred to as "first gas barrier layer"), the total number of moles of the amino group in the "organic group having amino group" contained in the compound ($L^1$) is referred to as NA1, and the total number of moles of the —COO— group in the functional group (C) contained in the polymer (P) is referred to as NC1. Meanwhile, in the gas barrier layer stacked on the other surface of the base (which may hereinafter be referred to as "second gas barrier layer"), the total number of moles of the amino group in the "organic group having amino group" contained in the compound ($L^1$) is referred to as NA2, and the total number of moles of the —COO— group in the functional group (C) contained in the polymer (P) is referred to as NC2. In this case, when both of 0.4/100≤(NA1/NC1)≤2.0/100 and 2.0/100≤(NA2/NC2)<11.0/100 are satisfied, the hot-water resistance of the resultant layered product is further improved. The value of NA1/NC1 is more preferably in the range of 0.8/100 to 1.9/100, further preferably in the range of 0.9/100 to 1.8/100. On the other hand, the value of NA2/NC2 is more preferably in the range of 3.0/100 to 8.0/100, further preferably in the range of 4.0/100 to 6.0/100.

<Adhesive layer (H)>

In the layered product of the present invention, the base and the gas barrier layer may be in contact directly with each other, or the gas barrier layer may be stacked on the base with an adhesive layer (H) being interposed between the base and the gas barrier layer. This configuration can improve the adhesiveness between the base and the gas barrier layer. The adhesive layer (H) can be formed of an adhesive resin. The adhesive layer (H) made of an adhesive resin can be formed by treating the surface of the base with a known anchor coating agent, or coating the surface of the base with a known adhesive. As a result of the studies on various adhesive resins, it has been found that an adhesive resin containing a urethane bond with the proportion of nitrogen atom (nitrogen atom of the urethane bond) in the range of 0.5 to 12 mass % in the entire resin is preferred. The adhesiveness between the base and the gas barrier layer can be further improved by using such an adhesive resin. Strong adhesion between the base and the gas barrier layer via the adhesive layer (H) can sufficiently suppress deterioration in gas barrier properties and appearance when the layered product of the present invention is subjected to processing such as printing and lamination. The content of the nitrogen atom (nitrogen atom of the urethane bond) in the adhesive resin is more preferably in the range of 2 to 11 mass %, further preferably in the range of 3 to 8 mass %.

As the adhesive resin containing the urethane bond, a two-component reactive polyurethane adhesive in which a polyisocyanate component and a polyol component are mixed together to react with each other is preferred.

The strength of the layered product of the present invention can be improved by increasing the thickness of the adhesive layer (H). However, when the thickness of the adhesive layer (H) is increased excessively, the appearance tends to deteriorate. The thickness of the adhesive layer (H) is preferably in the range of 0.03 to 0.18 μm. Such an adhesive layer can sufficiently suppress deterioration in gas barrier properties and appearance when the layered product of the present invention is subjected to processing such as printing and lamination. In addition, the drop strength of the packaging material using the layered product of the present invention also can be improved. The thickness of the adhesive layer (H) is more preferably in the range of 0.04 to 0.14 μm, further preferably in the range of 0.05 to 0.10 μm.

<Inorganic Layer>

The layered product of the present invention may further include a layer formed of an inorganic substance (which may hereinafter be referred to as an "inorganic layer"). The inorganic layer can be formed of an inorganic substance such as inorganic oxides. The inorganic layer can be formed by employing vapor phase deposition method such as evaporation method. In the layered product of the present invention, the inorganic layer may be disposed, for example, between the base and the gas barrier layer, or on a portion that is one of the sides adjacent to the gas barrier layer and that is opposite to the side where the base is present.

The inorganic substance that forms the inorganic layer preferably has gas barrier properties against oxygen gas, water vapor, etc., more preferably has transparency. For example, the inorganic layer can be formed of an inorganic oxide such as aluminum oxide, silicon oxide, silicon nitride, silicon carbide, silicon oxynitride, silicon carbonitride, magnesium oxide, tin oxide, or a mixture thereof, an inorganic nitride, an inorganic carbide, etc. Among these, aluminum oxide, silicon oxide, silicon nitride, and magnesium oxide can be used preferably because of their excellent barrier properties against gases such as oxygen gas and water vapor.

Preferred thickness of the inorganic layer varies depending on the kind of the inorganic oxide that forms the inorganic layer, but generally is in the range of 2 to 500 nm. The thickness can be selected from this range such that the layered product has good gas barrier properties and mechanical properties. If the thickness of the inorganic layer is less than 2 nm, the inorganic layer tends to have reduced reproducibility in exhibiting the barrier properties against gases such as oxygen, water vapor, etc., and fails to exhibit satisfactory gas barrier properties in some cases. If the thickness of the inorganic layer exceeds 500 nm, the inorganic layer tends to have reduced gas barrier properties when the layered product is stretched or bent. The thickness of the inorganic layer is preferably in the range of 5 to 200 nm, more preferably in the range of 10 to 100 nm.

The inorganic layer can be formed by depositing an inorganic substance on the base and/or the gas barrier layer. Examples of the formation method include vacuum evaporation, sputtering, ion plating, chemical vapor deposition (CVD), etc. Among these, vacuum evaporation is preferably employed from the viewpoint of productivity. A preferred heating method that is employed for carrying out vacuum evaporation is one of electron beam heating, resistance heating, and induction heating. In order to improve the adhesiveness between the inorganic layer and the base as well as the denseness of the inorganic layer, plasma assisted deposition or ion beam assisted deposition may be employed for the deposition. In order to enhance the transparency of the inorganic layer, reactive evaporation in which a reaction is caused by injecting oxygen gas, for example, may be employed for the evaporation.

<Layer Structure>

The layered product of the present invention may be formed only of the base and the gas barrier layer, or may be formed only of the base, the gas barrier layer, and the adhesive layer (H) and/or the inorganic layer mentioned above. However, the layered product of the present invention may further include layers (e.g., a thermoplastic resin film, and a paper layer) other than those layers. The addition of such other layers can give a heat-sealing properties to the layered product of the present invention or can improve the mechanical properties of the layered product of the present invention.

Examples of the layer structure of the layered product of the present invention in the case of including a thermoplastic resin film or a paper layer are shown below. In the following examples, in order to simplify the description, the indication of "film (layer)" may be omitted and only materials thereof are indicated in some cases.

(1) gas barrier layer/polyester/polyamide/polyolefin
(2) gas barrier layer/polyester/gas barrier layer/polyamide/polyolefin
(3) polyester/gas barrier layer/polyamide/polyolefin
(4) gas barrier layer/polyamide/polyester/polyolefin
(5) gas barrier layer/polyamide/gas barrier layer/polyester/polyolefin
(6) polyamide/gas barrier layer/polyester/polyolefin
(7) gas barrier layer/polyolefin/polyamide/polyolefin
(8) gas barrier layer/polyolefin/gas barrier layer/polyamide/polyolefin
(9) polyolefin/gas barrier layer/polyamide/polyolefin
(10) gas barrier layer/polyolefin/polyolefin
(11) gas barrier layer/polyolefin/gas barrier layer/polyolefin
(12) polyolefin/gas barrier layer/polyolefin
(13) gas barrier layer/polyester/polyolefin
(14) gas barrier layer/polyester/gas barrier layer/polyolefin
(15) polyester/gas barrier layer/polyolefin
(16) gas barrier layer/polyamide/polyolefin
(17) gas barrier layer/polyamide/gas barrier layer/polyolefin
(18) polyamide/gas barrier layer/polyolefin
(19) gas barrier/polyester/paper
(20) gas barrier layer/polyamide/paper
(21) gas barrier layer/polyolefin/paper
(22) polyethylene (PE) layer/paper layer/PE layer/gas barrier layer/polyethylene terephthalate (PET) layer/PE layer
(23) PE layer/paper layer/PE layer/gas barrier layer/polyamide layer/PE layer
(24) PE layer/paper layer/PE layer/gas barrier layer/PE layer
(25) paper layer/PE layer/gas barrier layer/PET layer/PE layer
(26) PE layer/paper layer/gas barrier layer/PE layer
(27) paper layer/gas barrier layer/PET layer/PE layer
(28) paper layer/gas barrier layer/PE layer
(29) gas barrier layer/paper layer/PE layer
(30) gas barrier layer/PET layer/paper layer/PE layer
(31) PE layer/paper layer/PE layer/gas barrier layer/PE layer/a hydroxyl group-containing polymer layer
(32) PE layer/paper layer/PE layer/gas barrier layer/PE layer/polyamide layer
(33) PE layer/paper layer/PE layer/gas barrier layer/PE layer/polyester layer From the viewpoints of the heat sealing properties and mechanical properties of the layered product of the present invention, polypropylene or polyethylene is preferred as the polyolefin, polyethylene terephthalate (PET) is preferred as the polyester, and nylon 6 is preferred as the polyamide. Furthermore, ethylene-vinyl alcohol copolymer is preferred as the hydroxyl group-containing polymer. Another layer, such as an anchor coat layer and a layer formed of an adhesive, may be provided between each two adjacent layers, as required.

According to the present invention, it is possible to obtain the layered product having an oxygen transmission rate of 1.0 ml/(m$^2$·day·atm) or less in an atmosphere of 20° C. and 85% RH.

<Use Application>

The layered product of the present invention has excellent barrier properties against gases such as oxygen, water vapor, carbon dioxide, nitrogen, etc. Particularly, the layered product of the present invention can maintain high barrier properties even after being subjected to retorting under more severe conditions and then being stored under high temperature/high humidity conditions or being subjected to bending. Therefore, the layered product of the present invention can be applied to various use applications. Above all, the layered product of the present invention is preferably used as a packaging material. That is, the packaging material of the present invention includes the layered product of the present invention.

The packaging material of the present invention can be used for various applications, and is preferably used for the applications that require gas barrier properties against gases such as oxygen gas. For instance, the packaging material of the present invention is preferably used for a food packaging material (particularly a packaging material for retort foods). The packaging material of the present invention also can be used as a packaging material for packaging, for example, chemicals such as agricultural chemicals and medicines, medical equipment, industrial materials such as machine parts and precision materials, and clothes, other than as a food packaging material.

The formed product of the present invention is formed using the packaging material of the present invention. That is, the formed product of the present invention includes the layered product of the present invention. The formed product of the present invention may be a vertical form fill seal pouch, a vacuum packaging pouch, a pouch with a spout, a laminated tube container, an infusion bag, a container cover, a paper container, or a vacuum heat insulator.

The formed product of the present invention may be a vertical form fill seal pouch, for example, for packaging foods, beverages, etc., in forms such as liquid, viscous body, powder, solid bulk, or a combination of these. The vertical form fill seal pouch has excellent gas barrier properties, which is less deteriorated even after bending or after retorting. Therefore, the vertical form fill seal pouch can suppress deterioration in the quality of the content over a long period of time.

In the vertical form fill seal pouch as the formed product of the present invention, heat sealing is generally performed. Therefore, it is generally necessary that a heat sealable layer be disposed on a side that serves as the inner portion of the pouch or each of both sides that serve as the inner portion and the outer portion of the pouch, in the layered product that forms the vertical form fill seal pouch. In the case where the heat sealable layer is present only on the side that serves as the inner portion of the pouch, the body part is generally sealed with a butt seam. In the case where the heat sealable layer is present on each of both sides that serve as the inner portion and the outer portion of the pouch, the body part is generally sealed with an envelope-like seam. A polyolefin layer (hereinafter also referred to as a "PO layer") is preferably used as the heat sealable layer.

Hereinafter, a multilayer film including the base and the gas barrier layer formed on the base may be referred to as a gas barrier multilayer film. This gas barrier multilayer film also is one type of the layered product of the present invention. Layers for imparting various properties (e.g., heat sealing properties) may be stacked on the gas barrier multilayer film. For example, the layered product of the present invention may have a structure of gas barrier multilayer film/adhesive layer/polyolefin layer, or a structure of polyolefin layer/adhesive layer/gas barrier multilayer film/adhesive layer/polyolefin layer. That is, the layered product of the present invention may include a polyolefin layer disposed on one top surface. Alternatively, the layered product of the present invention may include a first polyolefin layer disposed on one top surface and a second polyolefin layer disposed on the other top surface. The first polyolefin layer and the second polyolefin layer may be the same or different from each other.

The layered product to be used as the vertical form fill seal pouch may have, for example, the following structure from the layer to serve as the outer portion of the vertical form fill seal pouch toward the layer to serve as the inner portion thereof.

(1) gas barrier multilayer film/PO layer
(2) inorganic material-deposited film layer/gas barrier multilayer film/PO layer
(3) gas barrier multilayer film/inorganic material-deposited film layer/PO layer
(4) gas barrier multilayer film/polyamide layer/PO layer
(5) inorganic material-deposited film layer/gas barrier multilayer film/polyamide layer/PO layer
(6) gas barrier multilayer film/inorganic material-deposited film layer/polyamide layer/PO layer
(7) polyamide layer/gas barrier multilayer film/PO layer
(8) polyamide layer/inorganic material-deposited film layer/gas barrier multilayer film/PO layer
(9) polyamide layer/gas barrier multilayer film/inorganic material-deposited film layer/PO layer
(10) polyamide layer/gas barrier multilayer film/polyamide layer/PO layer
(11) polyamide layer/inorganic material-deposited film layer/gas barrier multilayer film/polyamide layer/PO layer
(12) polyamide layer/gas barrier multilayer film/inorganic material-deposited film layer/polyamide layer/PO layer
(13) polyester layer/gas barrier multilayer film/PO layer
(14) polyester layer/gas barrier multilayer film/polyamide layer/PO layer
(15) polyester layer/inorganic material-deposited film layer/gas barrier multilayer film/PO layer
(16) polyester layer/inorganic material-deposited film layer/gas barrier multilayer film/polyamide layer/PO layer
(17) polyester layer/gas barrier multilayer film/inorganic material-deposited film layer/PO layer
(18) polyester layer/gas barrier multilayer film/inorganic material-deposited film layer/polyamide layer/PO layer
(19) gas barrier multilayer film/EVOH layer/PO layer
(20) gas barrier multilayer film/EVOH layer/polyamide layer/PO layer
(21) PO layer/gas barrier multilayer film/PO layer
(22) PO layer/gas barrier multilayer film/polyamide layer/PO layer
(23) PO layer/polyamide layer/gas barrier multilayer film/PO layer
(24) PO layer/polyester layer/gas barrier multilayer film/PO layer
(25) PO layer/inorganic material-deposited film layer/gas barrier multilayer film/PO layer
(26) PO layer/gas barrier multilayer film/inorganic material-deposited film layer/PO layer
(27) PO layer/polyamide layer/inorganic material-deposited film layer/gas barrier multilayer film/PO layer
(28) PO layer/polyamide layer/gas barrier multilayer film/inorganic material-deposited film layer/PO layer
(29) PO layer/polyamide layer/inorganic material-deposited film layer/gas barrier multilayer film/polyamide layer/PO layer
(30) polyamide layer/gas barrier multilayer film/inorganic material-deposited film layer/polyamide layer/PO layer
(31) PO layer/polyester layer/inorganic material-deposited film layer/gas barrier multilayer film/PO layer
(32) PO layer/polyester layer/inorganic material-deposited film layer/gas barrier multilayer film/polyamide layer/PO layer

(33) PO layer/polyester layer/gas barrier multilayer film/inorganic material-deposited film layer/PO layer
(34) PO layer/polyester layer/gas barrier multilayer film/inorganic material-deposited film layer/polyamide layer/PO layer
(35) PO layer/EVOH layer/gas barrier multilayer film/PO layer
(36) PO layer/EVOH layer/gas barrier multilayer film/polyamide layer/PO layer
(37) PO layer/gas barrier multilayer film/EVOH layer/PO layer
(38) PO layer/gas barrier multilayer film/EVOH layer/polyamide layer/PO layer
(39) gas barrier multilayer film/polyamide layer/EVOH layer/PO layer
(40) polyamide layer/gas barrier multilayer film/EVOH layer/PO layer
(41) polyamide layer/gas barrier multilayer film/EVOH layer/polyamide layer/PO layer
(42) polyamide layer/gas barrier multilayer film/polyamide layer/EVOH layer/PO layer
(43) paper layer/PO layer/gas barrier multilayer film/PO layer
(44) paper layer/PO layer/gas barrier multilayer film/polyamide layer/PO layer
(45) paper layer/PO layer/polyamide layer/gas barrier multilayer film/PO layer
(46) paper layer/PO layer/gas barrier multilayer film/EVOH layer/PO layer
(47) paper layer/PO layer/gas barrier multilayer film/EVOH layer/polyamide layer/PO layer
(48) PO layer/paper layer/PO layer/gas barrier multilayer film/polyolefin layer
(49) PO layer/paper layer/PO layer/gas barrier multilayer film/polyamide layer/PO layer
(50) PO layer/paper layer/PO layer/polyamide layer/gas barrier multilayer film/PO layer
(51) PO layer/paper layer/PO layer/gas barrier multilayer film/EVOH layer/PO layer
(52) PO layer/paper layer/PO layer/gas barrier multilayer film/EVOH layer/polyamide layer/PO layer Particularly preferred examples of the structure of the layered product as the vertical form fill seal pouch include structures of gas barrier multilayer film/polyamide layer/PO layer, gas barrier multilayer film/PO layer, and PO layer/gas barrier multilayer film/PO layer. In these structures, a polyamide film, for example, can be used as the base of the gas barrier multilayer film. The vertical form fill seal pouch exhibits particularly excellent gas barrier properties after pouch forming, after heat sterilization, and after heat sterilization/transportation. An adhesive layer may be provided between each two adjacent layers that form the above-mentioned vertical form fill seal pouch. In the case where the layered product of the present invention is provided on one surface of the base of the gas barrier layer, the gas barrier layer may face either the inside or outside of the vertical form fill seal pouch.

The formed product of the present invention may be a vacuum packaging pouch for packaging foods containing solids, etc. The vacuum packaging pouch has excellent gas barrier properties, which is less deteriorated even after bending or after retorting. Therefore, the gas barrier properties of the vacuum packaging pouch are hardly deteriorated by deformation during vacuum packaging/heat sterilization. The vacuum packaging pouch is flexible and is easily adhered closely to foods containing solids. Therefore, it can be degassed easily at the time of vacuum packaging. Accordingly, the vacuum packaging pouch can reduce the residual oxygen inside the vacuum packaging pouch, and thus is excellent in giving a long shelf life of foods. Further, angulated or folded portions are less likely to occur after vacuum packaging, and therefore defects such as pinholes or cracks are less likely to occur. Furthermore, the vacuum packaging pouch can suppress the occurrence of pinholes resulting from the abrasion of the vacuum packaging pouches against each other, or the vacuum packaging pouches against a cardboard. Moreover, the vacuum packaging pouch has excellent gas barrier properties and thus can suppress deterioration in the quality of the content (e.g., foods) over a long period of time.

The layered product to be used as the above-mentioned vacuum packaging pouch may have, for example, the following structure from the layer to serve as the outer portion of the vacuum packaging pouch toward the layer to serve as the inner portion thereof.
(1) gas barrier multilayer film/PO layer
(2) inorganic material-deposited film layer/gas barrier multilayer film/PO layer
(3) gas barrier multilayer film/inorganic material-deposited film layer/PO layer
(4) PO layer/gas barrier multilayer film/PO layer
(5) gas barrier multilayer film/polyamide layer/PO layer
(6) inorganic material-deposited film layer/gas barrier multilayer film/polyamide layer/PO layer
(7) gas barrier multilayer film/inorganic material-deposited film layer/polyamide layer/PO layer
(8) polyamide layer/gas barrier multilayer film/PO layer
(9) polyamide layer/inorganic material-deposited film layer/gas barrier multilayer film/PO layer
(10) polyamide layer/gas barrier multilayer film/inorganic material-deposited film layer/PO layer
(11) polyamide layer/gas barrier multilayer film/polyamide layer/PO layer
(12) polyamide layer/inorganic material-deposited film layer/gas barrier multilayer film/polyamide layer/PO layer
(13) polyamide layer/gas barrier multilayer film/inorganic material-deposited film layer/polyamide layer/PO layer
(14) polyester layer/gas barrier multilayer film/PO layer
(15) polyester layer/inorganic material-deposited film layer/gas barrier multilayer film/PO layer
(16) polyester layer/gas barrier multilayer film/inorganic material-deposited film layer/PO layer
(17) gas barrier multilayer film/EVOH layer/PO layer
(18) PO layer/EVOH layer/gas barrier multilayer film/PO layer
(19) PO layer/gas barrier multilayer film/EVOH layer/PO layer
(20) gas barrier multilayer film/EVOH layer/polyamide layer/PO layer
(21) gas barrier multilayer film/polyamide layer/EVOH layer/PO layer
(22) gas barrier multilayer film/polyamide layer/PO layer
(23) polyamide layer/gas barrier multilayer film/EVOH layer/PO layer
(24) polyamide layer/gas barrier multilayer film/EVOH layer/polyamide layer/PO layer
(25) polyamide layer/gas barrier multilayer film/polyamide layer/EVOH layer/PO layer Particularly preferred examples of the structure of the layered product as the vacuum packaging pouch include structures of gas barrier multilayer film/polyamide layer/PO layer, and polyamide layer/gas barrier multilayer film/PO layer. In these structures, a polyamide film, for example, can be used as the base of the gas barrier multilayer film. The vacuum packaging pouch using such a layered product has particularly excellent gas barrier properties after vacuum packaging, and after vacuum packaging/heat sterilization. An adhesive layer may be provided between each two adjacent layers in the above-mentioned layers. In the case where the gas barrier layer is stacked only on one surface of the base, the gas barrier layer may be disposed either internally or externally of the vacuum packaging pouch with respect to the base.

The formed product of the present invention may be a pouch with a spout for packaging various liquid substances. The pouch with the spout can be used as a container for liquid beverages (e.g., soft drinks), jelly drinks, yogurts, fruit sources, seasonings, functional water, liquid diets, etc. Further, the pouch with the spout can be used preferably also as a container for liquid medical products such as amino acid infusion, electrolyte infusion, carbohydrate infusion, and fat emulsions for infusion. The pouch with the spout has excellent gas barrier properties, which is less deteriorated even after bending or after retorting. Therefore, the use of the pouch with the spout can prevent alteration of the content by oxygen, before retorting, during retorting, after retorting, after transportation, and after long-term storage. Further, the pouch with the spout has good transparency, which makes it easy to identify the content, or check for alteration of the content resulting from deterioration.

The layered product to be used as the above-mentioned pouch with the spout may have, for example, the following structure from the layer to serve as the outer portion of the pouch with the spout toward the layer to serve as the inner portion thereof.

(1) gas barrier multilayer film/PO layer
(2) inorganic material-deposited film layer/gas barrier multilayer film/PO layer
(3) gas barrier multilayer film/inorganic material-deposited film layer/PO layer
(4) PO layer/gas barrier multilayer film/PO layer
(5) gas barrier multilayer film/polyamide layer/PO layer
(6) inorganic material-deposited film layer/gas barrier multilayer film/polyamide layer/PO layer
(7) gas barrier multilayer film/inorganic material-deposited film layer/polyamide layer/PO layer
(8) polyamide layer/gas barrier multilayer film/PO layer
(9) polyamide layer/inorganic material-deposited film layer/gas barrier multilayer film/PO layer
(10) polyamide layer/gas barrier multilayer film/inorganic material-deposited film layer/PO layer
(11) polyamide layer/gas barrier multilayer film/polyamide layer/PO layer
(12) polyamide layer/inorganic material-deposited film layer/gas barrier multilayer film/polyamide layer/PO layer
(13) polyamide layer/gas barrier multilayer film/inorganic material-deposited film layer/polyamide layer/PO layer
(14) polyester layer/gas barrier multilayer film/PO layer
(15) polyester layer/inorganic material-deposited film layer/gas barrier multilayer film/PO layer
(16) polyester layer/gas barrier multilayer film/inorganic material-deposited film layer/PO layer
(17) gas barrier multilayer film/EVOH layer/PO layer
(18) PO layer/EVOH layer/gas barrier multilayer film/PO layer
(19) PO layer/gas barrier multilayer film/EVOH layer/PO layer
(20) gas barrier multilayer film/EVOH layer/polyamide layer/PO layer
(21) gas barrier multilayer film/polyamide layer/EVOH layer/PO layer
(22) gas barrier multilayer film/polyamide layer/PO layer
(23) polyamide layer/gas barrier multilayer film/EVOH layer/PO layer
(24) polyamide layer/gas barrier multilayer film/EVOH layer/polyamide layer/PO layer
(25) polyamide layer/gas barrier multilayer film/polyamide layer/EVOH layer/PO layer Particularly preferred examples of the structure of the layered product as the pouch with the spout include structures of gas barrier multilayer film/polyamide layer/PO layer, and polyamide layer/gas barrier multilayer film/PO layer. An adhesive layer may be provided between each two adjacent layers in the above-mentioned layers. In the case where the gas barrier layer is stacked only on one surface of the base, the gas barrier layer may be disposed either internally or externally of the pouch with the spout with respect to the base.

The formed product of the present invention may be a laminated tube container for packaging cosmetics, chemicals, medical products, foods, toothpastes, and the like. The laminated tube container has excellent gas barrier properties, which is less deteriorated even after bending or after retorting. Thus, the laminated tube container maintains excellent gas barrier properties even after being squeezed in use. Further, the laminated tube container has good transparency, which makes it easy to identify the content, or check for alteration of the content resulting from deterioration.

The layer to serve as the internal portion of the above-mentioned laminated tube container is preferably a polyolefin layer from the viewpoint of the heat sealing properties. The layered product to be used as the above-mentioned laminated tube container may have, for example, the following structure from the layer to serve as the outer portion of the laminated tube container toward the layer to serve as the inner portion thereof.

(1) PO layer/gas barrier multilayer film/PO layer
(2) PO layer/gas barrier multilayer film/inorganic material-deposited film layer/PO layer
(3) PO layer/inorganic material-deposited film layer/gas barrier multilayer film/PO layer
(4) PO layer/pigment-containing PO layer/PO layer/gas barrier multilayer film/PO layer
(5) PO layer/pigment-containing PO layer/PO layer/gas barrier multilayer film/inorganic material-deposited film layer/PO layer
(6) PO layer/pigment-containing PO layer/PO layer/inorganic material-deposited film layer/gas barrier multilayer film/PO layer
(7) PO layer/polyamide layer/gas barrier multilayer film/PO layer
(8) PO layer/polyamide layer/gas barrier multilayer film/inorganic material-deposited film layer/PO layer
(9) PO layer/polyamide layer/inorganic material-deposited film layer/gas barrier multilayer film/PO layer
(10) PO layer/pigment-containing PO layer/PO layer/polyamide layer/gas barrier multilayer film/PO layer
(11) PO layer/pigment-containing PO layer/PO layer/polyamide layer/gas barrier multilayer film/inorganic material-deposited film layer/PO layer
(12) PO layer/pigment-containing PO layer/PO layer/polyamide layer/inorganic material-deposited film layer/gas barrier multilayer film/PO layer
(13) PO layer/gas barrier multilayer film/ethylene-vinyl alcohol copolymer layer (hereinafter, referred to as EVOH layer)/PO layer
(14) PO layer/gas barrier multilayer film/inorganic material-deposited film layer/EVOH layer/PO layer
(15) PO layer/inorganic material-deposited film layer/gas barrier multilayer film/EVOH layer/PO layer
(16) PO layer/pigment-containing PO layer/PO layer/gas barrier multilayer film/EVOH layer/PO layer

(17) PO layer/pigment-containing PO layer/PO layer/gas barrier multilayer film/inorganic material-deposited film layer/EVOH layer/PO layer
(18) PO layer/pigment-containing PO layer/PO layer/inorganic material-deposited film layer/gas barrier multilayer film/EVOH layer/PO layer
(19) PO layer/polyamide layer/gas barrier multilayer film/EVOH layer/PO layer
(20) PO layer/polyamide layer/gas barrier multilayer film/inorganic material-deposited film layer/EVOH layer/PO layer
(21) PO layer/polyamide layer/inorganic material-deposited film layer/gas barrier multilayer film/EVOH layer/PO layer
(22) PO layer/pigment-containing PO layer/PO layer/polyamide layer/gas barrier multilayer film/EVOH layer/PO layer
(23) PO layer/pigment-containing PO layer/PO layer/polyamide layer/gas barrier multilayer film/inorganic material-deposited film layer/EVOH layer/PO layer
(24) PO layer/pigment-containing PO layer/PO layer/polyamide layer/inorganic material-deposited film layer/gas barrier multilayer film/EVOH layer/PO layer Particularly preferred examples of the structure as the laminated tube container include structures of PO layer/gas barrier multilayer film/PO layer, and PO layer/pigment-containing PO layer/PO layer/gas barrier multilayer film/PO layer. An adhesive layer may be provided between each two adjacent layers in the above-mentioned layers. In the case where the gas barrier layer is stacked only on one surface of the base, the gas barrier layer may be disposed either internally or externally of the laminated tube container with respect to the base.

The formed product of the present invention may be an infusion bag to be filled, for example, with a liquid medical product such as amino acid infusion, electrolyte infusion, carbohydrate infusion, fat emulsions for infusion. The infusion bag has excellent gas barrier properties, which is less deteriorated even after bending or after retorting. Therefore, the infusion bag can prevent alteration of the liquid medical product filled therein by oxygen, before heat sterilization, during heat sterilization, after heat sterilization, after transportation, and after storage.

The layered product to be used as the above-mentioned infusion bag may have, for example, the following structure from the layer to serve as the outer portion of the infusion bag toward the layer to serve as the inner portion thereof.
(1) gas barrier multilayer film/PO layer
(2) inorganic material-deposited film layer/gas barrier multilayer film/PO layer
(3) gas barrier multilayer film/inorganic material-deposited film layer/PO layer
(4) inorganic material-deposited film layer/PO layer/gas barrier multilayer film/PO layer
(5) PO layer/inorganic material-deposited film layer/gas barrier multilayer film/PO layer
(6) PO layer/gas barrier multilayer film/inorganic material-deposited film layer/PO layer
(7) gas barrier multilayer film/polyamide layer/PO layer
(8) inorganic material-deposited film layer/gas barrier multilayer film/polyamide layer/PO layer
(9) gas barrier multilayer film/inorganic material-deposited film layer/polyamide layer/PO layer
(10) gas barrier multilayer film/polyamide layer/inorganic material-deposited film layer/PO layer
(11) polyamide layer/gas barrier multilayer film/PO layer
(12) inorganic material-deposited film layer/polyamide layer/gas barrier multilayer film/PO layer
(13) polyamide layer/inorganic material-deposited film layer/gas barrier multilayer film/PO layer
(14) polyamide layer/gas barrier multilayer film/inorganic material-deposited film layer/PO layer
(15) PO layer/gas barrier multilayer film/polyamide layer/PO layer
(16) inorganic material-deposited film layer/PO layer/gas barrier multilayer film/polyamide layer/PO layer
(17) PO layer/inorganic material-deposited film layer/gas barrier multilayer film/polyamide layer/PO layer
(18) PO layer/gas barrier multilayer film/inorganic material-deposited film layer/polyamide layer/PO layer
(19) PO layer/gas barrier multilayer film/polyamide layer/inorganic material-deposited film layer/PO layer
(20) PO layer/polyamide layer/gas barrier multilayer film/PO layer
(21) inorganic material-deposited film layer/PO layer/polyamide layer/gas barrier multilayer film/PO layer
(22) PO layer/inorganic material-deposited film layer/polyamide layer/gas barrier multilayer film/PO layer
(23) PO layer/polyamide layer/inorganic material-deposited film layer/gas barrier multilayer film/PO layer
(24) PO layer/polyamide layer/gas barrier multilayer film/inorganic material-deposited film layer/PO layer
(25) gas barrier multilayer film/thermoplastic elastomer layer
(26) inorganic material-deposited film layer/gas barrier multilayer film/thermoplastic elastomer layer
(27) gas barrier multilayer film/inorganic material-deposited film layer/thermoplastic elastomer layer
(28) thermoplastic elastomer layer/gas barrier multilayer film/thermoplastic elastomer layer
(29) inorganic material-deposited film layer/thermoplastic elastomer layer/gas barrier multilayer film/thermoplastic elastomer layer
(30) thermoplastic elastomer layer/inorganic material-deposited film layer/gas barrier multilayer film/thermoplastic elastomer layer
(31) thermoplastic elastomer layer/gas barrier multilayer film/inorganic material-deposited film layer/thermoplastic elastomer layer
(32) gas barrier multilayer film/thermoplastic elastomer layer/PO layer
(33) gas barrier multilayer film/inorganic material-deposited film layer/thermoplastic elastomer layer/PO layer
(34) gas barrier multilayer film/thermoplastic elastomer layer/inorganic material-deposited film layer/PO layer
(35) thermoplastic elastomer layer/gas barrier multilayer film/PO layer
(36) inorganic material-deposited film layer/thermoplastic elastomer layer/gas barrier multilayer film/PO layer
(37) thermoplastic elastomer layer/inorganic material-deposited film layer/gas barrier multilayer film/PO layer
(38) thermoplastic elastomer layer/gas barrier multilayer film/inorganic material-deposited film layer/PO layer
(39) thermoplastic elastomer layer/gas barrier multilayer film/thermoplastic elastomer layer/PO layer
(40) inorganic material-deposited film layer/thermoplastic elastomer layer/gas barrier multilayer film/thermoplastic elastomer layer/PO layer
(41) thermoplastic elastomer layer/inorganic material-deposited film layer/gas barrier multilayer film/thermoplastic elastomer layer/PO layer
(42) thermoplastic elastomer layer/gas barrier multilayer film/inorganic material-deposited film layer/thermoplastic elastomer layer/PO layer

(43) thermoplastic elastomer layer/gas barrier multilayer film/thermoplastic elastomer layer/inorganic material-deposited film layer/PO layer
(44) PO layer/gas barrier multilayer film/thermoplastic elastomer layer/PO layer
(45) inorganic material-deposited film layer/PO layer/gas barrier multilayer film/thermoplastic elastomer layer/PO layer
(46) PO layer/gas barrier multilayer film/inorganic material-deposited film layer/thermoplastic elastomer layer/PO layer
(47) PO layer/gas barrier multilayer film/thermoplastic elastomer layer/inorganic material-deposited film layer/PO layer
(48) PO layer/thermoplastic elastomer layer/gas barrier multilayer film/PO layer
(49) inorganic material-deposited film layer/PO layer/thermoplastic elastomer layer/gas barrier multilayer film/PO layer
(50) PO layer/thermoplastic elastomer layer/inorganic material-deposited film layer/gas barrier multilayer film/PO layer
(51) PO layer/thermoplastic elastomer layer/gas barrier multilayer film/inorganic material-deposited film layer/PO layer
(52) PO layer/thermoplastic elastomer layer/gas barrier multilayer film/thermoplastic elastomer layer/PO layer
(53) inorganic material-deposited film layer/PO layer/thermoplastic elastomer layer/gas barrier multilayer film/thermoplastic elastomer layer/PO layer
(54) PO layer/inorganic material-deposited film layer/thermoplastic elastomer layer/gas barrier multilayer film/thermoplastic elastomer layer/PO layer
(55) PO layer/thermoplastic elastomer layer/inorganic material-deposited film layer/gas barrier multilayer film/thermoplastic elastomer layer/PO layer
(56) PO layer/thermoplastic elastomer layer/gas barrier multilayer film/inorganic material-deposited film layer/thermoplastic elastomer layer/PO layer
(57) PO layer/thermoplastic elastomer layer/gas barrier multilayer film/thermoplastic elastomer layer/inorganic material-deposited film layer/PO layer Particularly preferred examples of the structure of the layered product as the infusion bag include structures of gas barrier multilayer film/polyamide layer/PO layer, and polyamide layer/gas barrier multilayer film/PO layer. An adhesive layer may be provided between each two adjacent layers in the above-mentioned layers. In the case where the gas barrier layer is stacked only on one surface of the base, the gas barrier layer may be disposed either internally or externally of the infusion bag with respect to the base.

The formed product of the present invention may be a cover for a container to be filled with foods such as processed foods of meat, processed foods of vegetables, processed foods of marine products, and fruits. The container cover has excellent gas barrier properties, which is less deteriorated even after bending or after retorting. Thus, the container cover can suppress deterioration in the quality of foods as the content over a long period of time. The container cover is used preferably as a cover for a container that is used for storing contents such as foods, particularly as a cover for a container to be subjected to heat sterilization such as boiling sterilization and retort sterilization.

The layered product used as the above-mentioned container cover may have, for example, the following structure from the layer to serve as the outer portion of the container cover toward the layer to serve as the internal portion thereof (container side).
(1) gas barrier multilayer film/PO layer
(2) inorganic material-deposited film layer/gas barrier multilayer film/PO layer
(3) gas barrier multilayer film/inorganic material-deposited film layer/PO layer
(4) gas barrier multilayer film/polyamide layer/PO layer
(5) inorganic material-deposited film layer/gas barrier multilayer film/polyamide layer/PO layer
(6) gas barrier multilayer film/inorganic material-deposited film layer/polyamide layer/PO layer
(7) polyamide layer/gas barrier multilayer film/PO layer
(8) polyamide layer/inorganic material-deposited film layer/gas barrier multilayer film/PO layer
(9) polyamide layer/gas barrier multilayer film/inorganic material-deposited film layer/PO layer
(10) polyamide layer/gas barrier multilayer film/polyamide layer/PO layer
(11) polyamide layer/inorganic material-deposited film layer/gas barrier multilayer film/polyamide layer/PO layer
(12) polyamide layer/gas barrier multilayer film/inorganic material-deposited film layer/polyamide layer/PO layer
(13) polyester layer/gas barrier multilayer film/PO layer
(14) polyester layer/gas barrier multilayer film/polyamide layer/PO layer
(15) polyester layer/inorganic material-deposited film layer/gas barrier multilayer film/PO layer
(16) polyester layer/inorganic material-deposited film layer/gas barrier multilayer film/polyamide layer/PO layer
(17) polyester layer/gas barrier multilayer film/inorganic material-deposited film layer/PO layer
(18) polyester layer/gas barrier multilayer film/inorganic material-deposited film layer/polyamide layer/PO layer
(19) gas barrier multilayer film/EVOH layer/PO layer
(20) gas barrier multilayer film/EVOH layer/polyamide layer/PO layer
(21) PO layer/EVOH layer/gas barrier multilayer film/PO layer
(22) PO layer/EVOH layer/gas barrier multilayer film/polyamide layer/PO layer
(23) PO layer/gas barrier multilayer film/EVOH layer/PO layer
(24) PO layer/gas barrier multilayer film/EVOH layer/polyamide layer/PO layer
(25) gas barrier multilayer film/polyamide layer/EVOH layer/PO layer
(26) gas barrier multilayer film/polyamide layer/PO layer
(27) polyamide layer/gas barrier multilayer film/EVOH layer/PO layer
(28) polyamide layer/gas barrier multilayer film/EVOH layer/polyamide layer/PO layer
(29) polyamide layer/gas barrier multilayer film/polyamide layer/EVOH layer/PO layer
(30) paper layer/PO layer/gas barrier multilayer film/PO layer
(31) paper layer/PO layer/gas barrier multilayer film/polyamide layer/PO layer
(32) paper layer/PO layer/polyamide layer/gas barrier multilayer film/PO layer
(33) paper layer/PO layer/gas barrier multilayer film/EVOH layer/PO layer
(34) paper layer/PO layer/gas barrier multilayer film/EVOH layer/polyamide layer/PO layer
(35) PO layer/paper layer/PO layer/gas barrier multilayer film/PO layer
(36) PO layer/paper layer/PO layer/gas barrier multilayer film/polyamide layer/PO layer
(37) PO layer/paper layer/PO layer/polyamide layer/gas barrier multilayer film/PO layer
(38) PO layer/paper layer/PO layer/gas barrier multilayer film/EVOH layer/PO layer

(39) PO layer/paper layer/PO layer/gas barrier multilayer film/EVOH layer/polyamide layer/PO layer Particularly preferred examples of the structure of the layered product as the container cover include structures of gas barrier multilayer film/polyamide layer/PO layer, and gas barrier multilayer film/PO layer. In these structures, a polyamide film, for example, can be used as the base of the gas barrier multilayer film. The cover having such a structure has particularly excellent gas barrier properties after heat sterilization, or after heat sterilization/transportation. An adhesive layer may be provided between each two adjacent layers in the above-mentioned layers. In the case where the gas barrier layer is present only on one surface of the base, the gas barrier layer may be disposed either internally (on the container side) or externally with respect to the base.

The formed product of the present invention may be a paper container. The gas barrier properties of the paper container are less deteriorated even after being subjected to folding or retorting. The paper container is preferably used for a container with a window because of its good transparency of the gas barrier layer after retorting. Further, the paper container is suitable for microwave heating.

The layered product to be used as the above-mentioned paper container may have, for example, the following structure from the layer to serve as the outer portion of the paper container toward the layer to serve as the inner portion thereof.

(1) heat resistant polyolefin layer/paper layer/heat resistant polyolefin layer/gas barrier multilayer film/heat resistant polyolefin layer
(2) heat resistant polyolefin layer/paper layer/heat resistant polyolefin layer/gas barrier multilayer film/heat resistant polyolefin layer/a hydroxyl group-containing polymer layer
(3) heat resistant polyolefin layer/paper layer/heat resistant polyolefin layer/gas barrier multilayer film/heat resistant polyolefin layer/polyester layer
(4) heat resistant polyolefin layer/paper layer/heat resistant polyolefin layer/gas barrier multilayer film/heat resistant polyolefin layer/polyamide layer
(5) heat resistant polyolefin layer/paper layer/heat resistant polyolefin layer/biaxially stretched heat resistant polyolefin layer/gas barrier multilayer film/heat resistant polyolefin layer
(6) heat resistant polyolefin layer/paper layer/heat resistant polyolefin layer/biaxially stretched heat resistant polyolefin layer/gas barrier multilayer film/heat resistant polyolefin layer/a hydroxyl group-containing polymer layer
(7) heat resistant polyolefin layer/paper layer/heat resistant polyolefin layer/biaxially stretched heat resistant polyolefin layer/gas barrier multilayer film/heat resistant polyolefin layer/polyester layer
(8) heat resistant polyolefin layer/paper layer/heat resistant polyolefin layer/biaxially stretched heat resistant polyolefin layer/gas barrier multilayer film/heat resistant polyolefin layer/polyamide layer
(9) paper layer/heat resistant polyolefin layer/gas barrier multilayer film/heat resistant polyolefin layer
(10) paper layer/heat resistant polyolefin layer/gas barrier multilayer film/heat resistant polyolefin layer/a hydroxyl group-containing polymer layer
(11) paper layer/heat resistant polyolefin layer/gas barrier multilayer film/heat resistant polyolefin layer/polyester layer
(12) paper layer/heat resistant polyolefin layer/gas barrier multilayer film/heat resistant polyolefin layer/polyamide layer
(13) heat resistant polyolefin layer/paper layer/gas barrier multilayer film/heat resistant polyolefin layer
(14) heat resistant polyolefin layer/paper layer/gas barrier multilayer film/heat resistant polyolefin layer/a hydroxyl group-containing polymer layer
(15) heat resistant polyolefin layer/paper layer/gas barrier multilayer film/heat resistant polyolefin layer/polyester layer
(16) paper layer/gas barrier multilayer film/heat resistant polyolefin layer/polyamide layer
(17) gas barrier multilayer film/paper layer/heat resistant polyolefin layer
(18) gas barrier multilayer film/paper layer/heat resistant polyolefin layer/a hydroxyl group-containing polymer layer
(19) gas barrier multilayer film/paper layer/heat resistant polyolefin layer/polyester layer
(20) gas barrier multilayer film/paper layer/heat resistant polyolefin layer/polyamide layer Particularly preferred examples of the structure of the layered product as the paper container include a structure of heat resistant polyolefin layer/paper layer/heat resistant polyolefin layer/gas barrier multilayer film/heat resistant polyolefin layer. An adhesive layer may be provided between each two adjacent layers in the above-mentioned layers. In the above-mentioned examples, the heat resistant polyolefin layer, for example, is composed of either a biaxially stretched heat resistant polyolefin film or an unstretched heat resistant polyolefin film. The heat resistant polyolefin layer to be disposed as the most outer layer of the layered product is preferably an unstretched polypropylene film because of ease of forming. The heat resistant polyolefin layer to be disposed internally to the most outer layer of the layered product also is preferably an unstretched polypropylene film. In a preferred example, every heat resistant polyolefin layer that forms the layered product is an unstretched polypropylene film.

The formed product of the present invention may be a vacuum heat insulator usable in various applications that require a cooling or warming effect. Such a vacuum heat insulator can maintain a heat-insulating effect over a long period of time, and thus can be used as a heat insulator for home appliances, such as a refrigerator, a hot water supply unit, and a rice cooker, a residential heat insulator for walls, ceilings, attics, floor parts, etc., a vehicle roof material, and a heat-insulating panel for vending machines.

The layered product to be used as the above-mentioned vacuum heat insulator may have, for example, the following structure from the layer to serve as the outer portion of the vacuum heat insulator toward the layer to serve as the inner portion thereof.

(1) gas barrier multilayer film/PO layer
(2) gas barrier multilayer film/gas barrier properties resin layer/PO layer
(3) gas barrier multilayer film/polyamide layer/PO layer
(4) polyamide layer/gas barrier multilayer film/PO layer
(5) polyamide layer/gas barrier multilayer film/polyester layer/PO layer
(6) gas barrier multilayer film/polyamide layer/gas barrier properties resin layer/PO layer
(7) polyamide layer/gas barrier multilayer film/gas barrier properties resin layer/PO layer
(8) gas barrier multilayer film/polyester layer/PO layer
(9) polyester layer/gas barrier multilayer film/PO layer
(10) gas barrier multilayer film/polyester layer/gas barrier properties resin layer/PO layer
(11) polyester layer/gas barrier multilayer film/gas barrier properties resin layer/PO layer
(12) PO layer/gas barrier multilayer film/PO layer
(13) PO layer/gas barrier multilayer film/gas barrier properties resin layer/PO layer

(14) PO layer/gas barrier multilayer film/polyamide layer/PO layer
(15) PO layer/polyamide layer/gas barrier multilayer film/PO layer
(16) PO layer/gas barrier multilayer film/polyamide layer/gas barrier properties resin layer/PO layer
(17) PO layer/polyamide layer/gas barrier multilayer film/gas barrier properties resin layer/PO layer
(18) PO layer/gas barrier multilayer film/polyester layer/PO layer
(19) PO layer/polyester layer/gas barrier multilayer film/PO layer
(20) PO layer/gas barrier multilayer film/polyester layer/gas barrier properties resin layer/PO layer
(21) PO layer/polyester layer/gas barrier multilayer film/gas barrier properties resin layer/PO layer Particularly preferred examples of the structure of the layered product as the vacuum heat insulator include structures of gas barrier multilayer film/polyamide layer/PO layer, and polyamide layer/gas barrier multilayer film/PO layer. An adhesive layer may be provided between each two adjacent layers in the above-mentioned layers. In the case where the gas barrier layer is stacked only on one surface of the base, the gas barrier layer may be disposed either internally or externally of the vacuum heat insulator with respect to the base.

<Method for Producing the Layered Product>

Hereinafter, a method for producing the layered product of the present invention (production method of the present invention) is described. According to this method, the layered product of the present invention can be produced easily. Materials to be used in the production method of the present invention and the structure of the layered product are the same as those described above. Hence, the same descriptions may be omitted in some cases. The descriptions for this production method can be applied to the layered product of the present invention.

The production method of the present invention includes a stacking step and an ionization step to be described below.

In the stacking step, a layer formed of a composition that includes a hydrolyzed condensate of a compound (L) containing a hydrolyzable characteristic group and a polymer (P) and/or a partially neutralized product of the polymer (P) is stacked on a base. The compound (L) includes at least a compound ($L^1$) and a compound ($L^2$). The compound (L) preferably further includes the compound ($L^3$). The types of the compound ($L^1$), the compound ($L^2$), and the compound ($L^3$), and the proportion of these compounds are the same as described above for the composition that forms the gas barrier layer.

In the ionization step subsequent to the stacking step, the layer stacked on the base in the stacking step (which may hereinafter be referred to as a "gas barrier layer-forming layer") is brought into contact with a solution containing an ion (E). This contact can be made, for example, by spraying the solution containing the ion (E) onto the gas barrier layer-forming layer, or immersing the base and the gas barrier layer-forming layer together into the solution containing the ion (E). At least part of the —COO— group in the functional group (C) contained in the polymer (P) and/or the partially neutralized product thereof is neutralized with the above-mentioned ion (E) in the ionization step.

As the partially neutralized product of the polymer (P), a partially neutralized product obtained by neutralizing part of the —COO— group (e.g., 0.1 to 10 mol %) in the functional group (C) contained in the polymer (P) with a monovalent ion (cation) can be used. The degree of neutralization of the —COO— group with the monovalent ion is more preferably in the range of 0.5 to 5 mol %, further preferably in the range of 0.7 to 3 mol %, for good transparency of the resultant layered product. Examples of the monovalent ion include ammonium ion, pyridinium ion, sodium ion, potassium ion, and lithium ion, among which ammonium ion is preferred.

Hereinafter, the stacking step is described in detail. The stacking step preferably includes the following steps (i) to (iv):

(i) preparing a solution (S) that contains at least one selected from the group consisting of the compound ($L^2$), a partial hydrolysate of the compound ($L^2$), a total hydrolysate of the compound ($L^2$), and a partial condensate of a partial hydrolysate of the compound ($L^2$) and a total hydrolysate of the compound ($L^2$) (these may hereinafter be referred to collectively as "compound ($L^2$)-based components");

(ii) preparing a solution (T) by mixing, with the solution (S), at least one selected from the group consisting of a polymer (P') and a partially neutralized product of the polymer (P');

(iii) preparing a solution (U) by mixing, with the solution (T), at least one selected from the group consisting of the compound ($L^1$), a partial hydrolysate of the compound ($L^1$), a total hydrolysate of the compound ($L^1$), a partially hydrolyzed condensate of the compound ($L^1$), a partial condensate of a total hydrolysate of the compound ($L^1$) (these may hereinafter be referred to collectively as "compound ($L^1$)-based components"), and a reaction product of one of the compound ($L^1$)-based components with an acid; and (iv) forming a layer stacked on the base (gas barrier layer-forming layer) using the solution (U).

The above-mentioned polymer (P') means the polymer (P) used in step (ii), and the partially neutralized product of the polymer (P') means the partially neutralized product of the polymer (P) used in step (ii). Hereinafter, each step is described more specifically.

In step (i), the solution (S) is prepared. Specifically, the solution (S) can be prepared, for example, by adding an organic solvent to the compound ($L^2$) as a constituent component of the compound (L) on an as-needed basis, and then adding an acid catalyst, water, and if necessary, an organic solvent thereto. Thereafter, the resultant solution is subjected to hydrolysis and condensation by a technique used in a known sol-gel method. In this way, a solution containing at least one of the compound ($L^2$)-based components is obtained.

Examples of the partially hydrolyzed condensate of the compound ($L^2$) include a partially hydrolyzed condensate of the compound ($L^2$) and the compound ($L^3$) to be mentioned later. Similarly, examples of the partial condensate of the total hydrolysate of the compound ($L^2$) include a partial condensate of a total hydrolysate of the compound ($L^2$) and a total hydrolysate of the compound ($L^3$) to be mentioned later. From another aspect, the partially hydrolyzed condensate of the compound ($L^2$) can be regarded as a partially hydrolyzed condensate of the compound ($L^3$), and the partial condensate of the total hydrolysate of the compound ($L^2$) can likewise be regarded as a partial condensate of a total hydrolysate of the compound ($L^3$).

The solution (S) may further include at least one selected from the group consisting of the compound ($L^3$), a partial hydrolysate of the compound ($L^3$), a total hydrolysate of the compound ($L^3$), a partially hydrolyzed condensate of the compound ($L^3$), and a partial condensate of a total hydrolysate of the compound ($L^3$) (these may hereinafter be referred to collectively as "compound ($L^3$)-based components"). In that case, step (i) preferably includes the following steps (i-a) and (i-b);

(i-a) preparing a solution (W) that includes at least one of the compound ($L^3$)-based components, and a carboxyl group-containing compound (D) having a molecular weight of 100 or less; and (i-b) preparing the solution (S) by mixing, with the solution (W), at least one of the compound ($L^2$)-based components.

In step (i-b), a hydrolyzed condensate (oligomer (O)) of the compound (L) that contains the compound ($L^2$) and the compound ($L^3$) without containing the compound ($L^1$) can be formed.

More specifically, the oligomer (O) obtained by hydrolysis condensation of the compound (L) that contains the compound ($L^2$) and the compound ($L^3$) without containing the compound ($L^1$) can be at least one metal element-containing compound selected from a partially hydrolyzed condensate of the compound (L) and a partial condensate of a total hydrolysate of the compound (L).

In step (i-a), the compound ($L^3$) that forms the compound (L) is preferably hydrolyzed and condensed under specific conditions. Specifically, the compound ($L^3$) is preferably hydrolyzed and condensed in a reaction system that contains the compound ($L^3$), an acid catalyst, water, and if necessary, an organic solvent. A technique used in a known sol-gel method can be applied thereto. In hydrolysis and condensation, it is exceptionally preferred that the carboxyl group-containing compound (D) having a molecular weight of 100 or less be added in order to control the reactions. Gelation during hydrolysis and condensation of the compound ($L^3$) can be suppressed by adding the compound (D).

The above-mentioned effects can be exerted by allowing the compound (D) to react with at least one of the compound ($L^3$)-based components. The method for adding the compound (D) is not particularly limited, as long as it is a method in which the compound (D) is added before gelation due to the hydrolysis and condensation reactions of the at least one of the compound ($L^3$)-based components. A preferred example of the method for adding the compound (D) is described below. First, the compound (D), water, and if necessary, an organic solvent are mixed to prepare an aqueous solution of the compound (D). Next, the aqueous solution of the compound (D) is added to at least one of the compound ($L^3$)-based components, so that the solution (W) with the compound (D) acting on the at least one of the compound ($L^3$)-based components can be obtained. The at least one of the compound ($L^3$)-based components and the compound (D) contained in the solution (W) may be reacted with each other. The use amount of water to be mixed with the compound (D) is not particularly limited. In order to obtain the solution (W) that is uniform and has a high concentration, the ratio of [the number of moles of water]/[the number of moles of the compound (D)] is preferably in the range of 25/1 to 300/1, more preferably in the range of 50/1 to 200/1, further preferably in the range of 75/1 to 150/1.

For easier control of the reaction of the compound ($L^3$) and better gas barrier properties of the layered product, the ratio of [the number of moles of the compound (D)]/[the number of moles of the compound ($L^3$)] is preferably in the range of 0.25/1 to 30/1, more preferably in the range of 0.5/1 to 20/1, further preferably in the range of 0.75/1 to 10/1.

The compound (D) is not particularly limited as long as it is a carboxyl group-containing compound having a molecular weight of 100 or less. Preferred examples of the compound (D) include acetic acid, propionic acid, and butyric acid. The use of these enhances the reactivity between the functional group (C) contained in the polymer (P) and the at least one of the compound ($L^3$)-based components, thereby improving the hot-water resistance and the gas barrier properties of the layered product. Among these examples of the compound (D), acetic acid is most preferred.

In step (i-b), it is preferred that the solution (W), and if necessary, an organic solvent be added to at least one of the compound ($L^2$)-based components, and then an acid catalyst, water, and if necessary, an organic solvent be added thereto.

Step (i) including steps (i-a) and (i-b) can prevent the occurrence of gelation during the preparation of the oligomer (O), and the reactivity of the oligomer (O) also can be controlled. Therefore, it is possible to prevent gelation when the solution (S) containing the oligomer (O) is mixed with the polymer (P') and/or the partially neutralized product of the polymer (P') in step (ii).

A known acid can be used as the acid catalyst in step (i), and examples thereof include hydrochloric acid, sulfuric acid, nitric acid, p-toluenesulfonic acid, benzoic acid, acetic acid, lactic acid, butyric acid, carbonic acid, oxalic acid, and maleic acid. Among these, hydrochloric acid, sulfuric acid, nitric acid, acetic acid, lactic acid, and butyric acid are particularly preferred. A preferred use amount of the acid catalyst varies depending on the type of acid to be used. However, with respect to 1 mol of the metal atom in the compound (L) used in step (i), the amount of the acid catalyst is preferably in the range of $1 \times 10^{-5}$ to 10 mol, more preferably in the range of $1 \times 10^{-4}$ to 5 mol, further preferably in the range of $5 \times 10^{-4}$ to 1 mol. When the use amount of the acid catalyst falls within such a range, the gas barrier layer has a good microstructure, so that a gas barrier layer with high gas barrier properties can be obtained.

Further, a preferred use amount of water in step (i) varies depending on the type of the compound (L) used in step (i). With respect to 1 mol of the hydrolyzable characteristic group of the compound (L) used in step (i), the use amount of water is preferably in the range of 0.05 to 10 mol, more preferably in the range of 0.1 to 5 mol, further preferably in the range of 0.2 to 3 mol. When the use amount of water falls within such a range, the resultant layered product has particularly excellent gas barrier properties. In step (i), in the case of using a component containing water (such as hydrochloric acid), it is preferred that the use amount of water be determined in consideration of the amount of water to be introduced by the component.

In step (i), an organic solvent may be further used, as needed. The organic solvent to be used is not particularly limited, as long as it is a solvent in which the compound (L) used in step (i) can be dissolved. Preferred examples of the organic solvent to be used include alcohols such as methanol, ethanol, isopropanol, and normal propanol. It is more preferred to use an alcohol having a molecular structure (alkoxy component) of the same type as the alkoxy group contained in the compound (L) used in step (i). Specifically, methanol is preferably used for tetramethoxysilane, while ethanol preferably used for tetraethoxysilane. The use amount of the organic solvent is not specifically limited. Generally, the use amount of the organic solvent is an amount that allows the concentration of the compound (L) used in step (i) to be preferably 1 to 90 mass %, more preferably 10 to 80 mass %, further preferably 10 to 60 mass %.

In the reaction system in step (i), the temperature of the reaction system during hydrolysis and condensation of the compound (L) is not specifically limited. The temperature of the reaction system is generally in the range of 2 to 100° C., preferably in the range of 4 to 60° C., further preferably in the range of 6 to 50° C. Duration of the reaction varies depending on the reaction conditions (amount and type of the acid catalyst, etc.). Duration of the reaction is generally in the range of 0.01 to 60 hours, preferably in the range of 0.1 to 12 hours, more preferably in the range of 0.1 to 6 hours. The reaction can be performed in an atmosphere of various gases such as air, carbon dioxide, nitrogen, and argon.

Step (ii) is described below. The solution (S) prepared in step (i) is used in step (ii). In step (ii), the solution (T) is prepared by mixing, with the solution (S), at least one selected from the group consisting of the polymer (P') and the partially neutralized product of polymer (P'). The solution (T) can be prepared using the solution (S), at least one selected from the group consisting of the polymer (P') and the partially neutralized product of the polymer (P'), and if necessary, water and an organic solvent. The solution (T) may be prepared, for example, by adding the solution (S) to a solution in which at least one selected from the group consisting of the polymer (P') and the partially neutralized product of the polymer (P') has been dissolved and mixing it. Alternatively, the solution (T) may be prepared by adding, to the solution (S), the solution in which the at least one selected from the group consisting of the polymer (P') and the partially neutralized product of the polymer (P') has been dissolved. The solution (S) or the solution of the at least one selected from the group consisting of the polymer (P') and the partially neutralized product of the polymer (P') may be added at a time, or may be added at several times.

The solution of the at least one selected from the group consisting of the polymer (P) and the partially neutralized product of the polymer (P') can be prepared by the following method. A solvent to be used for preparing the solution may be selected depending on the kind of the at least one selected from the group consisting of the polymer (P') and the partially neutralized product of the polymer (P'). For example, in the case where the polymer (P) is a water-soluble polymer such as polyacrylic acid and methacrylic acid, water is preferred. In the case where the polymer (P) is isobutylene-maleic anhydride copolymer or styrene-maleic anhydride copolymer, water containing an alkaline substance (such as ammonia, sodium hydroxide, and potassium hydroxide) is preferred. Further, alcohols such as methanol and ethanol; ethers such as tetrahydrofuran, dioxane, trioxane, and dimethoxyethane; ketones such as acetone and methyl ethyl ketone; glycols such as ethylene glycol and propylene glycol; glycol derivatives such as methyl cellosolve, ethyl cellosolve, and n-butyl cellosolve; glycerin; acetonitrile; amides such as dimethylformamide; dimethyl sulfoxide; and sulfolane may be used in combination, as long as the dissolution of the at least one selected from the group consisting of the polymer (P') and the partially neutralized product of the polymer (P') is not hindered.

Step (iii) is described below. The solution (T) obtained in step (ii) is used in step (iii). In step (iii), the solution (U) is prepared by mixing, with the solution (T), at least one selected from the group consisting of the compound ($L^1$)-based components and a reaction product of one of the compound ($L^1$)-based components with an acid.

In step (iii), the at least one selected from the group consisting of the compound ($L^1$)-based components and the reaction product of one of the compound ($L^1$)-based components with an acid is preferably mixed with the solution (T) in a dissolved/diluted state in a solvent. Step (iii) preferably includes the following steps (iii-a) and (iii-b):

(iii-a) preparing a solution (V) in which at least one selected from the group consisting of the compound ($L^1$)-based components and the reaction product of one of the compound ($L^1$)-based components with an acid is dissolved in a nonaqueous solvent; and (iii-b) preparing the solution (U) by mixing the solution (V) with the solution (T)

The compound ($L^1$)-based component(s) in the solution (V) is preferably not hydrolyzed and condensed, or even in the case of being hydrolyzed and condensed, the degree thereof is preferably low. Therefore, a nonaqueous solvent that does not promote the hydrolysis of the compound ($L^1$)-based component(s) is used as a solvent of the solution (V). Particularly, in the case where the compound ($L^1$) contains an alkoxy group, the nonaqueous solvent is preferably an alcohol having a molecular structure (alkoxy component) of the same type as the alkoxy group.

In step (iii), it is preferred to use at least one of the reaction product of the compound ($L^1$)-based components and an acid. In such a reaction product, at least part of the amino group derived from the compound ($L^1$) is neutralized with the acid. By neutralizing the amino group with the acid, the stability (such as that no precipitation occurs, or no abnormal increase in viscosity occurs) of the solution (U) when being mixed with the solution (T) and after the mixing can be improved, as a result of which the time required for the mixing can be reduced and thus the productivity of the layered product of the present invention is enhanced. This acid may have a low molecular weight or may have a high molecular weight. This acid is preferably a polymer (P''') because it allows the layered product of the present invention after being stretched to have good gas barrier properties. The polymer (P''') means the polymer (P) used as the acid in step (iii).

The number average molecular weight of the polymer (P''') is not specifically limited. Since the layered product having further excellent gas barrier properties and mechanical properties (such as drop impact strength) can be obtained, the number average molecular weight of the polymer (P''') is preferably at least 5,000, more preferably at least 10,000, further preferably at least 20,000. On the other hand, for excellent solubility in a nonaqueous solvent, the number average molecular weight of the polymer (P''') is preferably not more than 80,000.

Meanwhile, the number average molecular weight of the polymer (P''') is preferably lower than the number average molecular weight of the polymer (P'). The polymer (P'), for example, with a number average molecular weight exceeding 80,000 can be used.

The polymer (P') and the polymer (P''') are included in the polymer (P) in the layered product of the present invention. In the case where the polymer (P') or the partially neutralized product of the polymer (P') is used in step (ii), the polymer (P) includes the polymer (P'). In the case where the polymer (P''') is used in step (iii), the polymer (P) includes the polymer (P''').

In view of the preservation stability of the solution (U) and the application properties of the solution (U) onto the base, the solid content concentration of the solution (U) to be obtained in step (iii) is preferably in the range of 1 to 20 mass %, more preferably in the range of 2 to 15 mass %, further preferably in the range of 3 to 10 mass %.

For good preservation stability of the solution (U) and good gas barrier properties of the layered product, the pH of the solution (U) is preferably in the range of 1.0 to 7.0, more preferably in the range of 1.0 to 6.0, further preferably in the range of 1.5 to 5.0.

The pH of the solution (U) can be adjusted by a known method. For example, it can be adjusted by adding an acidic compound or a basic compound. Examples of the acidic compound include hydrochloric acid, nitric acid, sulfuric acid, phosphoric acid, acetic acid, butyric acid, and ammonium sulfate. Examples of the basic compound include sodium hydroxide, potassium hydroxide, ammonia, trimethylamine, pyridine, sodium carbonate, and sodium acetate. The use of a basic compound that introduces a monovalent cation in the solution enables part of the —COO— group in the functional group (C) contained in the polymer (P) to be neutralized with the monovalent ion.

The state of the solution (U) changes with time and finally the solution (U) becomes a gel composition. The time required for gelation of the solution (U) depends on the composition of the solution (U). In order to apply the solution (U) steadily to the base, it is preferred that the solution (U) be a solution having a viscosity that is stable over a long period of time and thereafter increases gradually. Preferably, the solution (U) is prepared so that its viscosity measured with a Brookfield viscometer (B-type viscosity meter: 60 rpm) should be $1 \text{ N·s/m}^2$ or less (more preferably $0.5 \text{ N·s/m}^2$ or less, particularly preferably $0.05 \text{ N·s/m}^2$ or less), even after the solution (U) is allowed to stand still at $25°$ C. for 2 days using the time of completion of step (iii) as a reference. When the viscosity of the solution (U) is in the above-mentioned ranges, the solution (U) has excellent storage stability and the resultant layered product tends to have better gas barrier properties in many cases.

As a method for adjusting the viscosity of the solution (U) to the above-mentioned ranges, a method of adjusting the solid content concentration, a method of adjusting the pH, or a method of adding a viscosity modifier, for example, can be employed. Examples of the viscosity modifier include carboxymethylcellulose, starch, bentonite, tragacanth gum, stearate, alginate, methanol, ethanol, n-propanol, and isopropanol.

In order to facilitate the application of the solution (U) to the base, an organic solvent that can be mixed uniformly with the solution (U) may be added to the solution (U) as long as the stability of the solution (U) is not impaired. Examples of the organic solvent that can be added include: alcohols such as methanol, ethanol, n-propanol, and isopropanol; ethers such as tetrahydrofuran, dioxane, trioxane, and dimethoxyethane; ketones such as acetone, methyl ethyl ketone, methyl vinyl ketone, and methyl isopropyl ketone; glycols such as ethylene glycol, and propylene glycol; glycol derivatives such as methyl cellosolve, ethyl cellosolve, and n-butyl cellosolve; glycerin; acetonitrile; amides such as dimethylformamide and dimethylacetamide; dimethylsulfoxide; and sulfolane.

The solution (U) may contain substances other than the above-mentioned substances, as long as the effects of the present invention are obtained. For example, the solution (U) may contain inorganic acid metal salts such as carbonate, hydrochloride, nitrate, hydrogencarbonate, sulfate, hydrogensulfate, phosphate, borate, and aluminate; organic acid metal salts such as oxalate, acetate, tartrate, and stearate; metal complexes such as acetylacetonate metal complex (aluminum acetylacetonate, etc.), cyclopentadienyl metal complex (titanocene etc.), and cyano metal complex; a layered clay compound, a crosslinking agent, the above-mentioned compound (Q), the above-mentioned compound (R), and polymer compounds other than these compounds, a plasticizer, an antioxidant, an ultraviolet absorber, a flame retardant, and the like. Further, the solution (U) may also contain metal oxide fine powder, silica fine powder, etc.

Step (iv) is described below. In step (iv), a layer stacked on the base (gas barrier layer-forming layer) is formed using the solution (U). For example, the gas barrier layer-forming layer can be formed by applying the solution (U) onto the base and then removing the solvent contained in the solution (U). In step (iv), the solution (U) can be applied to at least one surface of the base. Before the application of the solution (U), the surface of the base may be treated with a known anchor coating agent, or the surface of the base may be coated with a known adhesive. The method for applying the solution (U) onto the base is not particularly limited and a known method can be employed. Preferred examples of the method include casting, dipping, roll coating, gravure coating, screen printing, reverse coating, spray coating, kiss coating, die coating, metering rod coating, chamber doctor coating, and curtain coating.

The layered product before the ionization step (which may hereinafter be referred to as a "layered product (I)") is obtained by step (iv). The method for removing the solvent is not particularly limited, and a known method can be applied. Specifically, methods such as hot-air drying, hot roll contact drying, infrared heating, or microwave heating can be used individually or in combination. The drying temperature is not particularly limited as long as it is lower than the flow starting temperature of the base by at least 0 to $15°$ C. and is also lower than the thermal decomposition starting temperature of the polymer (P) by at least 15 to $20°$ C. The drying temperature is preferably in the range of 70 to $200°$ C., more preferably in the range of 80 to $180°$ C., further preferably in the range of 90 to $160°$ C. The solvent may be removed under either normal pressure or reduced pressure.

In the case where the gas barrier layer is stacked on each of both surfaces of a base in the form of a film, a first layer (first gas barrier layer-forming layer) may be formed by applying the solution (U) onto one surface of the base followed by drying, and then a second layer (second gas barrier layer-forming layer) may be formed by applying the solution (U) onto the other surface of the base followed by drying. The compositions of the solution (U) to be applied onto the respective surfaces may be the same or different. It should be noted that more excellent performance may be exhibited in some cases when applying the solution (U) with different compositions onto the respective surfaces of the base than when applying the solution (U) with the same composition to both surfaces of the base.

In the case where the gas barrier layer is stacked on each of a plurality of surfaces of a base having a three-dimensional shape, the layer (gas barrier layer-forming layer) may be formed on each surface one by one using the above-mentioned method. Alternatively, a plurality of layers (gas barrier layer-forming layers) may be formed at a time by simultaneously applying the solution (U) to the plurality of surfaces of the base, followed by drying.

In the layered product of the present invention, the skin layer formed of the hydrolyzed condensate of the compound (L) preferably is formed on the surface of the gas barrier layer. Meanwhile, as has been described above, an excessive thickness of the skin layer deteriorates the transparency of the layered product, which is not preferred. A method for forming a skin layer with an appropriate thickness is described below. According to the studies by the inventors, the occurrence or non-occurrence of the formation of a skin layer and the state of the formation of the skin layer depend on the reactivity of the hydrolyzed condensate of the compound (L), the composition of the compound (L), the solvent used for the solution (U), the drying speed of the solution (U) after being applied to the base, and the like. For example, it is possible to increase the contact angle of water with respect to the surface of the gas barrier layer (that is, to form an appropriate skin layer) by measuring the contact angle and increasing the duration of the reaction in step (i) when the contact angle is below the above-mentioned predetermined range. Conversely, it is possible to decrease the contact angle by decreasing the duration of the reaction in step (i) when the contact angle exceeds the above-mentioned predetermined range.

An ionization step (which may hereinafter be referred to as step (v)) is performed after the stacking step. In the ionization step, the gas barrier layer-forming layer, which has been formed in the stacking step, is brought into contact with a solution containing the ion (E) (which may hereinafter be referred to as a "solution (IW)"). Step (v) can be performed by bringing the layered product (I) obtained by the stacking step into contact with the solution (IW). The layered product obtained by step (v) (which may hereinafter be referred to as a "layered product (II)") can be used as the layered product of the present invention as it is. The ionization step may be carried out at any stage, as long as the effects of the present invention are not impaired. For example, the ionization step can be carried out before or after the layered product is processed into the form of a packaging material or a formed product, or after the formed product is filled with a content and then sealed.

The solution (IW) can be prepared by dissolving, in a solvent, a compound (polyvalent metal compound) that releases the ion (E) upon dissolution. The solvent to be used for preparing the solution (IW) is desirably water, but may be a mixture of water and an organic solvent that is miscible with water. Examples of the organic solvent include alcohols such as methanol, ethanol, n-propanol, and isopropanol; ethers such as tetrahydrofuran, dioxane, trioxane, and dimethoxyethane; ketones such as acetone, methyl ethyl ketone, methyl vinyl ketone, and methyl isopropyl ketone; glycols such as ethylene glycol, and propylene glycol; glycol derivatives such as methyl cellosolve, ethyl cellosolve, and n-butyl cellosolve; glycerin; acetonitrile; amides such as dimethylformamide and dimethylacetamide; dimethylsulfoxide; and sulfolane.

As a polyvalent metal compound, it is possible to use the compound that releases the ion (E) that has been mentioned in relation to the layered product of the present invention. Examples thereof to be used include magnesium acetate, magnesium hydroxide, magnesium chloride, magnesium carbonate, iron acetate (II), iron chloride (II), iron acetate (III), iron chloride (III), zinc acetate, zinc chloride, zirconium acetate, zirconium chloride, zirconium nitrate, aluminum sulfate, potassium alum ($KAl(SO_4)_2$), and titanium sulfate (IV). Only one kind of the polyvalent metal compound may be used or two or more kinds thereof may be used in combination. Preferred examples of the polyvalent metal compound include magnesium acetate and zinc acetate. The polyvalent metal compound may be used in the form of a hydrate.

The concentration of the polyvalent metal compound in the solution (IW) is not particularly limited, and is preferably in the range of $1 \times 10^{-4}$ to 50 mass %, more preferably in the range of $1 \times 10^{-2}$ to 30 mass %, further preferably in the range of 0.1 to 20 mass %.

The temperature of the solution (IW) when the layered product (I) is brought into contact with the solution (IW) is not particularly limited. The higher the temperature of the solution (IW) is, the faster the ionization rate of the —COO— group contained in the functional group (C) of the polymer (P) should be. The temperature, for example, is in the range of 30 to 140° C., preferably in the range of 40 to 120° C., further preferably in the range of 50 to 100° C.

Desirably, after the layered product (I) is brought into contact with the solution (IW), the residual solvent in the layered product is removed. The method for removing the solvent is not particularly limited. A known method can be used. Specifically, one of drying methods such as hot-air drying, hot roll contact drying, infrared heating, or microwave heating can be used alone, or two or more of them can be used in combination. The temperature at which the solvent is removed is not particularly limited, as long as it is lower than the flow starting temperature of the base by at least 15 to 20° C., and also is lower than the thermal decomposition starting temperature of the polymer (P) by at least 15 to 20° C. Since the gas barrier layer included in the layered product of the present invention has high strength, cracks are less likely to occur therein even under high drying temperature. Therefore, a higher drying temperature can be set. As a result, the moisture content in the layered product to be produced can be maintained at a lower level, and thus dimensional changes in the processing steps or bubble formation during heat sealing can be suppressed more effectively. The drying temperature is preferably in the range of 40 to 200° C., more preferably in the range of 60 to 150° C., further preferably in the range of 80 to 130° C., particularly preferably in the range of 115 to 130° C. The solvent may be removed under either normal pressure or reduced pressure.

The moisture content in the layered product (II) (having layer structures, for example, of gas barrier layer/base, gas barrier layer/adhesive layer/base, gas barrier layer/base/gas barrier layer, gas barrier layer/adhesive layer/base/gas barrier layer, or gas barrier layer/adhesive layer/base/adhesive layer/gas barrier layer) after the solvent has been removed is not specifically limited, though it depends on the type of the base. For example, in the case of using a thermoplastic resin film obtained by forming a polyamide resin as the base, the moisture content is preferably not more than 3.0% (not more than 3.0 mass %), more preferably not more than 2.5 mass %, further preferably not more than 2.0 mass %, in the mass of the layered product (II) after the solvent has been removed. In the case of using a thermoplastic resin film obtained by forming a polyester resin as the base, the moisture content is preferably not more than 1.5% (not more than 1.5 mass %), more preferably not more than 1.3 mass %, further preferably not more than 1.1 mass %, in the mass of the layered product (II) after the solvent has been removed. When the moisture content falls within such a range, dimensional changes in processing the layered product (II) or bubble formation during heat sealing can be suppressed more effectively.

In order not to impair the appearance of the surface of the layered product, it is preferred that the excess of the polyvalent metal compound that has deposited on the surface of the layered product be removed before or after the solvent is removed. As a method for removing the polyvalent metal compound, washing with a solvent capable of dissolving the polyvalent metal compound is preferred. Examples of the solvent capable of dissolving the polyvalent metal compound include a solvent usable as the solution (IW). It is preferred to use the same solvent as that used as the solution (IW).

The production method of the present invention preferably further includes a step of heat treating the gas barrier layer-forming layer and/or the gas barrier layer (preferably, the layered product (I) and/or the layered product (II)) at a temperature of 120° C. or more after the stacking step (e.g., after step (iv)) and before and/or after step (v). The heat treatment may be carried out at any step after the removal of the solvent from the applied solution (U) has been almost completed. The layered product having good surface appearance can be obtained by heat-treating the layered product before the ionization step (that is, the layered product (I)).

In order to sufficiently proceed with the reaction between the amino group derived from the compound ($L^1$) and the functional group (C) contained in the polymer (P), the temperature of the heat treatment is preferably at least 150° C., more preferably at least 160° C., further preferably at least 170° C. The upper limit of the temperature of the heat treatment depends on the type of the base to be used. However, in the case of using a thermoplastic resin film obtained by forming a polyamide resin as the base, for example, the temperature of the heat treatment is preferably 190° C. or less, and in the case of using a thermoplastic resin film obtained by forming a polyester resin as the base, for example, the temperature of the heat treatment is preferably 220° C. or less. The heat treatment can be carried out in an atmosphere of air, nitrogen, argon, or the like.

Duration of the heat treatment is preferably in the range of 0.1 second to 1 hour, more preferably in the range of 1 second to 15 minutes, further preferably in the range of 5 to 300 seconds.

In the production method of the present invention, the layered product (I) and/or the layered product (II) may be irradiated with ultraviolet rays. The ultraviolet irradiation may be carried out at any step after the removal of the solvent from the applied solution (U) has been almost completed. The method of the ultraviolet irradiation is not particularly limited. A known method can be used. The wavelength of the ultraviolet rays to be employed for the irradiation is preferably in the range of 170 to 250 nm, more preferably in the range of 170 to 190 nm and/or in the range of 230 to 250 nm. Alternatively, irradiation with radiation of electron beams, gamma rays, or the like may be carried out instead of the ultraviolet irradiation.

Only either one of the heat treatment and the ultraviolet irradiation may be performed, or both may be performed in combination. The heat treatment and/or the ultraviolet irradiation can cause the layered product to exert a higher level of the gas barrier performance in some cases.

The surface of the base may be subjected to a treatment (such as treatment with an anchor coating agent, or coating with an adhesive) before the application of the solution (U), in order to dispose the adhesive layer (H) between the base and the gas barrier layer. In this case, it is preferred that an aging process in which the base coated with the solution (U) is allowed to stand at a relatively low temperature for a long period of time be performed after the stacking step (after the application of the solution (U)) and before the above-mentioned heat treatment and the ionization step. The temperature of the aging process is preferably in the range of 30 to 200° C., more preferably in the range of 30 to 150° C., further preferably in the range of 30 to 120° C. Duration of the aging process is preferably in the range of 0.5 to 10 days, more preferably in the range of 1 to 7 days, further preferably in the range of 1 to 5 days. Stronger adhesiveness is achieved between the base and the gas barrier layer by performing this aging process. It is preferred that the above-mentioned heat treatment (heat treatment at 120° C. or more, particularly preferably at 160° C. or more) further be performed after the aging process.

The layered product obtained as mentioned above can be used as the layered product of the present invention as it is. However, the above-mentioned inorganic layer or other layers may be stacked further thereon, as needed. These layers can be stacked using a known method.

EXAMPLES

Hereinafter, the present invention is described further in detail with reference to examples. The present invention is not limited by the following examples.

Measurements and evaluations were performed in Examples and Comparative Examples by the following methods (1) to (7). The measurement results and evaluation results are indicated in the tables that appear after the descriptions for Examples and Comparative Examples.

(1) Neutralization Degree (Ionization Degree) of Carboxyl Group with Metal Ion

<Calculation of Ionization Degree Using Ft-IR>

Polyacrylic acid with a number average molecular weight of 150,000 was dissolved in distilled water, and the carboxyl group was neutralized with a predetermined amount of sodium hydroxide. The resultant aqueous solution of the neutralized product of polyacrylic acid was applied to a base to the same thickness as that of the gas barrier layer of the layered product for which the degree of neutralization (degree of ionization) was to be determined, followed by drying. As the base, a stretched nylon film (Emblem ON-BC (product name), with a thickness of 15 µm, manufactured by Unitika Ltd., which may hereinafter be abbreviated as "ON") having a surface formed with an anchor coat layer (which may hereinafter be abbreviated as "AC") made of a two-component anchor coating agent was used. "TAKELAC 626" and "TAKENATE A50" (both manufactured by MITSUI TAKEDA CHEMICALS INC.) were used as the two-component anchor coating agent. Thus, standard samples [layered product (layer formed of neutralized product of polyacrylic acid/AC/ON)] were produced. The respective standard samples had neutralization degrees of the carboxyl group of 0, 25, 50, 75, 80, and 90 mol %. These samples were subjected to measurement of the infrared absorption spectrum using a Fourier transform infrared spectrophotometer (Spectrum One, manufactured by PerkinElmer, Inc.) in the mode of ATR (attenuated total reflection). Then, the ratio of the maximum absorbance was calculated from the two peaks attributed to the stretching vibration of C=O contained in the layer formed of the neutralized product of polyacrylic acid, i.e., the peak observed in the range of 1600 cm$^{-1}$ to 1850 cm$^{-1}$ and the peak observed in the range of 1500 cm$^{-1}$ to 1600 cm$^{-1}$. Using the calculated ratio and the degree of neutralization (degree of ionization) of each standard sample, a standard curve 1 was plotted.

The peaks of the stretching vibration of C=O contained in the gas barrier layer were observed using the Fourier transform infrared spectrophotometer (Spectrum One, manufactured by PerkinElmer, Inc.) in the mode of ATR (attenuated total reflection) for the layered product that used a stretched nylon film (the above-mentioned ON) as the base. The peak attributed to the stretching vibration of C=O of the carboxyl group in the polymer (P) before ionization was observed in the range of 1600 cm$^{-1}$ to 1850 cm$^{-1}$. Meanwhile, the peak of the stretching vibration of C=O of the carboxyl group after ionization was observed in the range of 1500 cm$^{-1}$ to 1600 cm$^{-1}$. Then, the ratio of the maximum absorbance in the respective ranges was calculated therefrom. Subsequently, the degree of neutralization (degree of ionization) was determined using the ratio and the above-mentioned standard curve 1.

<Calculation of Ionization Degree Using X-Ray Fluorescence>

Standard samples each having a different neutralization degree (ionization degree) were fabricated for the layered product that used the aforementioned ON as the base, according to the measurement results of FT-IR. Specifically, 11 kinds of standard samples each having a different neutralization degree (ionization degree) (ion: zinc ion) by approximately 10 mol % varying from 0 to 100 mol % were fabricated. Each sample was subjected to measurement of the X-ray fluorescence intensity of zinc element using a wavelength dispersive X-ray fluorescence spectrometer (ZSX mini II, manufactured by Rigaku Corporation) and a standard curve 2 was plotted from the neutralization degree (ionization degree) determined in advance using FT-IR. The neutralization degree (ionization degree) with zinc ion of the layered product produced in each of Examples and Comparative Examples below was calculated using the resultant standard curve 2.

Also in the case where other metals (such as calcium ion) were used for the ionization, the same method as above was employed for plotting a standard curve 2 to calculate the neutralization degree (ionization degree).

Also for layered products using a base other than the ON (such as a stretched polyethylene terephthalate film), the standard curve 2 obtained from the measurement of the X-ray fluorescence intensity was used to calculate the neutralization degree (ionization degree).

(2) Mass of Inorganic Component/Mass of Organic Component

The mass of the inorganic component derived from the compound (L), and the total of the mass of the organic component derived from the compound (L) and the mass of the organic component derived from the polymer (P) were calculated from the mixing ratio of raw materials used herein by the above-mentioned methods. Then, the ratio of [mass of the inorganic component derived from the compound (L)]/[total of the mass of the organic component derived from the compound (L) and the mass of the organic component derived from the polymer (P)] was calculated, which was taken as the mass of the inorganic component/the mass of the organic component.

(3) Moisture Content

The moisture content of the layered product was measured using a halogen moisture analyzer ("HR83", manufactured by Mettler-Toledo International Inc.).

(4) Dry Heat Shrinkage

A 10-cm square marking was placed on the center of an A4-size (210×297 mm) layered product. Thereafter, the edges of the layered product were fixed onto a mounting sheet. Subsequently, the layered product together with the mounting sheet was subjected to heat treatment in a hot air dryer at 90° C. for 5 minutes. Immediately after the layered product was taken out from the hot air dryer, the distances between the marks were measured, which were compared to those before the heat treatment (10 cm). Thus, the dry heat shrinkage was calculated. Specifically, the dry heat shrinkage in each of MD (flow direction) and TD (width direction) of the base at the time of film formation was calculated according to the following formula:

Dry heat shrinkage (%)=100×([distance before heat treatment]−[distance after heat treatment])/[distance before heat treatment].

(5) Oxygen Barrier Properties Before Bending and Before Retorting (Oxygen Barrier Properties Before Processing)

The oxygen transmission rate (OTR) was measured using an oxygen transmission rate tester ("MOCON OX-TRAN2/20", manufactured by Modern Controls, Inc.). Specifically, the layered product was positioned so that the gas barrier layer faced the oxygen supply side while the later-mentioned CPP layer faced the carrier gas side. Then, the oxygen transmission rate (unit: ml/(m$^2$·day·atm)) was measured under the conditions of a temperature of 20° C., a humidity on the oxygen supply side of 85% RH, a humidity on the carrier gas side of 85% RH, an oxygen pressure of 1 atm, and a career gas pressure of 1 atm. Nitrogen gas containing 2 vol % of hydrogen gas was used as the carrier gas. This oxygen transmission rate (OTR) was taken as an indicator of the oxygen barrier properties before processing.

(6) Oxygen Barrier Properties after Bending

Bending by a Gelbo flex tester (manufactured by Rigaku Corporation) was employed as physical impact and deformation. The layered product was cut into A4 size, which was subjected to bending by the Gelbo flex tester at 500 cycles. The center of the layered product subjected to bending was cut out as a sample for measuring the oxygen transmission rate.

The oxygen transmission rate (OTR) was measured using an oxygen transmission rate tester ("MOCON OX-TRAN2/20", manufactured by Modern Controls, Inc.). Specifically, the layered product was positioned so that the gas barrier layer faced the oxygen supply side while the later-mentioned CPP layer faced the carrier gas side. Then, the oxygen transmission rate (unit: ml/(m$^2$·day·atm)) was measured under the conditions of a temperature of 20° C., a humidity on the oxygen supply side of 85% RH, a humidity on the carrier gas side of 85% RH, an oxygen pressure of 1 atm, and a career gas pressure of 1 atm. This oxygen transmission rate (OTR) was taken as an indicator of the oxygen barrier properties after bending. Nitrogen gas containing 2 vol % of hydrogen gas was used as the carrier gas.

(7) Oxygen Barrier Properties after Retorting

Two pieces of the layered product (size: 12 cm×12 cm) were fabricated. Then, the two pieces of the layered product were stacked together so that the later-mentioned CPP layers served as the inner portions. Thereafter, three sides of the layered product were heat-sealed by 5 mm from the edges thereof. 80 g of distilled water was poured between the two pieces of the layered product that had been heat-sealed and then the remaining fourth side was heat-sealed in the same manner. Thus, a pouch containing distilled water was produced.

Next, the pouch was put into a retort sterilizer (Flavor Ace RCS-60, manufactured by HISAKA WORKS, LTD.) to be subjected to retorting by spraying at 120° C. and 0.15 MPa for 60 minutes. After retorting, the pouch was taken out from the retort sterilizer, and heat-sealed portions were cut off with scissors. Filter paper that had been immersed in water was disposed on each of both surfaces of the resultant layered product to prepare the layered product under the humidity conditions of 100% RH. The oxygen barrier properties after retorting were evaluated by measuring the oxygen transmission rate (OTR) of the layered product that had been subjected to such retorting and humidity adjustment.

The oxygen transmission rate (OTR) was measured using an oxygen transmission rate tester ("MOCON OX-TRAN 2/20", manufactured by Modern Controls, Inc.). Specifically, the layered product on each surface of which filter paper was disposed was positioned so that the gas barrier layer faced the oxygen supply side while the later-mentioned CPP layer faced the carrier gas side. Then, the oxygen transmission rate (unit: ml/(m$^2$·day·atm)) was measured under the conditions of a temperature of 40° C., a humidity on the oxygen supply side of 90% RH, a humidity on the carrier gas side of 90% RH, an oxygen pressure of 1 atm, and a career gas pressure of 1 atm. Nitrogen gas containing 2 vol % of hydrogen gas was used as the carrier gas. The filter paper disposed on each surface of the layered product had a sufficient moisture content, and the humidity conditions in the measurement can be considered to be substantially 100% RH.

Example 1

Polyacrylic acid (PAA) with a number average molecular weight of 150,000 was dissolved in distilled water, and thereby a PAA aqueous solution with a solid content concentration of 13 mass % in the aqueous solution was obtained. Subsequently, a 13 mass % ammonia aqueous solution was added to this PAA aqueous solution, so that 1 mol % of the carboxyl group in PAA was neutralized. Thus, an aqueous solution of a partially neutralized product of PAA was obtained.

100 parts by mass of polyacrylic acid (PAA) with a number average molecular weight of 40,000 was dissolved in 1064 parts by mass of methanol. Subsequently, 166 parts by mass of gamma-aminopropyltrimethoxysilane (APTMOS) was added thereto under stirring. Thus, an APTMOS methanol solution (V1) was obtained. In the APTMOS methanol solution (V1), at least part of the amino group of APTMOS was neutralized with the carboxyl group of PAA.

Next, 34.5 parts by mass of tetramethoxysilane (TMOS) was dissolved in 34.5 parts by mass of methanol to prepare a TMOS methanol solution. 2.3 parts by mass of distilled water and 5.7 parts by mass of 0.1 N hydrochloric acid were added thereto with the temperature of the TMOS methanol solution being maintained at 10° C. or less, which was subjected to hydrolysis and condensation reactions at 10° C. for 60 minutes under stirring. Thus, a solution (S1) was obtained.

Subsequently, the solution (S1) was diluted with 214.7 parts by mass of methanol and 436.1 parts by mass of distilled water, and thereafter 235.9 parts by mass of the above-mentioned aqueous solution of the partially neutralized product of PAA was added thereto under stirring. Thus, a solution (T1) was obtained.

Subsequently, while the solution (T1) was stirred, 36.2 parts by mass of the APTMOS methanol solution (V1) was added thereto, which was further stirred for 30 minutes. Thereby, a solution (U1) was obtained.

Meanwhile, a stretched polyethylene terephthalate film (Lumirror P60 (product name), with a thickness of 12 μm, manufactured by Toray Industries, Inc., which may hereinafter be abbreviated as "PET") was coated with a two-component anchor coating agent (1 part by mass of TAKELAC A-626 (product name) and 2 parts by mass of TAKENATE A-50 (product name), manufactured by MITSUI TAKEDA CHEMICALS INC.) that had been dissolved in 67 parts by weight of ethyl acetate, followed by drying. Thus, a base (AC (0.1 μm)/PET (12 μm)) with an anchor coat layer (which may be abbreviated as "AC") was produced. This anchor coat layer of the base was coated with the solution (U1) using a bar coater to a thickness of 1.0 μm after drying. This was dried at 100° C. for 5 minutes to form a gas barrier layer-forming layer. Subsequently, an anchor coat layer and a gas barrier layer-forming layer were formed also on the opposite surface of the base in the same manner.

The resultant layered product was aged at 40° C. for 3 days. Next, the layered product was subjected to heat treatment at 180° C. for 1 minute using a dryer. Then, the layered product was immersed in a 0.5 mass % zinc acetate aqueous solution (85° C.) for 20 seconds, which thereafter was dried at 110° C. for 1 minute. Thus, a layered product (A1) having a structure of gas barrier layer (1.0 μm)/AC (0.1 μm)/PET (12 μm)/AC (0.1 μm)/gas barrier layer (1.0 μm) was obtained.

The layered product (A1) was subjected to measurement of the neutralization degree (ionization degree) using the above-mentioned method. Also, the mass of the inorganic component/the mass of the organic component was calculated from the used amount of raw materials by the above-mentioned method.

Subsequently, a stretched nylon film (the above-mentioned ON) and an unstretched polypropylene film ("RXC-21" (product name), with a thickness of 50 μm, manufactured by TOHCELLO CO., LTD., which may hereinafter be abbreviated as "CPP") each were coated with a two-component adhesive ("A-520" (product name) and "A-50" (product name), manufactured by MITSUI TAKEDA CHEMICALS INC.), followed by drying. Then, these were laminated with the layered product (A1). Thus, a layered product (B1) having a structure of gas barrier layer/AC/PET/AC/gas barrier layer/adhesive/ON/adhesive/CPP was obtained.

Using the above-mentioned methods, the layered product (B1) was subjected to evaluation of the oxygen barrier properties before processing, the oxygen barrier properties after bending, and the oxygen barrier properties after retorting.

Example 2

In Example 2, a solution (U2) prepared in the same manner as in the solution (U1) obtained in Example 1 was used. A layered product (A2) having a structure of gas barrier layer (0.5 μm)/AC (0.1 μm)/PET (12 μm)/AC (0.1 μm)/gas barrier layer (0.5 μm) was obtained in the same manner as in Example 1, except that the solution (U2) was used instead of the solution (U1) and that the thickness of the gas barrier layer on each surface of the base was set to 0.5 μm.

The layered product (A2) was subjected to measurement of the neutralization degree (ionization degree) using the above-mentioned method. Also, the mass of the inorganic component/the mass of the organic component was calculated from the used amount of raw materials by the above-mentioned method.

Subsequently, a layered product (B2) having a structure of gas barrier layer/AC/PET/AC/gas barrier layer/adhesive/ON/adhesive/CPP was obtained in the same manner as in Example 1, except that the layered product (A2) was used instead of the layered product (A1).

Using the above-mentioned methods, the layered product (B2) was subjected to evaluation of the oxygen barrier properties before processing, the oxygen barrier properties after bending, and the oxygen barrier properties after retorting.

Example 3

In Example 3, an aqueous solution of a partially neutralized product of PAA prepared in the same manner as the aqueous solution of the partially neutralized product of PAA obtained in Example 1, and an APTMOS methanol solution (V3) prepared in the same manner as the APTMOS methanol solution (V1) obtained in Example 1 were used.

60 parts by mass of acetic acid and 1800 parts by mass of distilled water were mixed to prepare an acetic acid aqueous solution. While stirring this acetic acid aqueous solution, 204 parts by mass of aluminum isopropoxide (AIP) was added thereto. Thus, a solution of AIP/acetic acid/distilled water=1/1/100 (molar ratio) was prepared. This solution was heated at 80° C. for 1 hour. Thereby, an AIP aqueous solution (W3) was obtained.

Next, 37.2 parts by mass of tetramethoxysilane (TMOS) was dissolved in 37.2 parts by mass of methanol to prepare a TMOS methanol solution. 2.5 parts by mass of distilled water and 6.1 parts by mass of 0.1 N hydrochloric acid were added thereto with the temperature of the TMOS methanol solution being maintained at 10° C. or less, which was subjected to hydrolysis and condensation reactions at 10° C. for 30 minutes under stirring. 15.1 parts by mass of the AIP aqueous solution (W3) was added to the resultant solution with the temperature thereof being maintained at 10° C. or less, which was subjected to hydrolysis and condensation reactions at 10° C. for 30 minutes under stirring. Thus, a solution (S3) was obtained.

Subsequently, the solution (S3) was diluted with 239.1 parts by mass of methanol and 391.6 parts by mass of distilled water, and thereafter 269.6 parts by mass of the above-mentioned aqueous solution of the partially neutralized product of PAA was added thereto under stirring. Thus, a solution (T3) was obtained.

Subsequently, while the solution (T3) was stirred, 1.8 parts by mass of the APTMOS methanol solution (V3) was added thereto, which was further stirred for 30 minutes. Thereby, a solution (U3) was obtained.

A layered product (A3) having a structure of gas barrier layer (0.5 μm)/AC (0.1 μm)/PET (12 μm)/AC (0.1 μm)/gas barrier layer (0.5 μm) was obtained in the same manner as in Example 2, except that the solution (U3) was used instead of the solution (U2).

The layered product (A3) was subjected to measurement of the neutralization degree (ionization degree) using the above-mentioned method. Also, the mass of the inorganic component/the mass of the organic component was calculated from the used amount of raw materials by the above-mentioned method.

Subsequently, a layered product (B3) having a structure of gas barrier layer/AC/PET/AC/gas barrier layer/adhesive/ON/adhesive/CPP was obtained in the same manner as in Example 1, except that the layered product (A3) was used instead of the layered product (A1).

Using the above-mentioned methods, the layered product (B3) was subjected to evaluation of the oxygen barrier properties before processing, the oxygen barrier properties after bending, and the oxygen barrier properties after retorting.

Example 4

In Example 4, an aqueous solution of a partially neutralized product of PAA prepared in the same manner as the aqueous solution of the partially neutralized product of PAA obtained in Example 1, an AIP aqueous solution (W4) prepared in the same manner as the AIP aqueous solution (W3) obtained in Example 3, and an APTMOS methanol solution (V4) prepared in the same manner as the APTMOS methanol solution (V1) obtained in Example 1 were used.

37.0 parts by mass of tetramethoxysilane (TMOS) was dissolved in 37.0 parts by mass of methanol to prepare a TMOS methanol solution. 2.5 parts by mass of distilled water and 6.1 parts by mass of 0.1 N hydrochloric acid were added thereto with the temperature of the TMOS methanol solution being maintained at 10° C. or less, which was subjected to hydrolysis and condensation reactions at 10° C. for 30 minutes under stirring. 15.1 parts by mass of the AIP aqueous solution (W4) was added to the resultant solution with the temperature thereof being maintained at 10° C. or less, which was subjected to hydrolysis and condensation reactions at 10° C. for 30 minutes under stirring. Thus, a solution (S4) was obtained.

Subsequently, the solution (S4) was diluted with 237.8 parts by mass of methanol and 393.0 parts by mass of distilled water, and thereafter 268.0 parts by mass of the above-mentioned aqueous solution of the partially neutralized product of PAA was added thereto under stirring. Thus, a solution (T4) was obtained.

Subsequently, while the solution (T4) was stirred, 3.5 parts by mass of the APTMOS methanol solution (V4) was added thereto, which was further stirred for 30 minutes. Thereby, a solution (U4) was obtained.

A layered product (A4) having a structure of gas barrier layer (0.5 μm)/AC (0.1 μm)/PET (12 μm)/AC (0.1 μm)/gas barrier layer (0.5 μm) was obtained in the same manner as in Example 2, except that the solution (U4) was used instead of the solution (U2).

The layered product (A4) was subjected to measurement of the neutralization degree (ionization degree) using the above-mentioned method. Also, the mass of the inorganic component/the mass of the organic component was calculated from the used amount of raw materials by the above-mentioned method.

Subsequently, a layered product (B4) having a structure of gas barrier layer/AC/PET/AC/gas barrier layer/adhesive/ON/adhesive/CPP was obtained in the same manner as in Example 1, except that the layered product (A4) was used instead of the layered product (A1).

Using the above-mentioned methods, the layered product (B4) was subjected to evaluation of the oxygen barrier properties before processing, the oxygen barrier properties after bending, and the oxygen barrier properties after retorting.

Example 5

In Example 5, an aqueous solution of a partially neutralized product of PAA prepared in the same manner as the aqueous solution of the partially neutralized product of PAA obtained in Example 1, an AIP aqueous solution (W5) prepared in the same manner as the AIP aqueous solution (W3) obtained in Example 3, and an APTMOS methanol solution (V5) prepared in the same manner as the APTMOS methanol solution (V1) obtained in Example 1 were used.

36.6 parts by mass of tetramethoxysilane (TMOS) was dissolved in 36.6 parts by mass of methanol to prepare a TMOS methanol solution. 2.4 parts by mass of distilled water and 6.0 parts by mass of 0.1 N hydrochloric acid were added thereto with the temperature of the TMOS methanol solution being maintained at 10° C. or less, which was subjected to hydrolysis and condensation reactions at 10° C. for 30 minutes under stirring. 15.0 parts by mass of the AIP aqueous solution (W5) was added to the resultant solution with the temperature thereof being maintained at 10° C. or less, which was subjected to hydrolysis and condensation reactions at 10° C. for 30 minutes under stirring. Thus, a solution (S5) was obtained.

Subsequently, the solution (S5) was diluted with 235.4 parts by mass of methanol and 396.0 parts by mass of distilled water, and thereafter 264.9 parts by mass of the above-mentioned aqueous solution of the partially neutralized product of PAA was added thereto under stirring. Thus, a solution (T5) was obtained.

Subsequently, while the solution (T5) was stirred, 7.1 parts by mass of the APTMOS methanol solution (V5) was added thereto, which was further stirred for 30 minutes. Thereby, a solution (U5) was obtained.

A layered product (A5) having a structure of gas barrier layer (0.5 μm)/AC (0.1 μm)/PET (12 μm)/AC (0.1 μm)/gas barrier layer (0.5 μm) was obtained in the same manner as in Example 2, except that the solution (U5) was used instead of the solution (U2).

The layered product (A5) was subjected to measurement of the neutralization degree (ionization degree) using the above-mentioned method. Also, the mass of the inorganic component/the mass of the organic component was calculated from the used amount of raw materials by the above-mentioned method.

Subsequently, a layered product (B5) having a structure of gas barrier layer/AC/PET/AC/gas barrier layer/adhesive/ON/adhesive/CPP was obtained in the same manner as in Example 1, except that the layered product (A5) was used instead of the layered product (A1).

Using the above-mentioned methods, the layered product (B5) was subjected to evaluation of the oxygen barrier properties before processing, the oxygen barrier properties after bending, and the oxygen barrier properties after retorting.

Example 6

In Example 6, a solution (U6) prepared in the same manner as the solution (U5) obtained in Example 5 was used. A layered product (A6) having a structure of gas barrier layer (0.5 μm)/AC (0.1 μm)/PET (12 μm)/AC (0.1 μm)/gas barrier layer (0.5 μm) was obtained in the same manner as Example 2, except that the solution (U6) was used instead of the solution (U2) and that duration of the immersion in the 0.5 mass % zinc acetate aqueous solution (85° C.) was changed from 20 seconds to 200 seconds.

The layered product (A6) was subjected to measurement of the neutralization degree (ionization degree) using the above-mentioned method. Also, the mass of the inorganic component/the mass of the organic component was calculated from the used amount of raw materials by the above-mentioned method.

Subsequently, a layered product (B6) having a structure of gas barrier layer/AC/PET/AC/gas barrier layer/adhesive/ON/adhesive/CPP was obtained in the same manner as in Example 1, except that the layered product (A6) was used instead of the layered product (A1).

Using the above-mentioned methods, the layered product (B6) was subjected to evaluation of the oxygen barrier properties before processing, the oxygen barrier properties after bending, and the oxygen barrier properties after retorting.

Example 7

In Example 7, an aqueous solution of a partially neutralized product of PAA prepared in the same manner as the aqueous solution of the partially neutralized product of PAA obtained in Example 1, an AIP aqueous solution (W7) prepared in the same manner as the AIP aqueous solution (W3) obtained in Example 3, and an APTMOS methanol solution (V7) prepared in the same manner as the APTMOS methanol solution (V1) obtained in Example 1 were used.

34.0 parts by mass of tetramethoxysilane (TMOS) was dissolved in 34.0 parts by mass of methanol to prepare a TMOS methanol solution. 2.3 parts by mass of distilled water and 5.6 parts by mass of 0.1 N hydrochloric acid were added thereto with the temperature of the TMOS methanol solution being maintained at 10° C. or less, which was subjected to hydrolysis and condensation reactions at 10° C. for 30 minutes under stirring. 14.5 parts by mass of the AIP aqueous solution (W7) was added to the resultant solution with the temperature thereof being maintained at 10° C. or less, which was subjected to hydrolysis and condensation reactions at 10° C. for 30 minutes under stirring. Thus, a solution (S7) was obtained.

Subsequently, the solution (S7) was diluted with 215.4 parts by mass of methanol and 420.5 parts by mass of distilled water, and thereafter 238.3 parts by mass of the above-mentioned aqueous solution of the partially neutralized product of PAA was added thereto under stirring. Thus, a solution (T7) was obtained.

Subsequently, while the solution (T7) was stirred, 35.6 parts by mass of the APTMOS methanol solution (V7) was added thereto, which was further stirred for 30 minutes. Thereby, a solution (U7) was obtained.

A layered product (A7) having a structure of gas barrier layer (0.5 μm)/AC (0.1 μm)/PET (12 μm)/AC (0.1 μm)/gas barrier layer (0.5 μm) was obtained in the same manner as Example 2, except that the solution (U7) was used instead of the solution (U2) and that duration of the immersion in the 0.5 mass % zinc acetate aqueous solution (85° C.) was changed from 20 seconds to 5 seconds.

The layered product (A7) was subjected to measurement of the neutralization degree (ionization degree) using the above-mentioned method. Also, the mass of the inorganic component/the mass of the organic component was calculated from the used amount of raw materials by the above-mentioned method.

Subsequently, a layered product (B7) having a structure of gas barrier layer/AC/PET/AC/gas barrier layer/adhesive/ON/adhesive/CPP was obtained in the same manner as in Example 1, except that the layered product (A7) was used instead of the layered product (A1).

Using the above-mentioned methods, the layered product (B7) was subjected to evaluation of the oxygen barrier properties before processing, the oxygen barrier properties after bending, and the oxygen barrier properties after retorting.

Example 8

In Example 8, a solution (U8) prepared in the same manner as the solution (U7) obtained in Example 7 was used. A layered product (A8) having a structure of gas barrier layer (0.5 μm)/AC (0.1 μm)/PET (12 μm)/AC (0.1 μm)/gas barrier layer (0.5 μm) was obtained in the same manner as in Example 2, except that the solution (U8) was used instead of the solution (U2) and that duration of the immersion in the 0.5 mass % zinc acetate aqueous solution (85° C.) was changed from 20 seconds to 10 seconds.

The layered product (A8) was subjected to measurement of the neutralization degree (ionization degree) using the above-mentioned method. Also, the mass of the inorganic component/the mass of the organic component was calculated from the used amount of raw materials by the above-mentioned method.

Subsequently, a layered product (B8) having a structure of gas barrier layer/AC/PET/AC/gas barrier layer/adhesive/ON/adhesive/CPP was obtained in the same manner as in Example 1, except that the layered product (A8) was used instead of the layered product (A1).

Using the above-mentioned methods, the layered product (B8) was subjected to evaluation of the oxygen barrier properties before processing, the oxygen barrier properties after bending, and the oxygen barrier properties after retorting.

Example 9

In Example 9, a solution (U9) prepared in the same manner as the solution (U7) obtained in Example 7 was used. A layered product (A9) having a structure of gas barrier layer (0.5 μm)/AC (0.1 μm)/PET (12 μm)/AC (0.1 μm)/gas barrier layer (0.5 μm) was obtained in the same manner as in Example 2, except that the solution (U9) was used instead of the solution (U2).

Using the above-mentioned methods, the layered product (A9) was subjected to measurement of the neutralization degree (ionization degree), the moisture content, and the dry heat shrinkage. Also, the mass of the inorganic component/the mass of the organic component was calculated from the used amount of raw materials by the above-mentioned method.

Subsequently, a layered product (B9) having a structure of gas barrier layer/AC/PET/AC/gas barrier layer/adhesive/ON/adhesive/CPP was obtained in the same manner as in Example 1, except that the layered product (A9) was used instead of the layered product (A1).

Using the above-mentioned methods, the layered product (B9) was subjected to evaluation of the oxygen barrier properties before processing, the oxygen barrier properties after bending, and the oxygen barrier properties after retorting.

Example 10

In Example 10, an aqueous solution of a partially neutralized product of PAA prepared in the same manner as the aqueous solution of the partially neutralized product of PAA obtained in Example 1, an AIP aqueous solution (W10) prepared in the same manner as the AIP aqueous solution (W3) obtained in Example 3, and an APTMOS methanol solution (V10) prepared in the same manner as the APTMOS methanol solution (V1) obtained in Example 1 were used.

32.2 parts by mass of tetramethoxysilane (TMOS) was dissolved in 32.2 parts by mass of methanol to prepare a TMOS methanol solution. 2.1 parts by mass of distilled water and 5.3 parts by mass of 0.1 N hydrochloric acid were added thereto with the temperature of the TMOS methanol solution being maintained at 10° C. or less, which was subjected to hydrolysis and condensation reactions at 10° C. for 30 minutes under stirring. 14.1 parts by mass of the AIP aqueous solution (W10) was added to the resultant solution with the temperature thereof being maintained at 10° C. or less, which was subjected to hydrolysis and condensation reactions at 10° C. for 30 minutes under stirring. Thus, a solution (S10) was obtained.

Subsequently, the solution (S10) was diluted with 202.8 parts by mass of methanol and 435.7 parts by mass of distilled water, and thereafter 221.9 parts by mass of the above-mentioned aqueous solution of the partially neutralized product of PAA was added thereto under stirring. Thus, a solution (T10) was obtained.

Subsequently, while the solution (T10) was stirred, 53.6 parts by mass of the APTMOS methanol solution (V10) was added thereto, which was further stirred for 30 minutes. Thereby, a solution (U10) was obtained.

A layered product (A10) having a structure of gas barrier layer (0.5 µm)/AC (0.1 µm)/PET (12 µm)/AC (0.1 µm)/gas barrier layer (0.5 µm) was obtained in the same manner as in Example 2, except that the solution (U10) was used instead of the solution (U2).

The layered product (A10) was subjected to measurement of the neutralization degree (ionization degree) using the above-mentioned method. Also, the mass of the inorganic component/the mass of the organic component was calculated from the used amount of raw materials by the above-mentioned method.

Subsequently, a layered product (B10) having a structure of gas barrier layer/AC/PET/AC/gas barrier layer/adhesive/ON/adhesive/CPP was obtained in the same manner as in Example 1, except that the layered product (A10) was used instead of the layered product (A1).

Using the above-mentioned methods, the layered product (B10) was subjected to evaluation of the oxygen barrier properties before processing, the oxygen barrier properties after bending, and the oxygen barrier properties after retorting.

Example 11

In Example 11, an aqueous solution of a partially neutralized product of PAA prepared in the same manner as the aqueous solution of the partially neutralized product of PAA obtained in Example 1, an AIP aqueous solution (W11) prepared in the same manner as the AIP aqueous solution (W3) obtained in Example 3, and an APTMOS methanol solution (V11) prepared in the same manner as the APTMOS methanol solution (V1) obtained in Example 1 were used.

30.5 parts by mass of tetramethoxysilane (TMOS) was dissolved in 30.5 parts by mass of methanol to prepare a TMOS methanol solution. 2.0 parts by mass of distilled water and 5.0 parts by mass of 0.1 N hydrochloric acid were added thereto with the temperature of the TMOS methanol solution being maintained at 10° C. or less, which was subjected to hydrolysis and condensation reactions at 10° C. for 30 minutes under stirring. 13.8 parts by mass of the AIP aqueous solution (W11) was added to the resultant solution with the temperature thereof being maintained at 10° C. or less, which was subjected to hydrolysis and condensation reactions at 10° C. for 30 minutes under stirring. Thus, a solution (S11) was obtained.

Subsequently, the solution (S11) was diluted with 190.0 parts by mass of methanol and 451.5 parts by mass of distilled water, and thereafter 204.8 parts by mass of the above-mentioned aqueous solution of the partially neutralized product of PAA was added thereto under stirring. Thus, a solution (T11) was obtained.

Subsequently, while the solution (T11) was stirred, 72.0 parts by mass of the APTMOS methanol solution (V11) was added thereto, which was further stirred for 30 minutes. Thereby, a solution (U11) was obtained.

A layered product (A11) having a structure of gas barrier layer (0.5 µm)/AC (0.1 µm)/PET (12 µm)/AC (0.1 µm)/gas barrier layer (0.5 µm) was obtained in the same manner as in Example 2, except that the solution (U11) was used instead of the solution (U2).

The layered product (A11) was subjected to measurement of the neutralization degree (ionization degree) using the above-mentioned method. Also, the mass of the inorganic component/the mass of the organic component was calculated from the used amount of raw materials by the above-mentioned method.

Subsequently, a layered product (B11) having a structure of gas barrier layer/AC/PET/AC/gas barrier layer/adhesive/ON/adhesive/CPP was obtained in the same manner as in Example 1, except that the layered product (A11) was used instead of the layered product (A1).

Using the above-mentioned methods, the layered product (B11) was subjected to evaluation of the oxygen barrier properties before processing, the oxygen barrier properties after bending, and the oxygen barrier properties after retorting.

Example 12

In Example 12, a solution (U12) prepared in the same manner as the solution (U7) obtained in Example 7 was used. A layered product (A12) having a structure of gas barrier layer (0.5 µm)/AC (0.1 µm)/PET (12 µm)/AC (0.1 µm)/gas barrier layer (0.5 µm) was obtained in the same manner as Example 2, except that the solution (U12) was used instead of the solution (U2) and that heat treatment temperature was changed from 180° C. to 140° C.

The layered product (A12) was subjected to measurement of the neutralization degree (ionization degree) using the above-mentioned method. Also, the mass of the inorganic component/the mass of the organic component was calculated from the used amount of raw materials by the above-mentioned method.

Subsequently, a layered product (B12) having a structure of gas barrier layer/AC/PET/AC/gas barrier layer/adhesive/ON/adhesive/CPP was obtained in the same manner as in Example 1, except that the layered product (A12) was used instead of the layered product (A1).

Using the above-mentioned methods, the layered product (B12) was subjected to evaluation of the oxygen barrier properties before processing, the oxygen barrier properties after bending, and the oxygen barrier properties after retorting.

Example 13

In Example 13, a solution (U13) prepared in the same manner as the solution (U7) obtained in Example 7 was used. A layered product (A13) having a structure of gas barrier layer (0.5 μm)/AC (0.1 μm)/PET (12 μm)/AC (0.1 μm)/gas barrier layer (0.5 μm) was obtained in the same manner as Example 2, except that the solution (U13) was used instead of the solution (U2) and that heat treatment temperature was changed from 180° C. to 160° C.

The layered product (A13) was subjected to measurement of the neutralization degree (ionization degree) using the above-mentioned method. Also, the mass of the inorganic component/the mass of the organic component was calculated from the used amount of raw materials by the above-mentioned method.

Subsequently, a layered product (B13) having a structure of gas barrier layer/AC/PET/AC/gas barrier layer/adhesive/ON/adhesive/CPP was obtained in the same manner as in Example 1, except that the layered product (A13) was used instead of the layered product (A1).

Using the above-mentioned methods, the layered product (B13) was subjected to evaluation of the oxygen barrier properties before processing, the oxygen barrier properties after bending, and the oxygen barrier properties after retorting.

Example 14

In Example 14, a solution (U14) prepared in the same manner as the solution (U7) obtained in Example 7 was used. A layered product (A14) having a structure of gas barrier layer (0.5 μm)/AC (0.1 μm)/PET (12 μm)/AC (0.1 μm)/gas barrier layer (0.5 μm) was obtained in the same manner as Example 2, except that the solution (U14) was used instead of the solution (U2) and that heat treatment temperature was changed from 180° C. to 200° C.

The layered product (A14) was subjected to measurement of the neutralization degree (ionization degree) using the above-mentioned method. Also, the mass of the inorganic component/the mass of the organic component was calculated from the used amount of raw materials by the above-mentioned method.

Subsequently, a layered product (B14) having a structure of gas barrier layer/AC/PET/AC/gas barrier layer/adhesive/ON/adhesive/CPP was obtained in the same manner as in Example 1, except that the layered product (A14) was used instead of the layered product (A1).

Using the above-mentioned methods, the layered product (B14) was subjected to evaluation of the oxygen barrier properties before processing, the oxygen barrier properties after bending, and the oxygen barrier properties after retorting.

Example 15

In Example 15, a solution (U15) prepared in the same manner as the solution (U7) obtained in Example 7 was used. A layered product (A15) having a structure of gas barrier layer (0.5 μm)/AC (0.1 μm)/PET (12 μm)/AC (0.1 μm)/gas barrier layer (0.5 μm) was obtained in the same manner as Example 2, except that the solution (U15) was used instead of the solution (U2) and that drying temperature after the immersion in the zinc acetate aqueous solution (85° C.) was changed from 110° C. to 120° C.

Using the above-mentioned methods, the layered product (A15) was subjected to measurement of the neutralization degree (ionization degree), the moisture content, and the dry heat shrinkage. Also, the mass of the inorganic component/the mass of the organic component was calculated from the used amount of raw materials by the above-mentioned method.

Subsequently, a layered product (B15) having a structure of gas barrier layer/AC/PET/AC/gas barrier layer/adhesive/ON/adhesive/CPP was obtained in the same manner as in Example 1, except that the layered product (A15) was used instead of the layered product (A1).

Using the above-mentioned methods, the layered product (B15) was subjected to evaluation of the oxygen barrier properties before processing, the oxygen barrier properties after bending, and the oxygen barrier properties after retorting.

Example 16

In Example 16, an aqueous solution of a partially neutralized product of PAA prepared in the same manner as the aqueous solution of the partially neutralized product of PAA obtained in Example 1, an AIP aqueous solution (W16) prepared in the same manner as the AIP aqueous solution (W3) obtained in Example 3, and an APTMOS methanol solution (V16) prepared in the same manner as the APTMOS methanol solution (V1) obtained in Example 1 were used.

27.5 parts by mass of tetramethoxysilane (TMOS) was dissolved in 27.5 parts by mass of methanol to prepare a TMOS methanol solution. 1.8 parts by mass of distilled water and 4.5 parts by mass of 0.1 N hydrochloric acid were added thereto with the temperature of the TMOS methanol solution being maintained at 10° C. or less, which was subjected to hydrolysis and condensation reactions at 10° C. for 30 minutes under stirring. 11.5 parts by mass of the AIP aqueous solution (W16) was added to the resultant solution with the temperature thereof being maintained at 10° C. or less, which was subjected to hydrolysis and condensation reactions at 10° C. for 30 minutes under stirring. Thus, a solution (S16) was obtained.

Subsequently, the solution (S16) was diluted with 221.1 parts by mass of methanol and 413.0 parts by mass of distilled water, and thereafter 254.9 parts by mass of the above-mentioned aqueous solution of the partially neutralized product of PAA was added thereto under stirring. Thus, a solution (T16) was obtained.

Subsequently, while the solution (T16) was stirred, 38.1 parts by mass of the APTMOS methanol solution (V16) was added thereto, which was further stirred for 30 minutes. Thereby, a solution (U16) was obtained.

A layered product (A16) having a structure of gas barrier layer (0.5 μm)/AC (0.1 μm)/PET (12 μm)/AC (0.1 μm)/gas barrier layer (0.5 μm) was obtained in the same manner as in Example 2, except that the solution (U16) was used instead of the solution (U2).

The layered product (A16) was subjected to measurement of the neutralization degree (ionization degree) using the above-mentioned method. Also, the mass of the inorganic component/the mass of the organic component was calculated from the used amount of raw materials by the above-mentioned method.

Subsequently, a layered product (B16) having a structure of gas barrier layer/AC/PET/AC/gas barrier layer/adhesive/ON/adhesive/CPP was obtained in the same manner as in Example 1, except that the layered product (A16) was used instead of the layered product (A1).

Using the above-mentioned methods, the layered product (B16) was subjected to evaluation of the oxygen barrier properties before processing, the oxygen barrier properties after bending, and the oxygen barrier properties after retorting.

Example 17

In Example 17, an aqueous solution of a partially neutralized product of PAA prepared in the same manner as the aqueous solution of the partially neutralized product of PAA obtained in Example 1, an AIP aqueous solution (W17) prepared in the same manner as the AIP aqueous solution (W3) obtained in Example 3, and an APTMOS methanol solution (V17) prepared in the same manner as the APTMOS methanol solution (V1) obtained in Example 1 were used.

46.9 parts by mass of tetramethoxysilane (TMOS) was dissolved in 46.9 parts by mass of methanol to prepare a TMOS methanol solution. 3.1 parts by mass of distilled water and 7.7 parts by mass of 0.1 N hydrochloric acid were added thereto with the temperature of the TMOS methanol solution being maintained at 10° C. or less, which was subjected to hydrolysis and condensation reactions at 10° C. for 30 minutes under stirring. 19.9 parts by mass of the AIP aqueous solution (W17) was added to the resultant solution with the temperature thereof being maintained at 10° C. or less, which was subjected to hydrolysis and condensation reactions at 10° C. for 30 minutes under stirring. Thus, a solution (S17) was obtained.

Subsequently, the solution (S17) was diluted with 204.0 parts by mass of methanol and 435.8 parts by mass of distilled water, and thereafter 205.1 parts by mass of the above-mentioned aqueous solution of the partially neutralized product of PAA was added thereto under stirring. Thus, a solution (T17) was obtained.

Subsequently, while the solution (T17) was stirred, 30.5 parts by mass of the APTMOS methanol solution (V17) was added thereto, which was further stirred for 30 minutes. Thereby, a solution (U17) was obtained.

A layered product (A17) having a structure of gas barrier layer (0.5 μm)/AC (0.1 μm)/PET (12 μm)/AC (0.1 μm)/gas barrier layer (0.5 μm) was obtained in the same manner as in Example 2, except that the solution (U17) was used instead of the solution (U2).

The layered product (A17) was subjected to measurement of the neutralization degree (ionization degree) using the above-mentioned method. Also, the mass of the inorganic component/the mass of the organic component was calculated from the used amount of raw materials by the above-mentioned method.

Subsequently, a layered product (B17) having a structure of gas barrier layer/AC/PET/AC/gas barrier layer/adhesive/ON/adhesive/CPP was obtained in the same manner as in Example 1, except that the layered product (A17) was used instead of the layered product (A1).

Using the above-mentioned methods, the layered product (B17) was subjected to evaluation of the oxygen barrier properties before processing, the oxygen barrier properties after bending, and the oxygen barrier properties after retorting.

Example 18

In Example 18, an aqueous solution of a partially neutralized product of PAA prepared in the same manner as the aqueous solution of the partially neutralized product of PAA obtained in Example 1, an AIP aqueous solution (W18) prepared in the same manner as the AIP aqueous solution (W3) obtained in Example 3, and an APTMOS methanol solution (V18) prepared in the same manner as the APTMOS methanol solution (V1) obtained in Example 1 were used.

46.4 parts by mass of tetramethoxysilane (TMOS) was dissolved in 46.4 parts by mass of methanol to prepare a TMOS methanol solution. 3.1 parts by mass of distilled water and 7.6 parts by mass of 0.1 N hydrochloric acid were added thereto with the temperature of the TMOS methanol solution being maintained at 10° C. or less, which was subjected to hydrolysis and condensation reactions at 10° C. for 30 minutes under stirring. 19.4 parts by mass of the AIP aqueous solution (W18) was added to the resultant solution with the temperature thereof being maintained at 10° C. or less, which was subjected to hydrolysis and condensation reactions at 10° C. for 30 minutes under stirring. Thus, a solution (S18) was obtained.

Subsequently, the solution (S18) was diluted with 199.4 parts by mass of methanol and 441.8 parts by mass of distilled water, and thereafter 199.0 parts by mass of the above-mentioned aqueous solution of the partially neutralized product of PAA was added thereto under stirring. Thus, a solution (T18) was obtained.

Subsequently, while the solution (T18) was stirred, 37.0 parts by mass of the APTMOS methanol solution (V18) was added thereto, which was further stirred for 30 minutes. Thereby, a solution (U18) was obtained.

A layered product (A18) having a structure of gas barrier layer (0.5 μm)/AC (0.1 μm)/PET (12 μm)/AC (0.1 μm)/gas barrier layer (0.5 μm) was obtained in the same manner as in Example 2, except that the solution (U18) was used instead of the solution (U2).

The layered product (A18) was subjected to measurement of the neutralization degree (ionization degree) using the above-mentioned method. Also, the mass of the inorganic component/the mass of the organic component was calculated from the used amount of raw materials by the above-mentioned method.

Subsequently, a layered product (B18) having a structure of gas barrier layer/AC/PET/AC/gas barrier layer/adhesive/ON/adhesive/CPP was obtained in the same manner as in Example 1, except that the layered product (A18) was used instead of the layered product (A1).

Using the above-mentioned methods, the layered product (B18) was subjected to evaluation of the oxygen barrier properties before processing, the oxygen barrier properties after bending, and the oxygen barrier properties after retorting.

Example 19

In Example 19, an aqueous solution of a partially neutralized product of PAA prepared in the same manner as the aqueous solution of the partially neutralized product of PAA obtained in Example 1, an AIP aqueous solution (W19) prepared in the same manner as the AIP aqueous solution (W3) obtained in Example 3, and an APTMOS methanol solution (V19) prepared in the same manner as the APTMOS methanol solution (V1) obtained in Example 1 were used.

93.1 parts by mass of tetramethoxysilane (TMOS) was dissolved in 93.1 parts by mass of methanol to prepare a TMOS methanol solution. 6.2 parts by mass of distilled water and 15.3 parts by mass of 0.1 N hydrochloric acid were added thereto with the temperature of the TMOS methanol solution being maintained at 10° C. or less, which was subjected to hydrolysis and condensation reactions at 10° C. for 30 minutes under stirring. 39.4 parts by mass of the AIP aqueous solution (W19) was added to the resultant solution with the temperature thereof being maintained at 10° C. or less, which was subjected to hydrolysis and condensation reactions at 10° C. for 30 minutes under stirring. Thus, a solution (S19) was obtained.

Subsequently, the solution (S19) was diluted with 162.9 parts by mass of methanol and 490.8 parts by mass of distilled water, and thereafter 86.2 parts by mass of the above-mentioned aqueous solution of the partially neutralized product of PAA was added thereto under stirring. Thus, a solution (T19) was obtained.

Subsequently, while the solution (T19) was stirred, 12.9 parts by mass of the APTMOS methanol solution (V19) was added thereto, which was further stirred for 30 minutes. Thereby, a solution (U19) was obtained.

A layered product (A19) having a structure of gas barrier layer (0.5 μm)/AC (0.1 μm)/PET (12 μm)/AC (0.1 μm)/gas barrier layer (0.5 μm) was obtained in the same manner as in Example 2, except that the solution (U19) was used instead of the solution (U2).

The layered product (A19) was subjected to measurement of the neutralization degree (ionization degree) using the above-mentioned method. Also, the mass of the inorganic component/the mass of the organic component was calculated from the used amount of raw materials by the above-mentioned method.

Subsequently, a layered product (B19) having a structure of gas barrier layer/AC/PET/AC/gas barrier layer/adhesive/ON/adhesive/CPP was obtained in the same manner as in Example 1, except that the layered product (A19) was used instead of the layered product (A1).

Using the above-mentioned methods, the layered product (B19) was subjected to evaluation of the oxygen barrier properties before processing, the oxygen barrier properties after bending, and the oxygen barrier properties after retorting.

Example 20

In Example 20, a solution (U20) prepared in the same manner as the solution (U7) obtained in Example 7 was used. A layered product (A20) having a structure of gas barrier layer (0.5 μm)/AC (0.1 μm)/PET (12 μm) was obtained in the same manner as Example 2, except that the solution (U20) was used instead of the solution (U2) and that an anchor coat layer and a gas barrier layer-forming layer only on one surface of the base were formed to form a gas barrier layer only on the one surface of the base.

The layered product (A20) was subjected to measurement of the neutralization degree (ionization degree) using the above-mentioned method. Also, the mass of the inorganic component/the mass of the organic component was calculated from the used amount of raw materials by the above-mentioned method.

Subsequently, a layered product (B20) having a structure of gas barrier layer/AC/PET/adhesive/ON/adhesive/CPP was obtained in the same manner as in Example 1, except that the layered product (A20) was used instead of the layered product (A1).

Using the above-mentioned methods, the layered product (B20) was subjected to evaluation of the oxygen barrier properties before processing, the oxygen barrier properties after bending, and the oxygen barrier properties after retorting.

Example 21

In Example 21, a solution (U21) prepared in the same manner as the solution (U7) obtained in Example 7 was used. A layered product (A21) having a structure of gas barrier layer (0.5 μm)/AC (0.1 μm)/ON (15 μm)/AC (0.1 μm)/gas barrier layer (0.5 μm) was obtained in the same manner as in Example 2, except that a stretched nylon film (the above-mentioned ON) was used as the base instead of PET and that the solution (U21) was used instead of the solution (U2).

Using the above-mentioned methods, the layered product (A21) was subjected to measurement of the neutralization degree (ionization degree), the moisture content, and the dry heat shrinkage. Also, the mass of the inorganic component/the mass of the organic component was calculated from the used amount of raw materials by the above-mentioned method.

Subsequently, a non-stretched polypropylene film (the above-mentioned "CPP") was coated with a two-component adhesive (A-520 (product name) and A-50 (product name), manufactured by MITSUI TAKEDA CHEMICALS INC.), followed by drying. Then, this was laminated with the layered product (A21). Thus, a layered product (B21) having a structure of gas barrier layer/AC/ON/AC/gas barrier layer/adhesive/CPP was obtained.

Using the above-mentioned methods, the layered product (B21) was subjected to evaluation of the oxygen barrier properties before processing, the oxygen barrier properties after bending, and the oxygen barrier properties after retorting.

Example 22

In Example 22, a solution (U22) prepared in the same manner as the solution (U7) obtained in Example 7 was used. A layered product (A22) having a structure of gas barrier layer (0.5 μm)/AC (0.1 μm)/ON (15 μm)/AC (0.1 μm)/gas barrier layer (0.5 μm) was obtained in the same manner as Example 21 except that the solution (U22) was used instead of the solution (U21) and that drying temperature after the immersion in the zinc acetate aqueous solution (85° C.) was changed from 110° C. to 120° C.

Using the above-mentioned methods, the layered product (A22) was subjected to measurement of the neutralization degree (ionization degree), the moisture content, and the dry heat shrinkage. Also, the mass of the inorganic component/the mass of the organic component was calculated from the used amount of raw materials by the above-mentioned method.

Subsequently, a layered product (B22) having a structure of gas barrier layer/AC/ON/AC/gas barrier layer/adhesive/CPP was obtained in the same manner as in Example 21, except that the layered product (A22) was used instead of the layered product (A21).

Using the above-mentioned methods, the layered product (B22) was subjected to evaluation of the oxygen barrier properties before processing, the oxygen barrier properties after bending, and the oxygen barrier properties after retorting.

Example 23

In Example 23, a solution (U23-A) prepared in the same manner as the solution (U5) obtained in Example 5, and a solution (U23-B) prepared in the same manner as the solution (U7) obtained in Example 7 were used. A layered product (A23) having a structure of gas barrier layer (0.5 μm)/AC (0.1 μm)/PET (12 μm)/AC (0.1 μm)/gas barrier layer (0.5 μm) was obtained in the same manner as Example 2, except that an anchor coat layer on one surface of the base was coated with the solution (U23-A) followed by drying at 100° C. for 5 minutes to form a gas barrier layer-forming layer, while an anchor coat layer and a gas barrier layer-forming layer were formed on the other surface using the solution (U23-B) in the same manner.

The layered product (A23), the neutralization degree (ionization degree) in each gas barrier layer was determined by the above-mentioned method. Also for each gas barrier layer, the mass of the inorganic component/the mass of the organic component was calculated from the used amount of raw materials by the above-mentioned method.

Subsequently, a layered product (B23) having a structure of gas barrier layer (layer derived from the solution (U23-B))/AC/PET/AC/gas barrier layer (layer derived from the solution (U23-A))/adhesive/ON/adhesive/CPP was obtained in the same manner as in Example 1, except that the layered product (A23) was used instead of the layered product (A1).

Using the above-mentioned methods, the layered product (B23) was subjected to evaluation of the oxygen barrier properties before processing, the oxygen barrier properties after bending, and the oxygen barrier properties after retorting.

Example 24

In Example 24, an aqueous solution of a partially neutralized product of PAA prepared in the same manner as the aqueous solution of the partially neutralized product of PAA obtained in Example 1, and an AIP aqueous solution (W24) prepared in the same manner as the AIP aqueous solution (W3) obtained in Example 3 were used.

Further, 100 parts by mass of gamma-aminopropyl trimethoxysilane (APTMOS) was dissolved in 400 parts by mass of methanol. Thus, an APTMOS methanol solution (V24) was obtained.

Next, 34.0 parts by mass of tetramethoxysilane (TMOS) was dissolved in 34.0 parts by mass of methanol to prepare a TMOS methanol solution. 2.3 parts by mass of distilled water and 5.6 parts by mass of 0.1 N hydrochloric acid were added thereto with the temperature of the TMOS methanol solution being maintained at 10° C. or less, which was subjected to hydrolysis and condensation reactions at 10° C. for 30 minutes under stirring. 14.4 parts by mass of the AIP aqueous solution (W24) was added to the resultant solution with the temperature thereof being maintained at 10° C. or less, which was subjected to hydrolysis and condensation reactions at 10° C. for 30 minutes under stirring. Thus, a solution (S24) was obtained.

Subsequently, the solution (S24) was diluted with 226.1 parts by mass of methanol and 402.6 parts by mass of distilled water, and thereafter 258.9 parts by mass of the above-mentioned aqueous solution of the partially neutralized product of PAA was added thereto under stirring. Thus, a solution (T24) was obtained.

Subsequently, while the solution (T24) was stirred, 22.2 parts by mass of the APTMOS methanol solution (V24) was added thereto over twice the time taken for addition of the APTMOS methanol solution (V7) in Example 7, which was further stirred for 30 minutes. Thus, a solution (U24) was obtained. It should be noted that in the case where the APTMOS methanol solution (V24) was added taking the same time as for addition of the APTMOS methanol solution (V7) in Example 7, a slight precipitate was generated.

A layered product (A24) having a structure of gas barrier layer (0.5 μm)/AC (0.1 μm)/PET (12 μm)/AC (0.1 μm)/gas barrier layer (0.5 μm) was obtained in the same manner as in Example 2, except that the solution (U24) was used instead of the solution (U2).

The layered product (A24) was subjected to measurement of the neutralization degree (ionization degree) using the above-mentioned method. Also, the mass of the inorganic component/the mass of the organic component was calculated from the used amount of raw materials by the above-mentioned method.

Subsequently, a layered product (B24) having a structure of gas barrier layer/AC/PET/AC/gas barrier layer/adhesive/ON/adhesive/CPP was obtained in the same manner as in Example 1, except that the layered product (A24) was used instead of the layered product (A1).

Using the above-mentioned methods, the layered product (B24) was subjected to evaluation of the oxygen barrier properties before processing, the oxygen barrier properties after bending, and the oxygen barrier properties after retorting.

Comparative Example 1

In Comparative Example 1, an aqueous solution of a partially neutralized product of PAA prepared in the same manner as the aqueous solution of the partially neutralized product of PAA obtained in Example 1 was used.

34.5 parts by mass of tetramethoxysilane (TMOS) and 6.0 parts by mass of gamma-glycidoxypropyltrimethoxysilane (GPTMOS) were dissolved in 40.5 parts by mass of methanol to prepare a solution. 2.6 parts by mass of distilled water and 6.3 parts by mass of 0.1 N hydrochloric acid were added thereto, while the temperature of this solution was maintained at 10° C. or less, which was subjected to hydrolysis and condensation reactions at 10° C. for 60 minutes under stirring.

Subsequently, the resultant solution was diluted with 237.8 parts by mass of methanol and 426.6 parts by mass of distilled water, and thereafter 245.8 parts by mass of the above-mentioned aqueous solution of the partially neutralized product of PAA was added thereto under stirring. Thus, a solution (UC1) was obtained.

A layered product (AC1) having a structure of gas barrier layer (1.0 μm)/AC (0.1 μm)/PET (12 μm)/AC (0.1 μm)/gas barrier layer (1.0 μm) was obtained in the same manner as in Example 1, except that the solution (UC1) was used instead of the solution (U1) and that immersion in a 0.5 mass % calcium acetate aqueous solution (85° C.) for 20 seconds was carried out instead of the immersion in the 0.5 mass % zinc acetate aqueous solution (85° C.) for 20 seconds.

The layered product (AC1) was subjected to measurement of the neutralization degree (ionization degree) using the above-mentioned method. Also, the mass of the inorganic component/the mass of the organic component was calculated from the used amount of raw materials by the above-mentioned method.

Subsequently, a layered product (BC1) having a structure of gas barrier layer/AC/PET/AC/gas barrier layer/adhesive/ON/adhesive/CPP was obtained in the same manner as in Example 1, except that the layered product (AC1) was used instead of the layered product (A1).

Using the above-mentioned methods, the layered product (BC1) was subjected to evaluation of the oxygen barrier properties before processing, the oxygen barrier properties after bending, and the oxygen barrier properties after retorting.

Comparative Example 2

In Comparative Example 2, a solution (UC2) was used prepared in the same manner as the solution (UC1) obtained in Comparative Example 1. A layered product (AC2) having a structure of gas barrier layer (1.0 μm)/AC (0.1 μm)/PET (12 μm)/AC (0.1 μm)/gas barrier layer (1.0 μm) was obtained in the same manner as in Example 1, except that the solution (UC2) was used instead of the solution (U1).

The layered product (AC2) was subjected to measurement of the neutralization degree (ionization degree) using the above-mentioned method. Also, the mass of the inorganic component/the mass of the organic component was calculated from the used amount of raw materials by the above-mentioned method.

Subsequently, a layered product (BC2) having a structure of gas barrier layer/AC/PET/AC/gas barrier layer/adhesive/ON/adhesive/CPP was obtained in the same manner as in Example 1, except that the layered product (AC2) was used instead of the layered product (A1).

Using the above-mentioned methods, the layered product (BC2) was subjected to evaluation of the oxygen barrier properties before processing, the oxygen barrier properties after bending, and the oxygen barrier properties after retorting.

Comparative Example 3

In Comparative Example 3, a solution (UC3) prepared in the same manner as the solution (U1) obtained in Example 1 was used. A layered product (AC3) having a structure of gas barrier layer (1.0 μm)/AC (0.1 μm)/PET (12 μm)/AC (0.1 μm)/gas barrier layer (1.0 μm) was obtained in the same manner as in Example 1, except that the solution (UC3) was used instead of the solution (U1) and that immersion in a 0.5 mass % calcium acetate aqueous solution (85° C.) for 20 seconds was carried out instead of the immersion in the 0.5 mass % zinc acetate aqueous solution (85° C.) for 20 seconds.

The layered product (AC3) was subjected to measurement of the neutralization degree (ionization degree) using the above-mentioned method. Also, the mass of the inorganic component/the mass of the organic component was calculated from the used amount of raw materials by the above-mentioned method.

Subsequently, a layered product (BC3) having a structure of gas barrier layer/AC/PET/AC/gas barrier layer/adhesive/ON/adhesive/CPP was obtained in the same manner as in Example 1, except that the layered product (AC3) was used instead of the layered product (A1).

Using the above-mentioned methods, the layered product (BC3) was subjected to evaluation of the oxygen barrier properties before processing, the oxygen barrier properties after bending, and the oxygen barrier properties after retorting.

Comparative Example 4

In Comparative Example 4, an aqueous solution of a partially neutralized product of PAA prepared in the same manner as the aqueous solution of the partially neutralized product of PAA obtained in Example 1 was used.

38.0 parts by mass of tetramethoxysilane (TMOS) was dissolved in 38.0 parts by mass of methanol to prepare a TMOS methanol solution. 2.5 parts by mass of distilled water and 6.2 parts by mass of 0.1 N hydrochloric acid were added thereto with the temperature of the TMOS methanol solution being maintained at 10° C. or less, which was subjected to hydrolysis and condensation reactions at 10° C. for 60 for minutes under stirring.

Subsequently, the resultant solution was diluted with 240.1 parts by mass of methanol and 405.9 parts by mass of distilled water, and thereafter 269.2 parts by mass of the above-mentioned aqueous solution of the partially neutralized product of PAA was added thereto under stirring. Thus, a solution (UC4) was obtained.

A layered product (AC4) having a structure of gas barrier layer (1.0 μm)/AC (0.1 μm)/PET (12 μm)/AC (0.1 μm)/gas barrier layer (1.0 μm) was obtained in the same manner as in Example 1, except that the solution (UC4) was used instead of the solution (U1).

The layered product (AC4) was subjected to measurement of the neutralization degree (ionization degree) using the above-mentioned method. Also, the mass of the inorganic component/the mass of the organic component was calculated from the used amount of raw materials by the above-mentioned method.

Subsequently, a layered product (BC4) having a structure of gas barrier layer/AC/PET/AC/gas barrier layer/adhesive/ON/adhesive/CPP was obtained in the same manner as in Example 1, except that the layered product (AC4) was used instead of the layered product (A1).

Using the above-mentioned methods, the layered product (BC4) was subjected to evaluation of the oxygen barrier properties before processing, the oxygen barrier properties after bending, and the oxygen barrier properties after retorting.

Comparative Example 5

In Comparative Example 5, a solution (UC5) prepared in the same manner as the solution (U1) obtained in Example 1 was used. A layered product (AC5) having a structure of gas barrier layer (1.0 μm)/AC (0.1 μm)/PET (12 μm)/AC (0.1 μm)/gas barrier layer (1.0 μm) was obtained in the same manner as in Example 1, except that the solution (UC5) was used instead of the solution (U1) and that the immersion in the 0.5 mass % zinc acetate aqueous solution (85° C.) for 20 seconds and drying at 110° C. for 1 minute were omitted.

For the layered product (AC5), the mass of the inorganic component/the mass of the organic component was calculated from the used amount of raw materials by the above-mentioned method.

Subsequently, a layered product (BC5) having a structure of gas barrier layer/AC/PET/AC/gas barrier layer/adhesive/ON/adhesive/CPP was obtained in the same manner as in Example 1, except that the layered product (AC5) was used instead of the layered product (A1).

Using the above-mentioned methods, the layered product (BC5) was subjected to evaluation of the oxygen barrier properties before processing, the oxygen barrier properties after bending, and the oxygen barrier properties after retorting.

The conditions for producing the layered products (B1) to (B24) and (BC1) to (BC5) produced in Examples and Comparative Examples are shown in Table 1. Evaluation results for the respective layered products (B1) to (B24) and (BC1) to (BC5) are shown in Table 2.

TABLE 1

| | Base Kind | Gas barrier layer Kind | Thickness (*1) (μm) | Compound ($L^1$) Kind (*2) | NA/NC Molar ratio | Polymer (P″) Kind | Compound ($L^2$) Kind (*2) | Compound ($L^3$) Kind (*2) | NM3/NM2 Molar ratio | Polymer (P′) Kind |
|---|---|---|---|---|---|---|---|---|---|---|
| EX. 1 | PET | Both sides | 1.0 | A | 5.5/100 | PAA | TMOS | — | 0/100 | PAA |
| EX. 2 | PET | Both sides | 0.5 | A | 5.5/100 | PAA | TMOS | — | 0/100 | PAA |

TABLE 1-continued

| | | | | | | | | | | |
|---|---|---|---|---|---|---|---|---|---|---|
| EX. 3 | PET | Both sides | 0.5 | A | 0.3/100 | PAA | TMOS | AIP | 2.9/97.1 | PAA |
| EX. 4 | PET | Both sides | 0.5 | A | 0.5/100 | PAA | TMOS | AIP | 2.9/97.1 | PAA |
| EX. 5 | PET | Both sides | 0.5 | A | 1.0/100 | PAA | TMOS | AIP | 2.9/97.1 | PAA |
| EX. 6 | PET | Both sides | 0.5 | A | 1.0/100 | PAA | TMOS | AIP | 2.9/97.1 | PAA |
| EX. 7 | PET | Both sides | 0.5 | A | 5.3/100 | PAA | TMOS | AIP | 3.0/97.0 | PAA |
| EX. 8 | PET | Both sides | 0.5 | A | 5.3/100 | PAA | TMOS | AIP | 3.0/97.0 | PAA |
| EX. 9 | PET | Both sides | 0.5 | A | 5.3/100 | PAA | TMOS | AIP | 3.0/97.0 | PAA |
| EX. 10 | PET | Both sides | 0.5 | A | 8.2/100 | PAA | TMOS | AIP | 3.1/96.9 | PAA |
| EX. 11 | PET | Both sides | 0.5 | A | 11.3/100 | PAA | TMOS | AIP | 3.2/96.8 | PAA |
| EX. 12 | PET | Both sides | 0.5 | A | 5.3/100 | PAA | TMOS | AIP | 3.0/97.0 | PAA |
| EX. 13 | PET | Both sides | 0.5 | A | 5.3/100 | PAA | TMOS | AIP | 3.0/97.0 | PAA |
| EX. 14 | PET | Both sides | 0.5 | A | 5.3/100 | PAA | TMOS | AIP | 3.0/97.0 | PAA |
| EX. 15 | PET | Both sides | 0.5 | A | 5.3/100 | PAA | TMOS | AIP | 3.0/97.0 | PAA |
| EX. 16 | PET | Both sides | 0.5 | A | 5.3/100 | PAA | TMOS | AIP | 3.0/97.0 | PAA |
| EX. 17 | PET | Both sides | 0.5 | A | 5.3/100 | PAA | TMOS | AIP | 3.0/97.0 | PAA |
| EX. 18 | PET | Both sides | 0.5 | A | 6.5/100 | PAA | TMOS | AIP | 3.0/97.0 | PAA |
| EX. 19 | PET | Both sides | 0.5 | A | 5.3/100 | PAA | TMOS | AIP | 3.0/97.0 | PAA |
| EX. 20 | PET | One side | 0.5 | A | 5.3/100 | PAA | TMOS | AIP | 3.0/97.0 | PAA |
| EX. 21 | ON | Both sides | 0.5 | A | 5.3/100 | PAA | TMOS | AIP | 3.0/97.0 | PAA |
| EX. 22 | ON | Both sides | 0.5 | A | 5.3/100 | PAA | TMOS | AIP | 3.0/97.0 | PAA |
| EX. 23 | PET | Both sides | 0.5 | A | 1.0/100 | PAA | TMOS | AIP | 2.9/97.1 | PAA |
| | | | 0.5 | A | 5.3/100 | PAA | TMOS | AIP | 3.0/97.0 | PAA |
| EX. 24 | PET | Both sides | 0.5 | A | 5.3/100 | — | TMOS | AIP | 3.0/97.0 | PAA |
| C. EX. 1 | PET | Both sides | 1.0 | E | 0/100 (*3) | — | TMOS | — | 0/100 | PAA |
| C. EX. 2 | PET | Both sides | 1.0 | E | 0/100 (*3) | — | TMOS | — | 0/100 | PAA |
| C. EX. 3 | PET | Both sides | 1.0 | A | 5.5/100 | PAA | TMOS | — | 0/100 | PAA |
| C. EX. 4 | PET | Both sides | 1.0 | — | — | — | TMOS | — | 0/100 | PAA |
| C. EX. 5 | PET | Both sides | 1.0 | A | 5.5/100 | PAA | TMOS | — | 0/100 | PAA |

| | Heat treatment temperature °C. | Metal ion used for neutralization | | NE/NA Molar ratio | Inorganic component/ Organic component Mass ratio | Moisture content mass % | Dry heat shrinkage | |
|---|---|---|---|---|---|---|---|---|
| | | Kind | Degree of neutralization mol % | | | | MD % | TD % |
| EX. 1 | 180 | Zn | 70 | 86.5/13.5 | 30/70 | — | — | — |
| EX. 2 | 180 | Zn | 70 | 86.5/13.5 | 30/70 | — | — | — |
| EX. 3 | 180 | Zn | 89 | 99.4/0.6 | 30/70 | — | — | — |
| EX. 4 | 180 | Zn | 87 | 98.9/1.1 | 30/70 | — | — | — |
| EX. 5 | 180 | Zn | 85 | 97.7/2.3 | 30/70 | — | — | — |
| EX. 6 | 180 | Zn | 97 | 98.0/2.0 | 30/70 | — | — | — |
| EX. 7 | 180 | Zn | 38 | 78.1/21.9 | 30/70 | — | — | — |
| EX. 8 | 180 | Zn | 54 | 83.5/16.5 | 30/70 | — | — | — |
| EX. 9 | 180 | Zn | 70 | 86.8/13.2 | 30/70 | 1.2 | 0.44 | 0.01 |
| EX. 10 | 180 | Zn | 67 | 80.3/19.7 | 30/70 | — | — | — |
| EX. 11 | 180 | Zn | 56 | 71.3/28.7 | 30/70 | — | — | — |
| EX. 12 | 140 | Zn | 75 | 87.6/12.4 | 30/70 | — | — | — |
| EX. 13 | 160 | Zn | 72 | 87.1/12.9 | 30/70 | — | — | — |
| EX. 14 | 200 | Zn | 65 | 85.9/14.1 | 30/70 | — | — | — |
| EX. 15 | 180 | Zn | 70 | 86.8/13.2 | 30/70 | 1.0 | 0.39 | 0.00 |
| EX. 16 | 180 | Zn | 76 | 87.7/12.3 | 25/75 | — | — | — |
| EX. 17 | 180 | Zn | 64 | 85.8/14.2 | 40/60 | — | — | — |
| EX. 18 | 180 | Zn | 61 | 82.4/17.6 | 40/60 | — | — | — |
| EX. 19 | 180 | Zn | 46 | 81.2/18.8 | 75/25 | — | — | — |
| EX. 20 | 180 | Zn | 70 | 86.8/13.2 | 30/70 | — | — | — |
| EX. 21 | 180 | Zn | 74 | 87.4/12.6 | 30/70 | 2.3 | 0.80 | 0.28 |
| EX. 22 | 180 | Zn | 74 | 87.4/12.6 | 30/70 | 1.9 | 0.67 | 0.10 |
| EX. 23 | 180 | Zn | 85 | 97.7/2.3 | 30/70 | — | — | — |
| | 180 | Zn | 70 | 86.8/13.2 | 30/70 | — | — | — |
| EX. 24 | 180 | Zn | 69 | 86.6/13.4 | 30/70 | — | — | — |
| C. EX. 1 | 180 | Ca | 75 | — (*4) | 30/70 | — | — | — |
| C. EX. 2 | 180 | Zn | 74 | — (*5) | 30/70 | — | — | — |
| C. EX. 3 | 180 | Ca | 71 | 0/100 (*6) | 30/70 | — | — | — |
| C. EX. 4 | 180 | Zn | 90 | — | 30/70 | — | — | — |
| C. EX. 5 | 180 | — | — | — | 30/70 | — | — | — |

(*1) Thickness of one gas barrier layer
(*2) A denotes gamma-aminopropyltrimethoxysilane. E denotes gamma-glycidoxypropyltrimethoxysilane. TMOS denotes tetramethoxysilane. AIP denotes aluminum triisopropoxide.
(*3) The value of [total number of moles of epoxy group contained in gamma-glycidoxypropyltrimethoxysilane]/NC was 5.7/100.
(*4) The value of [total number of moles of calcium ion]/[total number of moles of epoxy group contained in gamma-glycidoxypropyltrimethoxysilane] was 86.8/13.2.
(*5) The value of NE/[total number of moles of epoxy group contained in gamma-glycidoxypropyltrimethoxysilane] was 86.7/13.3.
(*6) The value of [total number of moles of calcium ion]/NA was 86.7/13.3.

TABLE 2

| | Layer structure of layered product (*1) | Oxygen transmission rate (ml/(m² · day · atm)) | | |
|---|---|---|---|---|
| | | Before processing | After bending | After retorting |
| EX. 1 | Gas barrier layer // PET // Gas barrier layer // ON // CPP | 0.12 | 0.69 | 0.61 |
| EX. 2 | Gas barrier layer // PET // Gas barrier layer // ON // CPP | 0.24 | 0.83 | 0.80 |
| EX. 3 | Gas barrier layer // PET // Gas barrier layer // ON // CPP | 0.08 | 0.78 | 0.50 |
| EX. 4 | Gas barrier layer // PET // Gas barrier layer // ON // CPP | 0.08 | 0.67 | 0.50 |
| EX. 5 | Gas barrier layer // PET // Gas barrier layer // ON // CPP | 0.08 | 0.58 | 0.51 |
| EX. 6 | Gas barrier layer // PET // Gas barrier layer // ON // CPP | 0.07 | 0.66 | 0.49 |
| EX. 7 | Gas barrier layer // PET // Gas barrier layer // ON // CPP | 0.13 | 0.45 | 0.70 |
| EX. 8 | Gas barrier layer // PET // Gas barrier layer // ON // CPP | 0.11 | 0.45 | 0.67 |
| EX. 9 | Gas barrier layer // PET // Gas barrier layer // ON // CPP | 0.09 | 0.48 | 0.61 |
| EX. 10 | Gas barrier layer // PET // Gas barrier layer // ON // CPP | 0.13 | 0.47 | 0.65 |
| EX. 11 | Gas barrier layer // PET // Gas barrier layer // ON // CPP | 0.22 | 0.50 | 0.89 |
| EX. 12 | Gas barrier layer // PET // Gas barrier layer // ON // CPP | 0.08 | 0.61 | 0.59 |
| EX. 13 | Gas barrier layer // PET // Gas barrier layer // ON // CPP | 0.09 | 0.55 | 0.60 |
| EX. 14 | Gas barrier layer // PET // Gas barrier layer // ON // CPP | 0.10 | 0.48 | 0.61 |
| EX. 15 | Gas barrier layer // PET // Gas barrier layer // ON // CPP | 0.08 | 0.49 | 0.60 |
| EX. 16 | Gas barrier layer // PET // Gas barrier layer // ON // CPP | 0.08 | 0.57 | 0.57 |
| EX. 17 | Gas barrier layer // PET // Gas barrier layer // ON // CPP | 0.09 | 0.44 | 0.59 |
| EX. 18 | Gas barrier layer // PET // Gas barrier layer // ON // CPP | 0.09 | 0.43 | 0.63 |
| EX. 19 | Gas barrier layer // PET // Gas barrier layer // ON // CPP | 0.13 | 0.65 | 0.65 |
| EX. 20 | Gas barrier layer // PET // ON // CPP | 0.14 | 0.69 | 0.78 |
| EX. 21 | Gas barrier layer // ON // Gas barrier layer // CPP | 0.08 | 0.49 | 0.65 |
| EX. 22 | Gas barrier layer // ON // Gas barrier layer // CPP | 0.08 | 0.50 | 0.65 |
| EX. 23 | Gas barrier layer // PET // Gas barrier layer // ON // CPP | 0.08 | 0.50 | 0.40 |
| EX. 24 | Gas barrier layer // PET // Gas barrier layer // ON // CPP | 0.08 | 0.49 | 0.63 |
| C. EX. 1 | Gas barrier layer // PET // Gas barrier layer // ON // CPP | 0.13 | 0.77 | 1.20 |
| C. EX. 2 | Gas barrier layer // PET // Gas barrier layer // ON // CPP | 0.14 | 1.18 | 0.72 |
| C. EX. 3 | Gas barrier layer // PET // Gas barrier layer // ON // CPP | 0.12 | 0.74 | 1.18 |
| C. EX. 4 | Gas barrier layer // PET // Gas barrier layer // ON // CPP | 0.08 | 2.90 | 1.02 |
| C. EX. 5 | Gas barrier layer // PET // Gas barrier layer // ON // CPP | >40 | >40 | >40 |

(*1) // denotes an adhesive layer (an anchor coat layer or a layer formed of an adhesive).

In Comparative Example 1 and Comparative Example 2, gamma-glycidoxypropyltrimethoxysilane that was a compound having an epoxy group was used, and calcium ion and zinc ion were respectively used as a metal ion having a valence of at least two. In Comparative Example 2 where zinc ion was used, the flexibility was reduced while the hot-water resistance was excellent, as compared to Comparative Example 1 where calcium ion was used. Comparative Example 3, in which gamma-aminopropyl trimethoxysilane that was a compound having amino group was used and calcium ion was used as a metal ion having a valence of at least two, did not show much difference in flexibility as compared to Comparative Example 1.

On the other hand, flexibility was significantly improved in Example 1 where gamma-aminopropyl trimethoxysilane that was a compound having amino group was used and zinc ion was used as a metal ion having a valence of at least two, compared to Comparative Example 2 where gamma-glycidoxypropyltrimethoxysilane that was a compound having an epoxy group was used, which was different from the cases (Comparative Examples 1 and 3) of using calcium ion.

Example 1 where the compound ($L^3$) was not used as part of the compound (L) and the thickness of the gas barrier layer was 1.0 µm exhibited excellent gas barrier properties. However, Example 2 where the thickness of the gas barrier layer was reduced to 0.5 µm showed slightly reduced gas barrier properties compared to Example 1. On the other hand, Example 9 where the compound ($L^3$) was used as part of the compound (L) showed excellent gas barrier properties despite the thickness of the gas barrier layer being 0.5 µm.

As shown in Examples 3 to 5, 9 to 11, 17, and 18, the value of the above-mentioned NA/NC in the range of 0.4/100 to 11.0/100 (Examples 4, 5, 9, 10, 17, and 18) allowed the resultant layered products to have more excellent hot-water resistance and flexibility, this value in the range of 0.8/100 to 8.0/100 (Examples 5, 9, 17, and 18) allowed the resultant layered products to have further excellent hot-water resistance and flexibility, and this value in the range of 0.9/100 to 6.0/100 (Examples 5, 9, and 17) allowed the resultant layered products to have particularly excellent hot-water resistance and flexibility.

As shown in Examples 5 to 9, 17, and 18, the value of the above-mentioned NE/NA in the range of 80.0/20.0 to 99.0/1.0 (Examples 5, 6, 8, 9, 17, and 18) allowed the resultant layered products to have more excellent hot-water resistance and flexibility, this value in the range of 85.0/15.0 to 97.9/2.1 (Examples 5, 9, and 17) allowed the resultant layered product to have further excellent hot-water resistance and flexibility.

As shown in Examples 9, and 12 to 14, the heat treatment temperature of 150° C. or more (Examples 9, 13, and 14) allowed the resultant layered products to have more excellent flexibility, and the heat treatment temperature of 170° C. or more (Examples 9 and 14) allowed the resultant layered products to have further excellent flexibility. This is presumably because the above-mentioned heat treatment temperatures allow the reaction between the amino group derived from the compound ($L^1$) and the —COO— group in the functional group (C) contained in the polymer (P) to proceed more reliably.

As obvious from the comparison between Examples 9 and 15, and between Examples 21 and 22, even when drying temperature after the ionization step was increased, high gas barrier properties were maintained. Further, by increasing the drying temperature after the ionization step, the moisture content in the layered product could be reduced to a lower level, and the dry heat shrinkage of the layered product could be reduced.

As shown in Examples 9, 16, 17, and 19, the ratio of [mass of the inorganic component derived from the compound (L)]/[total of the mass of the organic component derived from the compound (L) and the mass of the organic component derived from the polymer (P)] in the range of 29/71 to 70/30 (Examples 9 and 17) allowed the resultant layered products to have more excellent gas barrier properties, and this ratio in the range of 35/65 to 60/40 (Example 17) allowed the resultant layered product to have further excellent gas barrier properties.

The gas barrier layer was stacked on each of both surfaces of the base in Example 9, while it was stacked only on one surface of the base in Example 20. Example 20 where the gas barrier layer was stacked only on one surface of the base showed slightly reduced gas barrier properties of the layered product compared to Example 9. However, in the case where the gas barrier layer was stacked only on one surface of the base, the mechanical properties of the layered product become close to the original properties of the base, which gives an advantage of excellent workability.

As obvious from the comparison between Examples 9 and 21, and between Examples 15 and 22, in the cases where a stretched nylon film (ON) was used as the base (Examples 21 and 22), the layered products with good flexibility and hot-water resistance were obtained, though the hot-water resistance thereof was slightly reduced, compared to the cases where a stretched polyethylene terephthalate film (PET) was used as the base (Examples 9 and 15). In addition, when ON is used as the base, it is possible to make the structure of the layered product simpler since ON has high strength. Therefore, the use of ON as the base is advantageous in workability.

In Example 23, the same gas barrier layer as the gas barrier layer in the layered product of Example 5 was stacked on one surface of the base, and the same gas barrier layer as the gas barrier layer in the layered product of Example 9 was stacked on the other surface of the base. A synergistic effect to improve the hot-water resistance and flexibility can be exerted in this way by stacking gas barrier layers having different compositions on the respective surfaces of the base. As a result, a layered product exhibiting excellent performance beyond that expected from simple addition of the respective gas barrier layers could be obtained.

The layered product of Example 9 showed almost the same performance as that of Example 24. However, in order to obtain the solution (U24) in Example 24 without precipitation and thus having good coating properties, the addition rate of the APTMOS methanol solution (V24) needed to be slowed. Therefore, Example 24 showed a slightly reduced productivity compared to Example 9.

Example 25

In Example 25, a vertical form fill seal pouch was produced. First, the layered product (A23) was produced in the same manner as in Example 23. Next, the layered product (A23) was coated with a two-component adhesive (A-520 (product name) and A-50 (product name), manufactured by MITSUI TAKEDA CHEMICALS INC.) and dried, which was laminated with a stretched nylon film (the above-mentioned ON). Thus, a layered product was obtained. Subsequently, the stretched nylon film on the layered product coated with a two-component adhesive (A-520 (product name) and A-50 (product name), manufactured by MITSUI TAKEDA CHEMICALS INC.), followed by drying, was prepared. This was laminated with an unstretched polypropylene film (RXC-21 (product name), with a thickness of 70 μm, manufactured by TOHCELLO CO., LTD., which may hereinafter be abbreviated as "CPP70"). Thus, a layered product (C23) having a structure of gas barrier layer (layer derived from the solution (U23-B))/AC/PET/AC/gas barrier layer (layer derived from the solution (U23-A))/adhesive/ON/adhesive/CPP70 was obtained.

Next, the layered product (C23) was cut into a width of 400 mm, and fed into a vertical pouch form fill packaging machine (manufactured by ORIHIRO Co., Ltd.), so that a vertical form fill seal pouch (width: 160 mm, length: 470 mm) of butt seam type was produced. Next, using the pouch form fill packaging machine, 2 kg of water was charged into the vertical form fill seal pouch formed of the layered product (C23). The layered product (C23) showed good workability in the pouch form fill packaging machine, and no defects such as wrinkles and streaks were observed in the appearance of the obtained vertical form fill seal pouch.

Example 26

In Example 26, a vacuum packaging pouch was produced. First, the layered product (A23) was produced in the same manner as in Example 23. Next, a stretched nylon film (the above-mentioned ON) coated with a two-component adhesive (A-520 (product name) and A-50 (product name), manufactured by MITSUI TAKEDA CHEMICALS INC.), followed by drying, was prepared. This was laminated with the layered product (A23). Next, the laminated layered product (A23) was coated with a two-component adhesive (A-520 (product name) and A-50 (product name), manufactured by MITSUI TAKEDA CHEMICALS INC.) and dried, which was laminated with an unstretched polypropylene film (the above-mentioned CPP70). Thus, a layered product (D23) having a structure of ON/adhesive/gas barrier layer (layer derived from the solution (U23-B))/AC/PET/AC/gas barrier layer (layer derived from the solution (U23-A))/adhesive/CPP70 was obtained.

Next, two pieces of the layered product having a rectangular shape of 22 cm×30 cm were cut out from the layered product (D23). Then, the two pieces of the layered product (D23) were stacked together so that each CPP70 served as the inner portion, and then three sides of the rectangle were heat-sealed to form a pouch. The pouch was filled with balls made of wood (diameter: 30 mm) as a model of solid foods in the state where the balls were in contact with each other in a single layer. Thereafter, the inside of the pouch was degassed to remove the air, followed by heat-sealing the last side. Thus, a vacuum packaging pouch was produced. In the obtained vacuum packaging pouch, the layered product (D23) was closely in contact with the balls along their bumps.

Example 27

In Example 27, a pouch with a spout was produced. First, the layered product (C23) having a structure of gas barrier layer (layer derived from the solution (U23-B))/AC/PET/AC/gas barrier layer (layer derived from the solution (U23-A))/adhesive/ON/adhesive/CPP70 was obtained in the same manner as in Example 25. Next, two pieces of the layered product having a specific shape were cut out from the layered product (C23). Then, the two pieces of the layered product (C23) were stacked together so that each CPP70 served as the inner portion, and then the peripheral edges were heat-sealed. Further, a spout made of polypropylene was attached thereto by heat sealing. Thus, a flat pouch with a spout was produced without problems.

Example 28

In Example 28, a laminated tube container was produced. First, the layered product (A23) was produced in the same manner as in Example 23. Next, two unstretched polypropylene films (RXC-21 (product name), with a thickness of 100 μm, manufactured by TOHCELLO CO., LTD., which may hereinafter be abbreviated as "CPP100") each were coated with a two-component adhesive (A-520 (product name) and A-50 (product name), manufactured by MITSUI TAKEDA CHEMICALS INC.) and dried, which were laminated with the layered product (A23). Thus, a layered product (E23) having a structure of CPP100/adhesive/gas barrier layer (layer derived from the solution (U23-B))/AC/PET/AC/gas barrier layer (layer derived from the solution (U23-A))/adhesive/CPP100 was obtained.

Next, the layered product (E23) was cut out into a specific shape, which thereafter was put into a tubular form and the overlapped portion was heat-sealed. Thereby, a tubular body was produced. Next, the tubular body was mounted on a mandrel for forming tube containers, and a shoulder in the form of a circular truncated cone and a tip that was continuous from the shoulder were produced at one end of the tubular body. The shoulder and the tip were formed by compression molding of polypropylene resin. Next, a cap made of polypropylene resin was placed on the above-mentioned tip. Next, the other end, which was open, of the tubular body was heat-sealed. Thus, a laminated tube container was produced without problems.

Example 29

In Example 29, an infusion bag was produced. First, the layered product (C23) having a structure of gas barrier layer (layer derived from the solution (U23-B))/AC/PET/AC/gas barrier layer (layer derived from the solution (U23-A))/adhesive/ON/adhesive/CPP70 was obtained in the same manner as in Example 25. Next, two pieces of the layered product having a specific shape were cut out from the layered product (C23). Then, the two pieces of the layered product (C23) were stacked together so that each CPP70 served as the inner portion, and then the peripheral edges were heat-sealed. Further, a spout made of polypropylene was attached thereto by heat sealing. Thus, an infusion bag was produced without problems.

Example 30

In Example 30, a container cover was produced. First, the layered product (C23) having a structure of gas barrier layer (layer derived from the solution (U23-B))/AC/PET/AC/gas barrier layer (layer derived from the solution (U23-A))/adhesive/ON/adhesive/CPP70 was obtained in the same manner as in Example 25. Next, the layered product (C23) was cut out into a circular shape with a diameter of 88 mm as a container cover. A cylindrical container having a diameter of 78 mm, a flange width of 6.5 mm, and a height of 30 mm, and having a three-layer structure of polyolefin layer/steel layer/polyolefin layer (Hi-Retroflex HR78-84, manufactured by TOYO SEIKAN KAISHA, LTD.) was prepared. This container was almost fully filled with water, and the container cover formed of the layered product (C23) was heat-sealed onto the flange. Thus, a covered container using the container cover was produced without problems.

Example 31

In Example 31, a paper container was produced. First, the layered product (A23) was produced in the same manner as in Example 23. Next, an adhesive was applied to both surfaces of a 400 g/m² paperboard. Thereafter, a PP layer (with a thickness of 20 μm) was formed on each of both surfaces of the paperboard by extrusion lamination of polypropylene resin (which may be abbreviated as "PP") on both surfaces. Subsequently, an adhesive was applied to one surface of the PP layer, over which the layered product (A23) was laminated. Further, an adhesive was applied to the surface of the layered product (A23), which was bonded with an unstretched polypropylene film (the above-mentioned CPP70). Thus, a layered product (F23) having a structure of PP/paperboard/PP/adhesive/gas barrier layer (layer derived from the solution (U23-B))/AC/PET/AC/gas barrier layer (layer derived from the solution (U23-A))/adhesive/CPP70 was produced. In producing the layered product (F23), an anchor coating agent was used, as needed. Using the resultant layered product (F23), a paper container in the form of a brick was produced without problems.

Example 32

In Example 32, a vacuum heat insulator was produced. First, the layered product (D23) having a structure of ON/adhesive/gas barrier layer (layer derived from the solution (U23-B))/AC/PET/AC/gas barrier layer (layer derived from the solution (U23-A))/adhesive/CPP70 was obtained in the same manner as in Example 26. Next, two pieces of the layered product having a specific shape were cut out from the layered product (D23). Then, the two pieces of the layered product (D23) were stacked together so that each CPP70 served as the inner portion, and then three sides of the rectangle were heat-sealed to form a pouch. Next, a heat-insulating core material was charged through the opening portion of the pouch, and then the pouch was sealed using a vacuum packaging machine (VAC-STAR 2500, manufactured by Frimark GmbH) at a temperature of 20° C. and an internal pressure of 10 Pa. Thus, a vacuum heat insulator was produced without problems. It should be noted that silica fine powder dried for 4 hours in an atmosphere of 120° C. was used as the heat-insulating core material.

INDUSTRIAL APPLICABILITY

The layered product of the present invention can be used effectively as packaging materials for foods, chemicals, medical devices, industrial materials, clothes, etc. Above all, it is used particularly effectively as food packaging materials that require gas barrier properties under high humidity. Preferred examples of use application of the layered product of the present invention include application as a retort pouch.

The invention claimed is:

1. A layered product, comprising:
a base; and
a gas barrier layer stacked on the base,
wherein the gas barrier layer comprises
a composition comprising a hydrolyzed condensate of a compound (L) comprising a hydrolyzable group and a neutralized product of a polymer (P) comprising at least one functional group selected from the group consisting of a carboxyl group and a carboxylic acid anhydride group,
wherein:
the compound (L) comprises a compound ($L^1$) comprising an organic group comprising an amino group, and a compound ($L^2$), which does not comprise an organic group comprising an amino group;
the compound ($L^1$) and the compound ($L^2$) each comprises a silicon atom bonded to the hydrolyzable group; and at least a part of —COO— group in the at least one functional group in the polymer (P) is neutralized with a divalent or higher valent ion (E) of a metal element that has a higher electronegativity than calcium, wherein the base is in the form of a film, and the gas barrier layer comprises a first gas barrier layer stacked on one surface of the base, and a second gas barrier layer stacked on a second surface of the base, and wherein a ratio of a total number of moles of the amino group in the compound ($L^1$) in the first gas barrier layer, (NA1), to a total number of moles of the —COO— group in the at least one functional group in the polymer (P) in the first gas barrier layer, (NC1), satisfies a relation:

$0.4/100 \leq (NA1/NC1) \leq 2.0/100$, and wherein a ratio of a total number of moles of the amino group in the compound ($L^1$) in the second gas barrier layer, (NA2), to a total number of moles of the —COO— group in the at least one functional group in the polymer (P) in the second gas barrier layer, (NC2), satisfies a relation:

$2.0/100 < (NA2/NC2) \leq 11.0/100$.

2. A packaging material, comprising the layered product of claim 1.

3. The packaging material of claim 2, being a packaging material for retort foods.

4. A formed product, obtained by a process comprising forming the packaging material of claim 2.

5. The formed product of claim 4, in the form of a vertical form fill seal pouch, a vacuum packaging pouch, a pouch comprising a spout, a laminated tube container, an infusion bag, a container cover, a paper container, or a vacuum heat insulator.

* * * * *